United States Patent
Zlokapa et al.

(10) Patent No.: US 12,452,530 B2
(45) Date of Patent: Oct. 21, 2025

(54) INTELLIGENT SAMPLE TILT ADJUSTMENT WITH ZONES HAVING VARIABLE SIZE

(71) Applicant: ILLUMINA, INC., San Diego, CA (US)

(72) Inventors: Lara Zlokapa, San Diego, CA (US); Jeffrey Gau, San Mateo, CA (US); Matthew Hage, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 31 days.

(21) Appl. No.: 18/391,028

(22) Filed: Dec. 20, 2023

(65) Prior Publication Data

US 2025/0211849 A1    Jun. 26, 2025

(51) Int. Cl.
*H04N 23/60* (2023.01)
*G02B 7/36* (2021.01)
(Continued)

(52) U.S. Cl.
CPC .............. *H04N 23/64* (2023.01); *G02B 7/36* (2013.01); *G06T 7/70* (2017.01); *H04N 23/695* (2023.01);
(Continued)

(58) Field of Classification Search
CPC ........ H04N 23/64; H04N 23/695; G06T 7/70; G02B 7/36
See application file for complete search history.

(56) References Cited

U.S. PATENT DOCUMENTS

| 6,677,565 B1 | 1/2004 | Wahl et al. |
| 9,628,676 B2 | 4/2017 | Staker et al. |

(Continued)

FOREIGN PATENT DOCUMENTS

| EP | 2531880 | 12/2012 |
| WO | WO 2023/141107 | 7/2023 |

(Continued)

OTHER PUBLICATIONS

International Search Report and Written Opinion dated Feb. 19, 2025 for International Application No. PCT/US2024/059653.
(Continued)

*Primary Examiner* — Kathleen V Nguyen
(74) *Attorney, Agent, or Firm* — Sheppard, Mullin, Richter & Hampton LLP

(57) ABSTRACT

Some implementations of the disclosure relate to a method including: obtaining surface profile data of a swath of a sample, the swath divided into multiple tiles, and the surface profile data including surface profile data for each tile; calculating, based at least on a threshold residual and the surface profile data of the swath, one or more zones of the swath that include the multiple tiles, each zone including a respective one or more of the tiles that are adjacent; and associating, based on the surface profile data associated with the one or more tiles of each zone, a detilt value or detip value with each zone, the detilt value or detip value indicating an amount to adjust, before capturing one or more images of the zone, a relative tilt or tip between the sample and an image sensor of an imaging system capturing the one or more images.

20 Claims, 31 Drawing Sheets

(51) Int. Cl.
*G06T 7/70* (2017.01)
*H04N 23/695* (2023.01)

(52) U.S. Cl.
CPC ............. *G06T 2207/30004* (2013.01); *G06T 2207/30244* (2013.01)

(56) References Cited

U.S. PATENT DOCUMENTS

| | | |
|---|---|---|
| 2004/0042007 A1 | 3/2004 | Osipchuk et al. |
| 2005/0285049 A1 | 12/2005 | Montagu et al. |
| 2011/0188053 A1* | 8/2011 | Buermann ............ G02B 21/245 356/624 |
| 2014/0231638 A1 | 8/2014 | Damaskinos et al. |
| 2015/0054921 A1 | 2/2015 | Dixon et al. |
| 2017/0169316 A1 | 6/2017 | Figg et al. |
| 2018/0188514 A1 | 7/2018 | Arianpour et al. |
| 2022/0187587 A1 | 6/2022 | Baranson et al. |
| 2023/0228984 A1* | 7/2023 | Watson .............. G02B 21/0032 348/79 |

FOREIGN PATENT DOCUMENTS

| | | |
|---|---|---|
| WO | WO 2023/239917 A1 | 12/2023 |
| WO | WO 2024/072756 | 4/2024 |

OTHER PUBLICATIONS

International Search Report and Written Opinion mailed May 15, 2023 for International Application No. PCT/US2023/010954.
International Search Report and Written Opinion dated Oct. 21, 2024 for International Application No. PCT/US2024/036229, filed Jun. 28, 2024.

* cited by examiner

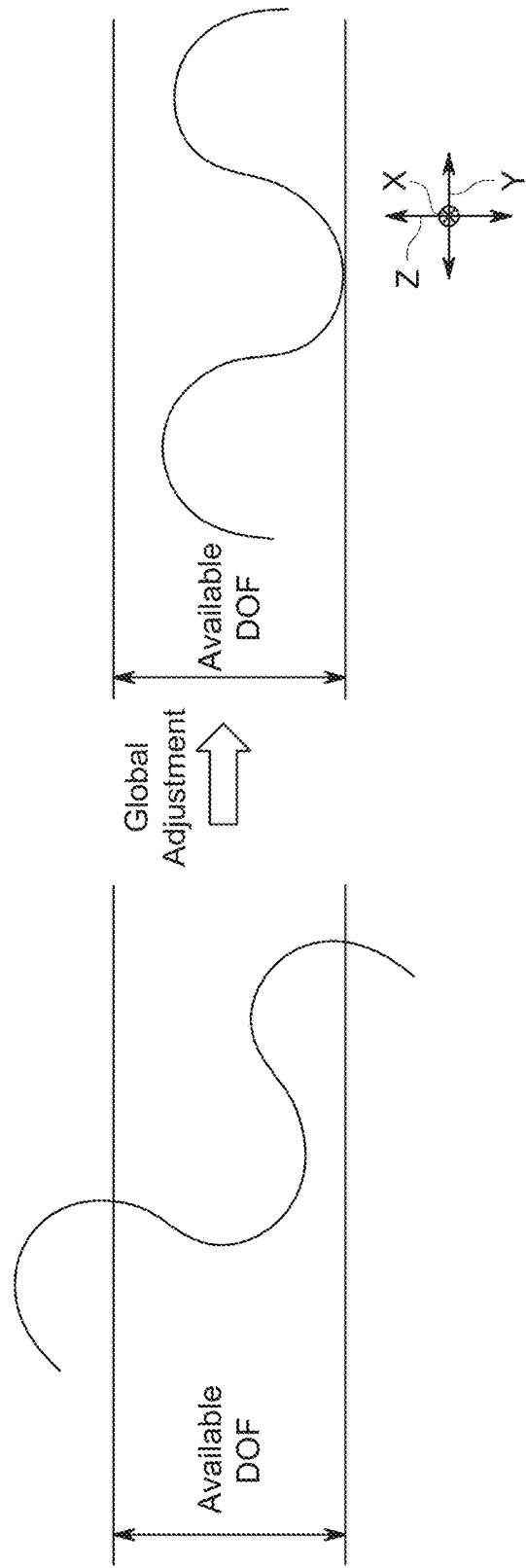
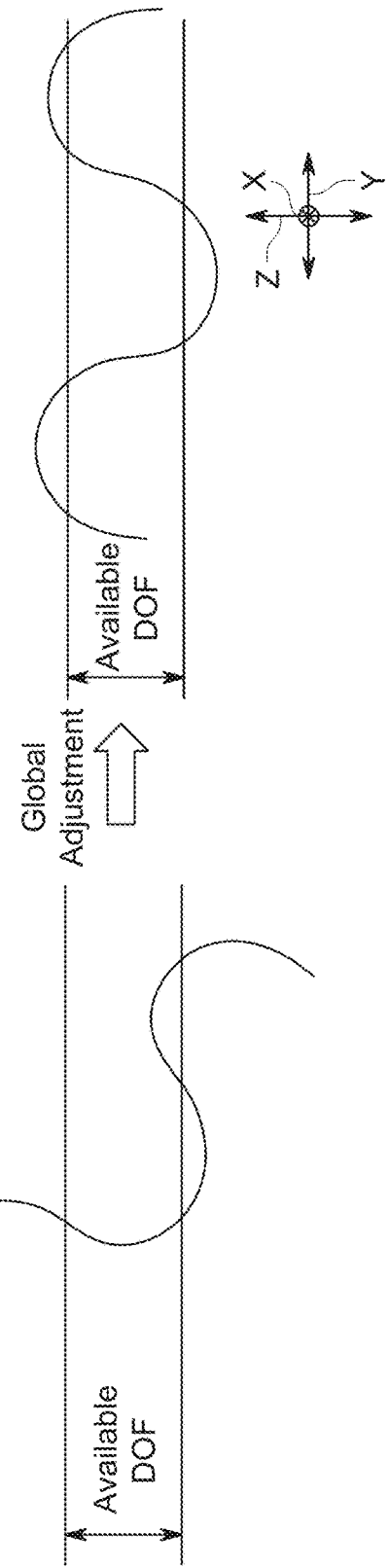

INTELLIGENT SAMPLE TILT ADJUSTMENT WITH ZONES HAVING VARIABLE SIZE

BACKGROUND

Increasing the numerical aperture (NA) of optical imaging systems improves optical imaging resolution. In sequencing applications, this reduces sequencing cluster pitches and increases cluster density, enabling lower cost sequencing. However, increasing the NA also reduces the depth of field (DoF)—the distance over which the imaged object (e.g., cluster) remains in focus as an object is translated along an optical axis of the optical imaging system.

As optical imaging systems with higher NAs continue to be used in imaging applications to reduce costs (e.g., to reduce sequencing costs), it becomes more difficult to ensure that an imaged sample will remain in focus as it is translated along an optical axis. For example, as illustrated by FIG. 1A, some current sequencers are able to detip (or detilt) a sample by establishing a best fit plane for the entire sample such that the entire sample remains within the DoF of the optical imaging system. However, as illustrated by FIG. 1B, with the reduction in the available DoF of the optical imaging system, and even with global adjustment of the sample tip or tilt, local tip or tilt within the sample itself may create DoF excursions large enough to cause at least part of the sequencing image to be out of focus, which causes poor data quality and data loss for the degraded parts of the image.

SUMMARY

Implementations of the disclosure relate to systems and methods for intelligent sample tilt or tip adjustment using zones that can have a variable size.

In one embodiment, a non-transitory computer-readable medium has executable instructions stored thereon that, when executed by a processor, causes an imaging system to perform operations comprising: obtaining surface profile data of a swath of a sample, the swath divided into multiple tiles, and the surface profile data including surface profile data for each tile of the multiple tiles; calculating, based at least on a threshold residual and the surface profile data of the swath, one or more zones of the swath that include the multiple tiles, each zone of the one or more zones including a respective one or more of the tiles that are adjacent; and associating, based on the surface profile data associated with the one or more tiles of each zone, a detilt value or a detip value with each zone, the detilt value or the detip value indicating an amount to adjust, before capturing one or more images of the zone, a relative tilt or tip between the sample and an image sensor of the imaging system capturing the one or more images.

In some implementations, calculating the one or more zones comprises: calculating, based at least on the threshold residual and the surface profile data of the swath, a first zone having a first number of the tiles; and calculating, based at least on the threshold residual and the surface profile data of the swath, a second zone having a second number of the tiles.

In some implementations, the first number of tiles or the second number of tiles is one.

In some implementations, the second number of the tiles is different from the first number of the tiles.

In some implementations, calculating the first zone comprises: assigning a first tile of the multiple tiles to the first zone; calculating a residual of the first zone based on the surface profile data associated with the first tile; and determining if the calculated residual exceeds the threshold residual.

In some implementations, calculating the first zone further comprises: in response to determining that the calculated residual does not exceed the threshold residual: assigning a second tile of the multiple tiles, adjacent to the first tile, to the first zone; recalculating the residual of the first zone based on the surface profile data associated with the first tile and the surface profile data associated the second tile; and determining if the recalculated residual exceeds the threshold residual.

In some implementations: calculating the first zone further comprises: after determining that a final residual calculated for the first zone exceeds the threshold residual, removing, from the first zone, a tile that was last assigned to the first zone; and calculating the second zone comprises assigning, to the second zone, the tile removed from the first zone.

In some implementations, the surface profile data of the swath includes tilt data for each tile of the multiple tiles; the one or more zones of the swath include one or more tilt zones including a respective one or more of the tiles that are adjacent; and the operations include: associating, based on the tilt data associated with the one or more tiles of each tilt zone, the detilt value with each tilt zone, the detilt value indicating an amount to adjust, before capturing one or more images of the zone, a relative tilt between the sample and an image sensor of the imaging system capturing the one or more images.

In some implementations, the surface profile data of the swath includes tip data for each tile of the multiple tiles; the one or more zones of the swath include one or more tip zones including a respective one or more of the tiles that are adjacent; and the operations include: associating, based on the tip data associated with the one or more tiles of each tip zone, the detip value with each tip zone, the detip value indicating an amount to adjust, before capturing one or more images of the zone, a relative tip between the sample and an image sensor of the imaging system capturing the one or more images.

In some implementations, the surface profile data of the swath includes tilt data and tip data for each tile of the multiple tiles; the one or more zones of the swath include one or more tilt zones including a respective one or more of the tiles that are adjacent; the one or more zones of the swath further include one or more tip zones including a respective one or more of the tiles that are adjacent; and the operations include: associating, based on the tilt data associated with the one or more tiles of each tilt zone, the detilt value with each tilt zone, the detilt value indicating an amount to adjust, before capturing one or more images of the zone, a relative tilt between the sample and an image sensor of the imaging system capturing the one or more images; and associating, based on the tip data associated with the one or more tiles of each tip zone, the detip value with each tip zone, the detip value indicating an amount to adjust, before capturing one or more images of the zone, a relative tip between the sample and the image sensor of the imaging system capturing the one or more images.

In some implementations, a number of the tilt zones is different from a number of the tip zones.

In some implementations, the operations further comprise: after calculating the one or more zones and associating the detilt values or the detip values with the zones, imaging the sample swath one or more times, wherein during imaging the relative tilt or tip between the sample and the image sensor is adjusted based on the detilt values or detip values associated with the zones.

In some implementations, the relative tilt or tip between the sample and the image sensor is adjusted by translating a Z-stage.

In some implementations, the relative tilt or tip between the sample and the image sensor is adjusted by rotating a sample holder of the sample, rotating the imaging system relative to the sample, or some combination thereof.

In some implementations, the operations further comprise: after imaging the swath one or more times, obtaining updated surface profile data of the sample swath, the updated surface profile data including updated surface profile data for each tile of the multiple tiles; and calculating, based at least on the threshold residual and the updated surface profile data of the swath, one or more updated zones of the swath that include the multiple tiles, each updated zone of the one or more updated zones including a respective one or more of the tiles that are adjacent; and associating, based on the updated surface profile data associated with the one or more tiles of each updated zone, an updated detilt value or updated detip value with each updated zone, the updated detilt value or updated detip value indicating an amount to adjust, before capturing one or more images of the updated zone, a relative tilt or relative tip between the sample and the image sensor.

In one embodiment, a method comprises: obtaining, at an imaging system, surface profile data of a swath of a sample, the swath divided into multiple tiles, and the surface profile data including surface profile data for each tile of the multiple tiles; calculating, at the imaging system, based at least on a threshold residual and the surface profile data, one or more zones of the swath that include the multiple tiles, each zone of the one or more zones including a respective one or more of the tiles that are adjacent; and associating, at the imaging system, based on the surface profile data associated with the one or more tiles of each zone, a detilt or a detip value with each zone, the detilt value or the detip value indicating an amount to adjust, before capturing one or more images of the zone, a relative tilt or tip between the sample and an image sensor of the imaging system capturing the one or more images.

In some implementations, calculating the one or more zones comprises: calculating, based at least on the threshold residual and the surface profile data of the swath, a first zone having a first number of the tiles; and calculating, based at least on the threshold residual and the surface profile data of the swath, a second zone having a second number of the tiles.

In some implementations of the method, the second number of the tiles is different from the first number of the tiles.

In some implementations, the method further comprises: after calculating the one or more zones and associating the detilt values or the detip values with the zones, imaging, at the imaging system, the sample swath one or more times; and adjusting at the imaging system, during imaging, based on the detilt values or the detip values associated with the zones, the relative tilt or tip between the sample and the image sensor.

In some implementations, adjusting the relative tilt or tip between the sample and the image sensor comprises: translating a Z-stage of the imaging system; or rotating, at the imaging system, a sample holder of the sample; or rotating the imaging system relative to the sample; or any combination thereof. It should be appreciated that any suitable translational or rotational adjustment of a component of the imaging system, the sample holder, and/or the sample can be made to adjust the relative tilt or tip.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

FIG. 1A illustrates detipping of a sample by establishing a best fit plane for the entire sample.

FIG. 1B illustrates local tip within a sample creating depth of field excursions that cause part of the sample image to be out of focus.

Figure 2:
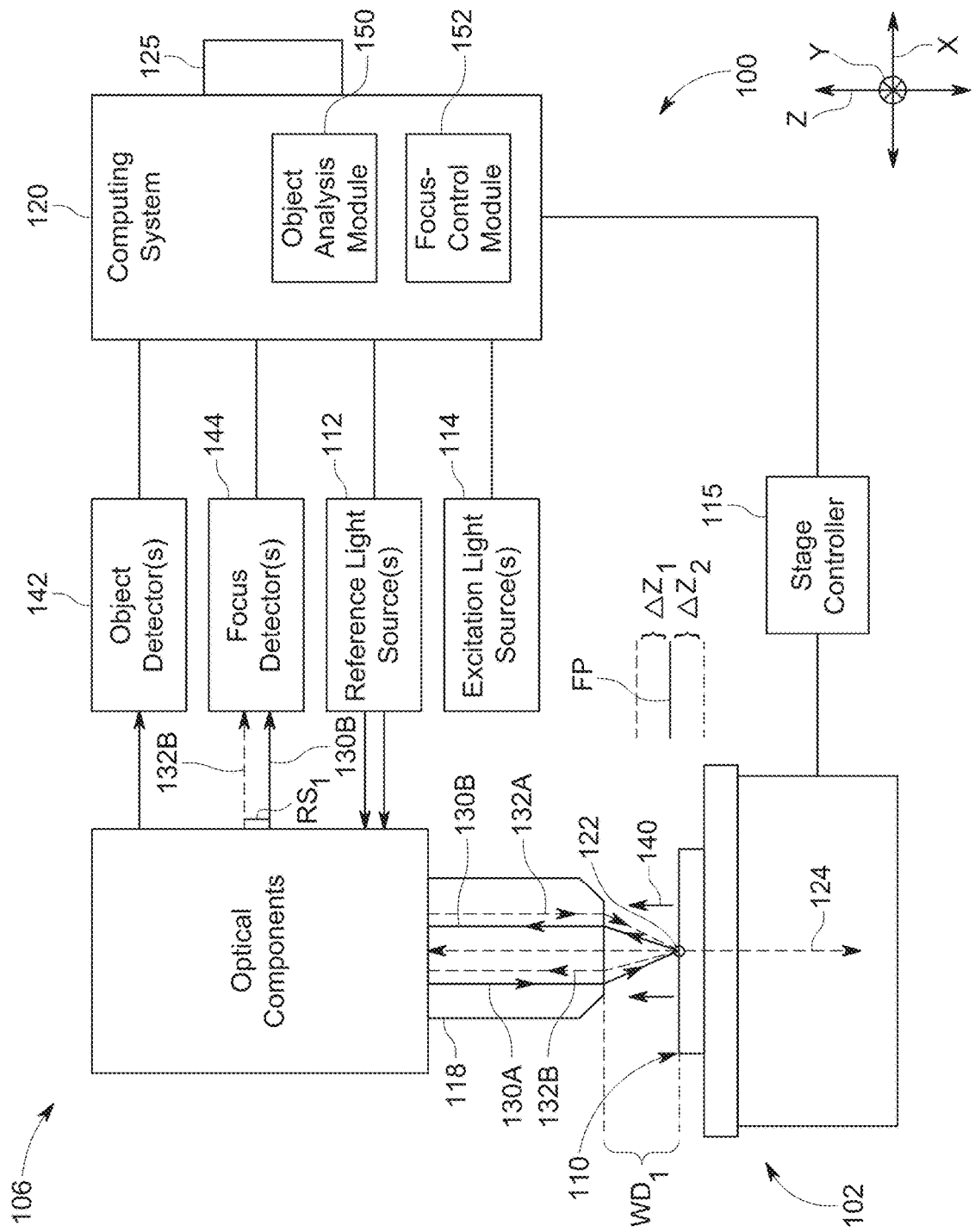
FIG. 2 illustrates a block diagram of an optical imaging system, in accordance with some implementations of the disclosure.

The figures are not exhaustive and do not limit the present disclosure to the precise form disclosed.

DETAILED DESCRIPTION

As used herein to refer to a sample, the term "feature" is intended to mean a point or area in a pattern that can be distinguished from other points or areas according to relative location. An individual feature can include one or more molecules of a particular type. For example, a feature can include a single target nucleic acid molecule having a particular sequence or a feature can include several nucleic acid molecules having the same sequence (and/or complementary sequence, thereof).

As used herein, the term "swath" is intended to mean a rectangular portion of an object. The swath can be an elongated strip that is scanned by relative movement between the object and a detector in a direction that is parallel to the longest dimension of the strip. Generally, the width of the rectangular portion or strip will be constant along its full length. Multiple swaths of an object can be parallel to each other. Multiple swaths of an object can be adjacent to each other, overlapping with each other, abutting each other, or separated from each other by an interstitial area. A swath can be divided into multiple regions referred to as "tiles".

As used herein, the term "xy coordinates" is intended to mean information that specifies location, size, shape, and/or orientation in an xy plane. The information can be, for example, numerical coordinates in a Cartesian system. The coordinates can be provided relative to one or both of the x and y axes or can be provided relative to another location in the xy plane. For example, coordinates of a feature of an object can specify the location of the feature relative to location of a fiducial or other feature of the object.

As used herein, the term "xy plane" is intended to mean a 2 dimensional area defined by straight line axes x and y. When used in reference to a detector and an object observed by the detector, the area can be further specified as being orthogonal to the direction of observation between the detector and object being detected. When used herein to refer to a line scanner, the term "y direction" refers to the direction of scanning.

As used herein, the term "z coordinate" is intended to mean information that specifies the location of a point, line or area along an axis that is orthogonal to an xy plane. In particular implementations, the z axis is orthogonal to an area of an object that is observed by a detector. For example, the direction of focus for an optical imaging system may be specified along the z axis.

As used herein, the term "scanning" is intended to mean detecting a 2-dimensional cross-section in an xy plane of an object, the cross-section being rectangular or oblong. For example, in the case of fluorescence imaging an area of an object having rectangular or oblong shape can be specifically excited (at the exclusion of other areas) and/or emission from the area can be specifically acquired (at the exclusion of other areas) at a given time point in the scan.

There is an increasing need to enable dynamic tilting or tipping of a sample in optical imaging systems that utilize a higher NA to resolve finer optical features at the expense of DoF. In such systems, even a small amount of twisting of the sample that defocuses a part of the sample within the field of view may result in a significant error. A small amount of tip about the direction of scanning, or a small amount of tilt about a direction perpendicular to the direction of scanning, can blur or defocus regions of interest that are being scanned. In addition, to maximize the lifespan and performance of components involved in dynamic tilting or tipping, there is a need to intelligently tilt or tip a sample as the need arises based on sample topography. As such, there is a need for dynamic and intelligent multi-axis tilting of a sample.

Various implementations of the disclosure relate to systems and methods for dynamically adjusting, based on a sample's local topography, one or more components of an imaging system to keep the sample in focus during sample scanning. Particular implementations relate to techniques for intelligently creating tilt or tip zones defining where to adjust for sample tilt or tip, which can extend the life of tilting/tipping components and improve tilting/tipping performance.

Before describing particular techniques for dynamic and intelligent tilting/tipping of a sample, it is instructive to consider an example system in which they can be implemented. FIG. 2 illustrates a block diagram of one such example optical imaging system 100 in accordance with some implementations of the disclosure. The optical imaging system 100 images a sample of interest (object 110) for analysis. For example, in implementations where the optical imaging system 100 functions as a sequencer, the imaged sample may be sequenced. In some implementations, the optical imaging system 100 may function as a profilometer that determines a surface profile (e.g., topography) of an imaged object. Furthermore, various other types of optical imaging systems may use the mechanisms and systems described herein. In the illustrated embodiment, the optical imaging system 100 includes an optical assembly 106, an object holder 102 for supporting an object 110 near a focal plane FP of the optical assembly 106, and a stage controller 115 that is configured to move the object holder 102 in a lateral direction (along an X-axis and/or a Y-axis that extends into the page), in a vertical/elevational direction along a Z-axis, and/or in an angular direction about the X-axis (tip), Y-axis (tilt), and/or Z-axis (twist). The optical imaging system 100 may also include a system controller or computing system 120 that is operatively coupled to the optical assembly 106, the stage controller 115, and/or the object holder 102.

In some implementations, the object 110 is a sample container including a biological sample that is imaged using one or more fluorescent dyes. For example, in a particular implementation the sample container may be implemented as a patterned flow cell including a translucent cover plate, a substrate, and a liquid sandwiched therebetween, and a biological sample may be located at an inside surface of the translucent cover plate or an inside surface of the substrate. The flow cell may include a large number (e.g., thousands, millions, or billions) of wells or regions that are patterned into a defined array (e.g., a hexagonal array, rectangular array, etc.) into the substrate. Each region may form a cluster (e.g., a monoclonal cluster) of a biological sample such as DNA, RNA, or another genomic material which may be sequenced, for example, using sequencing by synthesis. The flow cell may be divided into a number of physically separated lanes (e.g., eight lanes), each lane including an array of clusters. During each cycle of sequencing, each surface (e.g., upper and lower) of each lane may be imaged in separate swaths (e.g., three), and any number of images may be collected for each swath. For example, one or more images can be collected for each tile of a swath.

Although not shown, optical imaging system 100 may include one or more sub-systems or devices for performing various assay protocols. For example, where the sample includes a flow cell having flow channels, the optical imaging system 100 may include a fluid control system that includes liquid reservoirs that are fluidically coupled to the flow channels through a fluidic network. The fluid control system may direct the flow of reagents (e.g., fluorescently labeled nucleotides, buffers, enzymes, cleavage reagents, etc.) to (and through) a sample container and waste valve. Another sub-system that may be included is a temperature control system that may have a heater/cooler configured to regulate a temperature of the sample and/or the fluid that flows through the sample. The temperature control system may include sensors that detect a temperature of the fluids.

As shown, the optical assembly 106 is configured to direct input light to an object 110 and receive and direct output light to one or more detectors. The output light may be input light that was at least one of reflected and refracted by the object 110 and/or the output light may be light emitted from the object 110. To direct the input light, the optical assembly 106 may include at least one reference light source 112 and at least one excitation light source 114 that direct light, such as light beams having predetermined wavelengths, through one or more optical components of the optical assembly 106. The optical assembly 106 may include various optical components, including a conjugate lens 118, for directing the input light toward the object 110 and directing the output light toward the detector(s).

The reference light source 112 may be used by a distance measuring system and/or a focus-control system (or focusing mechanism) of the optical imaging system 100, and the excitation light source 114 may be used to excite the biological or chemical substances of the object 110 when the object 110 includes a biological or chemical sample. The excitation light source 114 may be arranged to illuminate a bottom surface of the object 110, such as in TIRF imaging, or may be arranged to illuminate a top surface of the object 110, such as in epi-fluorescent imaging. As shown in FIG. 2, the conjugate lens 118 directs the input light to a focal region 122 lying within the focal plane FP. The lens 118 has an optical axis 124 and is positioned a working distance WD1 away from the object 110 measured along the optical axis 124. The stage controller 115 may move the object 110 in the Z-direction to adjust the working distance WD1 so that, for example, a portion of the object 110 is within the focal region 122. Additionally, the stage controller 115 may actively orient an area of interest of object 100 within the FP by rotating the object holder 102 about the X-axis, the Y-axis, and/or the Z-axis.

To determine whether the object 110 is in focus (i.e., sufficiently within the focal region 122 or the focal plane FP), the optical assembly 106 is configured to direct at least one pair of light beams to the focal region 122 where the object 110 is approximately located. The object 110 reflects the light beams. More specifically, an exterior surface of the object 110 or an interface within the object 110 reflects the light beams. The reflected light beams then return to and propagate through the lens 118. As shown, each light beam has an optical path that includes a portion that has not yet been reflected by the object 110 and a portion that has been reflected by the object 110. The portions of the optical paths prior to reflection are designated as incident light beams 130A and 132A and are indicated with arrows pointing toward the object 110. The portions of the optical paths that have been reflected by the object 110 are designated as reflected light beams 130B and 132B and are indicated with arrows pointing away from the object 110. For illustrative purposes, the light beams 130A, 130B, 132A, and 132B are shown as having different optical paths within the lens 118 and near the object 110. However, in this embodiment, the light beams 130A and 132B propagate in opposite directions and are configured to have the same or substantially overlapping optical paths within the lens 118 and near the object 110, and the light beams 130B and 132A propagate in opposite directions and are configured to have the same or substantially overlapping optical paths within the lens 118 and near the object 110.

In the embodiment shown in FIG. 2, light beams 130A, 130B, 132A, and 132B pass through the same lens that is used for imaging. In an alternative embodiment, the light beams used for distance measurement or focus determination can pass through a different lens that is not used for imaging. In this alternative embodiment, the lens 118 is dedicated to passing beams 130A, 130B, 132A, and 132B for distance measurement or focus determination, and a separate lens (not shown) is used for imaging the object 110. Similarly, it will be understood that the systems and methods described herein for focus determination and distance measurement can occur using a common objective lens that is shared with the imaging optics or, alternatively, the objective lenses exemplified herein can be dedicated to focus determination or distance measurement.

The reflected light beams 130B and 132B propagate through the lens 118 and may, optionally, be further directed by other optical components of the optical assembly 106. As shown, the reflected light beams 130B and 132B are detected by at least one focus detector 144. In the illustrated embodiment, both reflected light beams 130B and 132B are detected by a single focus detector 144. The reflected light beams may be used to determine relative separation RS1. For example, the relative separation RS1 may be determined by the distance separating the beam spots from the impinging reflected light beams 130B and 132B on the focus detector 144 (i.e., a separation distance). The relative separation RS1 may be used to determine a degree-of-focus of the optical imaging system 100 with respect to the object 110. However, in alternative embodiments, each reflected light beam 130B and 132B may be detected by a separate corresponding focus detector 144 and the relative separation RS1 may be determined based upon a location of the beam spots on the corresponding focus detectors 144.

If the object 110 is not within a sufficient degree-of-focus, the computing system 120 may operate the stage controller 115 to move the object holder 102 to a desired position. Alternatively or in addition to moving the object holder 102, the optical assembly 106 may be moved in the Z-direction and/or along the XY plane. For example, the object 110 may be relatively moved a distance AZ1 toward the focal plane FP if the object 110 is located above the focal plane FP (or focal region 122), or the object 110 may be relatively moved a distance AZ2 toward the focal plane FP if the object 110 is located below the focal plane FP (or focal region 122). In some embodiments, the optical imaging system 100 may substitute the lens 118 with another lens 118 or other optical components to move the focal region 122 of the optical assembly 106.

The example set forth above and in FIG. 2 has been presented with respect to a system for controlling focus or for determining degree-of-focus. The system is also useful for determining (e.g., based on the relative separation of the reflected light beams), the working distance WD1 between the object 110 and the lens 118. In such embodiments, the focus detector 144 can function as a working distance detector and the distance separating the beam spots on the working distance detector can be used to determine the working distance between the object 110 and the lens 118.

In addition, as further described below, the system may be useful for determining a surface profile of the object 110 along one or more dimensions of the object. For example, by determining the variation in the relative separation of the reflected light beams along different locations of the object, variations in the working distance between the object 110 and the lens 118 along an imaging direction may be determined, and this may be mapped to the object height (i.e., in the z direction) along an imaging direction. In particular implementations, further described below, the optical assembly 106 is configured to direct multiple pairs (e.g., at least two pairs) of light beams along different locations of the object surface that are scanned. Based on the relative separation of each of the pairs of light beams, and a distance between different pairs of light beams, a surface profile of the object may be determined in one or more dimensions. Given knowledge of the surface profile of the object, the optical imaging system 100, via stage controller 115, may actively orient an area of interest of object 100 within the FP by rotating the object holder 102 about the X-axis, the Y-axis, and/or the Z-axis.

As such, the systems and methods described herein may be used for controlling focus or determining degree-of-focus, determining the working distance between an object and a lens, determining a surface profile of an object, and/or linearly or rotationally orienting a holder holding an imaged object to keep the object in focus.

In one embodiment, during operation, the excitation light source 114 directs input light (not shown) onto the object 110 to excite fluorescently-labeled biological or chemical substances. The labels of the biological or chemical substances provide light signals 140 (also called light emissions) having predetermined wavelength(s). The light signals 140 are received by the lens 118 and then directed by other optical components of the optical assembly 106 to at least one object detector 142. Although the illustrated embodiment only shows one object detector 142, the object detector 142 may comprise multiple detectors. For example, the object detector 142 may include a first detector configured to detect one or more wavelengths of light and a second detector configured to detect one or more different wavelengths of light. The optical assembly 106 may include a lens/filter assembly that directs different light signals along different optical paths toward the corresponding object detectors.

The object detector 142 communicates object data relating to the detected light signals 140 to the computing system 120. The computing system 120 may then record, process, analyze, and/or communicate the data to other users or computing systems, including remote computing systems through a communication line (e.g., Internet). By way of example, the object data may include imaging data that is processed to generate an image(s) of the object 110. The images may then be analyzed by the computing system and/or a user of the optical imaging system 100. In other embodiments, the object data may not only include light emissions from the biological or chemical substances, but may also include light that is at least one of reflected and refracted by the optical substrate or other components. For example, the light signals 140 may include light that has been reflected by encoded microparticles, such as holographically encoded optical identification elements.

In some embodiments, a single detector may provide both functions as described above with respect to the object and focus detectors 142 and 144. For example, a single detector may detect reflected light beam pairs (e.g., the reflected light beams 130B and 132B) and also light signals (e.g., the light signals 140).

The optical imaging system 100 may include a user interface 125 that interacts with the user through the computing system 120. For example, the user interface 125 may include a display (not shown) that shows and requests information from a user and a user input device (not shown) to receive user inputs.

The computing system 120 may include, among other things, an object analysis module 150 and a focus-control module 152. The focus-control module 152 is configured to receive focus data obtained by the focus detector 144. The focus data may include signals representative of the beam spots incident upon the focus detector 144. The data may be processed to determine relative separation (e.g., separation distance between the beam spots). A degree-of-focus of the optical imaging system 100 with respect to the object 110 may then be determined based upon the relative separation. In particular embodiments, the working distance WD1 between the object 110 and lens 118 can be determined. Likewise, the object analysis module 150 may receive object data obtained by the object detectors 142. The object analysis module may process or analyze the object data to generate images of the object.

Furthermore, the computing system 120 may include any processor-based or microprocessor-based system, including systems using microcontrollers, reduced instruction set computers (RISC), application specific integrated circuits (ASICs), field programmable gate array (FPGAs), logic circuits, and any other circuit or processor capable of executing functions described herein. The above examples are exemplary only, and are thus not intended to limit in any way the definition and/or meaning of the term system controller. In one embodiment, the computing system 120 executes a set of instructions that are stored in one or more storage elements, memories, or modules in order to at least one of obtain and analyze object data. Storage elements may be in the form of information sources or physical memory elements within the optical imaging system 100.

The set of instructions may include various commands that instruct the optical imaging system 100 to perform specific protocols. For example, the set of instructions may include various commands for performing assays and imaging the object 110, for linearly or rotationally moving the object holder 102, or for determining a surface profile of the object 110. The set of instructions may be in the form of a software program.

As described above, the excitation light source 114 generates an excitation light that is directed onto the object 110. The excitation light source 114 may generate one or more laser beams at one or more predetermined excitation wavelengths. The light may be moved in a raster pattern across portions of the object 110, such as groups in columns and rows of the object 110. Alternatively, the excitation light may illuminate one or more entire regions of the object 110 at one time and serially stop through the regions in a "step and shoot" scanning pattern.

In some implementations, excitation light source 114 utilizes line scanning to image a sample. For example, the excitation light source 114 may be implemented as part of a line generation module including one or more light sources operating at one or more wavelengths, and a beam shaping optics aligned at a predetermined angle to each light source. The beam shaping optics may be used to provides uniform line illumination at a desired aspect ratio. In a particular implementation, the line generation module is implemented as part of a two-channel imaging system including a first light source operating at a first wavelength, and a second light source operating at a second wavelength. For example, the first wavelength may be a "green" wavelength (e.g., from about 520 to 565 nm), and the second wavelength may be a "red" wavelength (e.g., from about 625 to 740 nm). Such a line scanning system may be utilized in conjunction with a TDI sensor.

The object 110 produces the light signals 140, which may include light emissions generated in response to illumination of a label in the object 110 and/or light that has been reflected or refracted by an optical substrate of the object 110. Alternatively, the light signals 140 may be generated, without illumination, based entirely on emission properties of a material within the object 110 (e.g., a radioactive or chemiluminescent component in the object).

The object and focus detectors 142 and 144 may be, for example photodiodes or cameras. In some embodiments herein, the detectors 142 and 144 may comprise a charge-coupled device (CCD) camera (e.g., a time delay integration (TDI) CCD camera), which can interact with various filters. The camera is not limited to a CCD camera and other cameras and image sensor technologies can be used. In particular embodiments, the camera sensor may have a pixel size between about 1 and about 15 μm.

Figure 3:
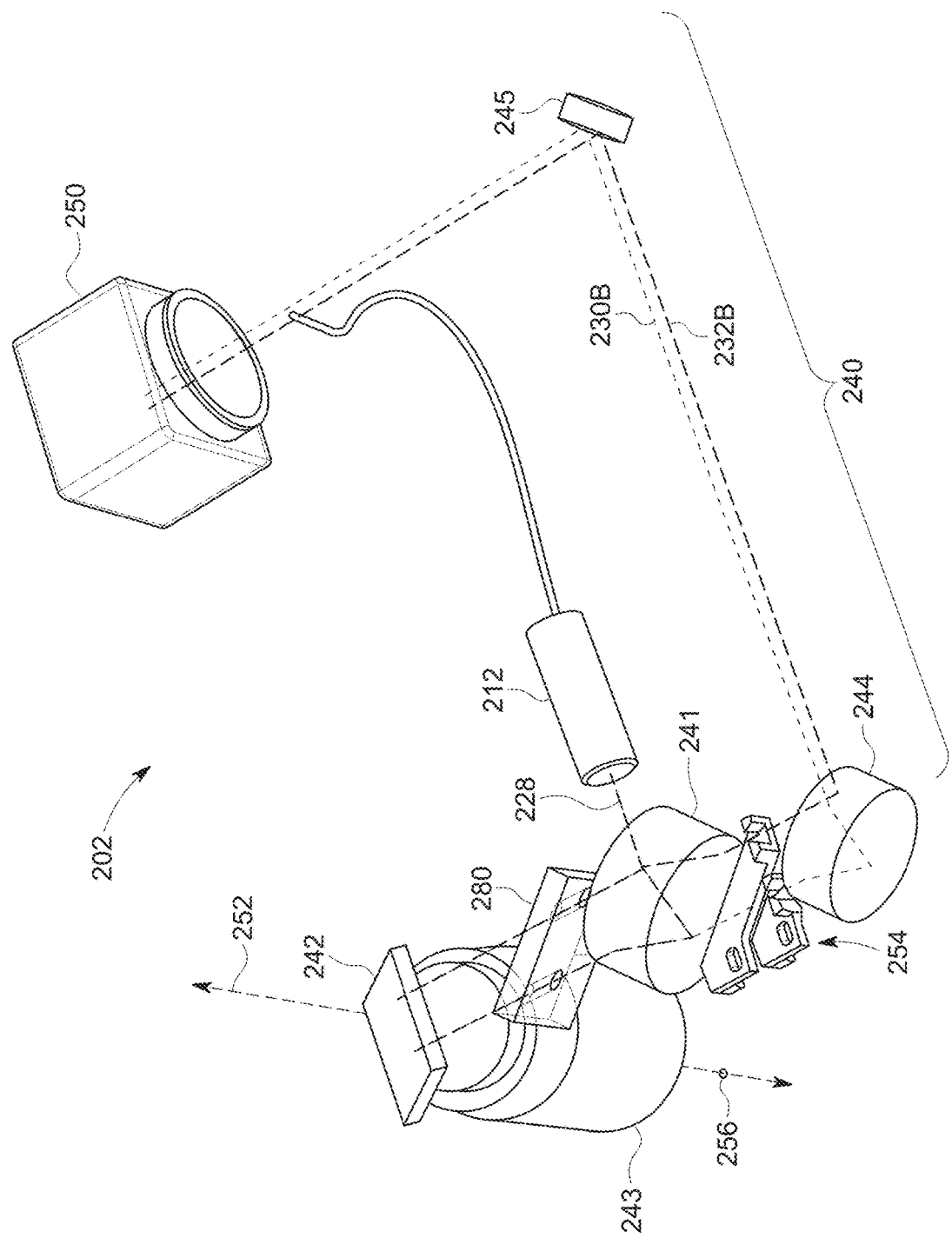
FIG. 3 is a perspective view of an optical assembly that may be used with the optical system shown in FIG. 2, in accordance with some implementations of the disclosure.
Figure 4:
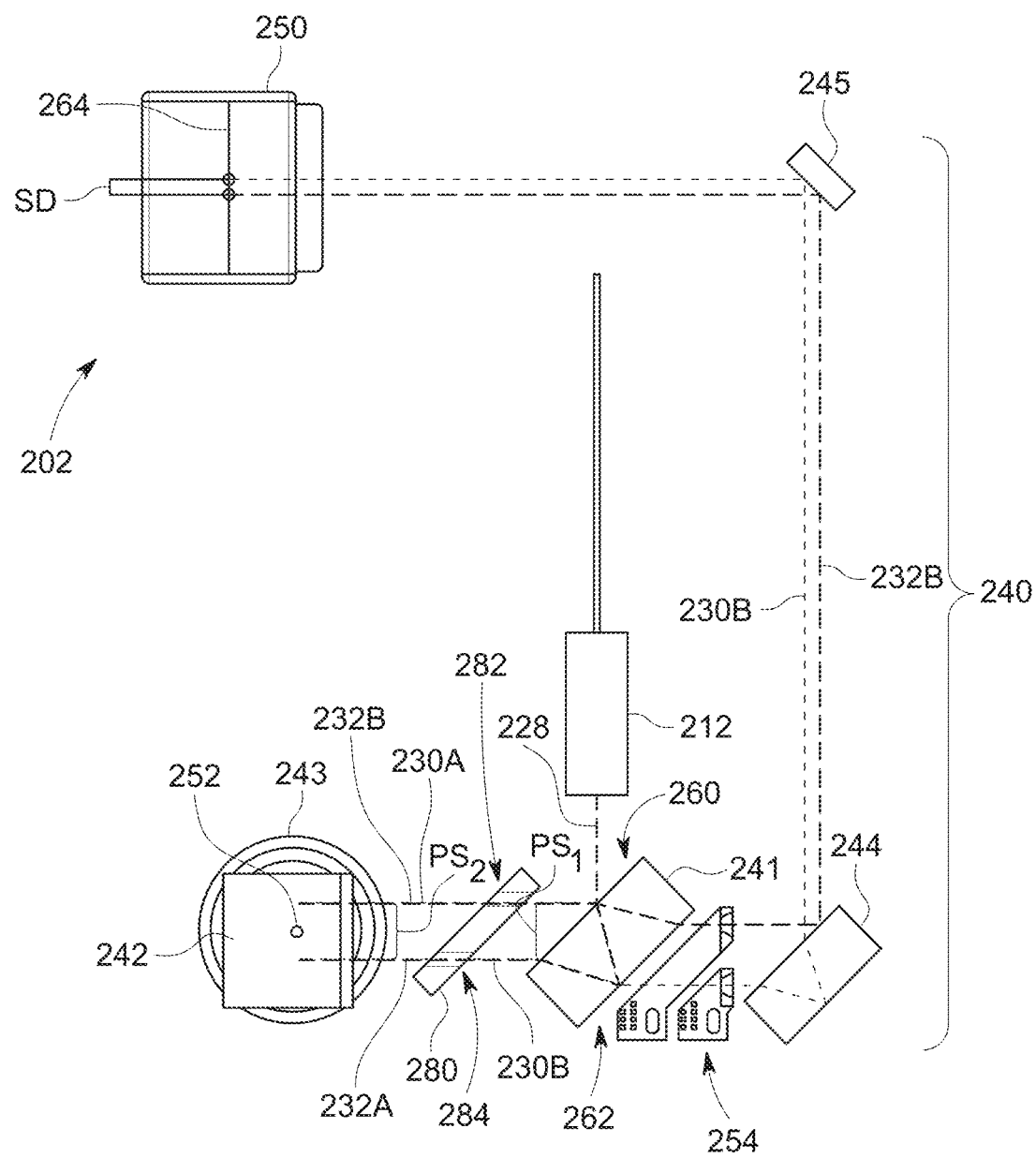
FIG. 4 is a plan view of the optical assembly shown in FIG. 3.

FIGS. 3 and 4 illustrate perspective and plan views of an optical assembly 202 formed in accordance with one embodiment. The optical assembly 202 may be used with optical imaging system 100 (FIG. 2) or other optical imaging systems. As shown, the optical assembly 202 includes an optical train 240 of optical components 241-245 that direct light beams 230 and 232 along an optical track or course between an object of interest (not shown) and a focus detector 250. In some embodiments, the focus detector can also be referred to as a distance detector. The series of optical components 241-245 of the optical train 240 include a dual-beam generator 241, a beam splitter 242, a conjugate lens 243, a beam combiner 244, and a fold mirror 245.

The optical assembly 202 includes a reference light source 212 that provides a light beam 228 to the dual-beam generator 241. The reference light source 212 may emit light having a wavelength between about 620 nm and 700 nm. For example, the reference light source may be a 660 nm laser. The dual-beam generator 241 provides a pair of parallel incident light beams 230A and 232A and directs the incident light beams 230A and 232A toward the beam splitter 242. In the illustrated embodiment, the dual-beam generator 241 comprises a single body having opposite parallel surfaces 260 and 262 (FIG. 4). The first surface 260 reflects a portion of the light beam 228 that forms the incident light beam 230A and refracts a portion of the light beam 228. The refracted portion of the light beam 228 is reflected by the opposite second surface 262 toward the first surface 260, which forms the incident light beam 232A.

The dual-beam generator 241 directs the parallel incident light beams 230A and 232A toward the beam splitter 242. The beam splitter 242 reflects the incident light beams 230A and 232A toward the conjugate lens 243. In this example, the beam splitter 242 includes a pair of reflectors (e.g., aluminized tabs) that are positioned to reflect the incident light beams 230A and 232A and the reflected light beams 230B and 232B. The beam splitter 242 is positioned to reflect the incident light beams 230A and 232A so that the incident light beams 230A and 232A propagate parallel to an optical axis 252 of the lens 243. The optical axis 252 extends through a center of the lens 243 and intersects a focal region 256. The lens 243 may be a near-infinity conjugated objective lens. Alternatively, the incident light beams 230A and 232A may propagate in a non-parallel manner with respect to the optical axis 252. Also shown in FIG. 4, the incident light beams 230A and 232A may be equally spaced apart from the optical axis 252 as the incident light beams 230A and 232A propagate through the lens 243.

As described above with respect to the optical imaging system 100, the incident light beams 230A and 232A may converge toward the focal region 256 and are reflected by an object 268 (shown in FIG. 5) located proximate to the focal region 256 and return to and propagate through the lens 243 as reflected light beams 230B and 232B. The reflected light beams 230B and 232B may propagate along a substantially equal or overlapping optical path with respect to the incident light beams 232A and 230A, respectively, through the lens 243 and toward the dual-beam generator 241. More specifically, the reflected light beam 230B propagates in an opposite direction along substantially the same optical path of the incident light beam 232A, and the reflected light beam 232B propagates in an opposite direction along substantially the same optical path of the incident light beam 230A. The reflected light beams 230B and 232B exit the lens 243 separated by a path spacing PS2 that is substantially equal to a path spacing PS1 that separates the incident light beams 230A and 232A (shown in FIG. 4).

As shown in FIGS. 3 and 4, the reflected light beams 230B and 232B are incident upon and directed by the dual-beam generator 241 through a range limiter 254 toward the beam combiner 244. In the illustrated embodiment, the beam combiner 244 is configured to modify the path spacing PS that separates the reflected light beams 230B and 232B. The path spacing PS at the beam combiner 244 may be re-scaled to be substantially equal to a separation distance SD1 of the reflected light beams 230B and 232B detected by the focus detector 250. The separation distance SD1 is a distance measured between the reflected light beams at a predetermined portion of the optical track, such as at the focus detector 250. In some embodiments, the separation distance SD1 at the focus detector 250 is less than the path spacing PS at the beam combiner 244 so that only a single focus detector 250 may detect both reflected light beams 230B and 232B. Furthermore, the beam combiner 244 may substantially equalize the optical path lengths of the reflected light beams 230B and 232B.

The reflected light beams 230B and 232B propagate substantially parallel to each other between optical components after exiting the lens 243. In the illustrated embodiment, the reflected light beams 230B and 232B propagate substantially parallel to each other along the optical track between the lens 243 and the focus detector 250. As used herein, two light beams propagate "substantially parallel" to one another if the two light beams are essentially co-planar and, if allowed to propagate infinitely, would not intersect each other or converge/diverge with respect to each other at a slow rate. For instance, two light beams are substantially parallel if an angle of intersection is less than 20° or, more particularly, less than 10° or even more particularly less than 1°. For instance, the reflected light beams 230B and 232B may propagate substantially parallel to each other between the beam splitter 242 and the dual-beam generator 241; between the dual-beam generator 241 and the beam combiner 244; between the beam combiner 244 and the fold mirror 245; and between the fold mirror 245 and the focus detector 250.

The optical train 240 may be configured to maintain a projection relationship between the reflected light beams 230B and 232B throughout the optical track so that a degree-of-focus may be determined. By way of example, if the optical assembly 202 is in focus with the object, the reflected light beams 230B and 232B will propagate parallel to each other between each optical component in the optical train 240. If the optical assembly 202 is not in focus with the object, the reflected light beams 230B and 232B are co-planar, but propagate at slight angles with respect to each other. For example, the reflected light beams 230B and 232B may diverge from each other or converge toward each other as the reflected light beams 230B and 232B travel along the optical track to the focus detector 250.

To this end, each optical component 241-245 may have one or more surfaces that are shaped and oriented to at least one of reflect and refract the reflected light beams 230B and 232B so that the reflected light beams 230B and 232B maintain the projection relationship between the reflected light beams 230B and 232B. For example, the optical components 242 and 245 have a planar surface that reflects both of the incident light beams 230B and 232B. The optical components 241 and 244 may also have parallel surfaces that each reflects one of the incident light beams 230B and 232B. Accordingly, if the reflected light beams 230B and 232B are parallel, the reflected light beams 230B and 232B will remain parallel to each other after exiting each optical component. If the reflected light beams 230B and 232B are converging or diverging toward each other at certain rate, the reflected light beams 230B and 232B will be converging or diverging toward each other at the same rate after exiting each optical component. Accordingly, the optical components along the optical track may include a planar surface that reflects at least one of the reflected light beams or a pair of parallel surfaces where each surface reflects a corresponding one of the reflected light beams.

An optical imaging system can include one or more optical assemblies as discussed above for determination of a working distance or focus. For example, an optical imaging system can include two optical assemblies of the type shown in FIGS. 3 and 4 to allow focus to be determined at two different positions on an object or to provide for determination of the working distance between the optical imaging system and the object at two different positions. For embodiments, in which more than one optical assembly is present, the optical assemblies can be discrete and separate or the optical assemblies can share optical components. The optical assemblies can share optical components such as reference light source 212, focus detector 250, fold mirror 245, beam combiner 244, dual-beam generator 241, beam splitter 242, epi-fluorescent (EPI) input reflector 280 and range limiter 254. Optical components can be shared by placing a beam splitter upstream of the shared components in the optical train. Although exemplified for the optical assembly shown in FIGS. 3 and 4, one or more versions of other optical assemblies that are exemplified herein can be present in a particular optical imaging system. Furthermore, a particular optical imaging system can include various combinations of the optical assemblies set forth herein.

As shown in FIG. 4, the reflected light beams 230B and 232B are ultimately incident upon a detector surface 264 of the focus detector 250 at corresponding beam spots. The beam spots are spaced apart by a separation distance SD1. The separation distance SD1 may indicate whether the optical assembly 202 has a sufficient degree-of-focus with respect to the object. The separation distance SD1 on the detector surface 264 may also indicate a working distance between lens 243 and the object being imaged.

In other embodiments, the optical components 241-245 may be substituted with alternative optical components that perform substantially the same function as described above. For example, the beam splitter 242 may be replaced with a prism that directs the incident light beams 230A and 232A through the lens 243 parallel to the optical axis 252. The beam combiner 244 may not be used or may be replaced with an optical flat that does not affect the path spacing of the reflected light beams. Furthermore, the optical components 241-245 may have different sizes and shapes and be arranged in different configurations or orientations as desired. For example, the optical train 240 of the optical assembly 202 may be configured for a compact design.

Furthermore, in alternative embodiments, the parallel light beams may be provided without the dual-beam generator 241. For example, a reference light source 212 may include a pair of light sources that are configured to provide parallel incident light beams. In alternative embodiments, the focus detector 250 may include two focus detectors arranged side-by-side in fixed, known positions with respect to each other. Each focus detector may detect a separate reflected light beam. Relative separation between the reflected light beams may be determined based on the positions of the beam spots with the respective focus detectors and the relative position of the focus detectors with respect to each other.

Although not illustrated in FIGS. 3 and 4, the optical assembly 202 may also be configured to facilitate collecting output light that is projected from the object 268. For example, the optical assembly 202 may include an epi-fluorescent (EPI) input reflector 280 that is positioned to reflect incident light that is provided by an excitation light source (not shown). The light may be directed toward the beam splitter 242 that reflects at least a portion of the excitation light and directs the light along the optical axis 252 through the lens 243. The lens 243 directs the light onto the object 268, which may provide the output light. The lens 243 then receives the output light (e.g., light emissions) from the object 268 and direct the output light back toward the beam splitter 242. The beam splitter 242 may permit a portion of the output light to propagate therethrough along the optical axis. The output light may then be detected by an object detector (not show).

As shown in FIG. 4, the EPI input reflector 280 includes two passages 282 and 284 that allow the light beams 230 and 232 to propagate therethrough without being affected by the input reflector 280. Accordingly, the beam splitter 242 may reflect the incident and reflected light beams 230A, 230B, 232A, and 232B and may also reflect the excitation light.

FIGS. 5-8 show different projection relationships between reflected light beams 230B and 232B and corresponding beam spots 270 and 272 on the detector surface 264. As discussed above, the projection relationship between the reflected light beams is based upon where the object is located in relation to the focal region. When the object is moved with respect to the focal region, the projection relationship between the reflected light beams changes and, consequently, the relative separation between the reflected light beams also changes. FIGS. 5-8 illustrate how a separation distance SD measured between beam spots may change as the projection relationship between the reflected light beams change. However, the separation distance SD is just one manner of determining relative separation between the reflected light beams. Accordingly, those skilled in the art understand that FIGS. 5-8 illustrate only one manner of determining the relative separation and that other manners for determining relative separation or the projection relationship are possible.

Figure 5:
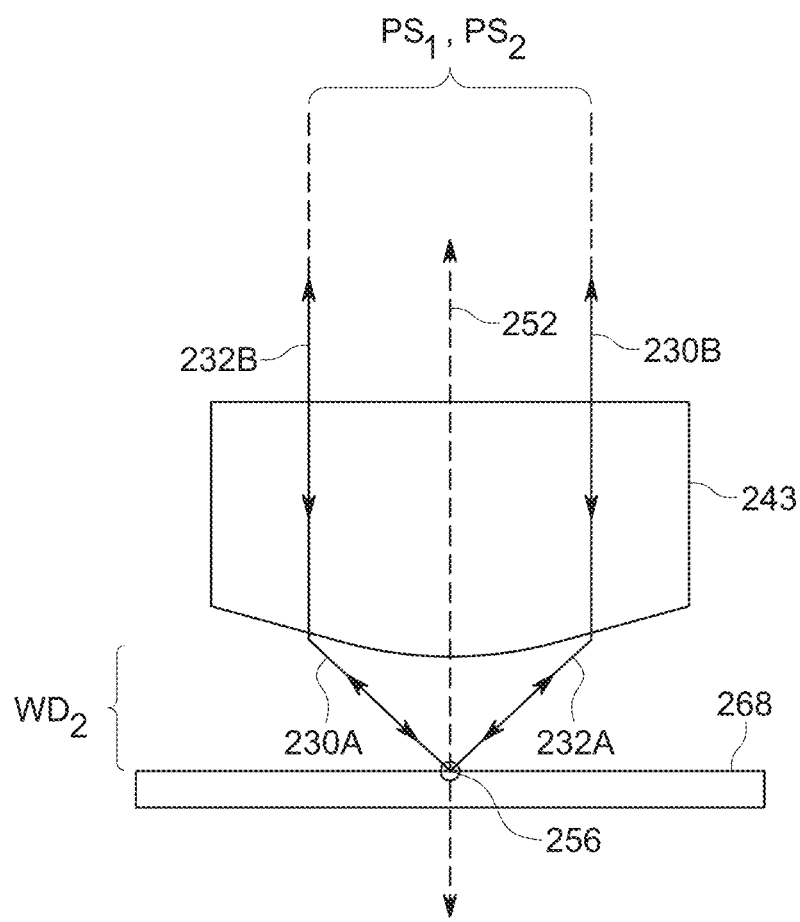
FIG. 5 illustrates incident and reflected light beams when the optical assembly shown in FIG. 3 is in focus with respect to an object.
Figure 6:
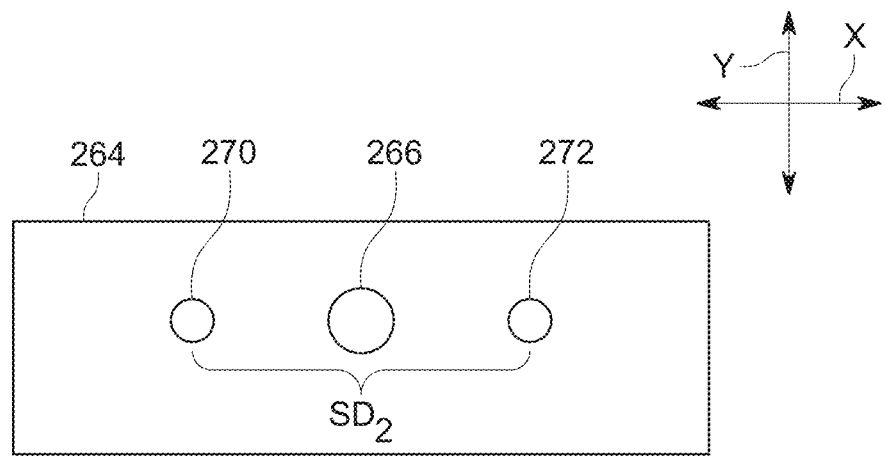
FIG. 6 illustrates beam spots on a detector surface that are provided by the reflected light beams shown in FIG. 5.

FIGS. 5-6 show a projection relationship between reflected light beams 230B and 232B when the optical assembly 202 (FIG. 3) is in focus with respect to an object 268. As shown, the incident light beams 230A and 232A propagate through the lens 243 parallel to each other and spaced apart by a path spacing PS1. In the illustrated embodiment, the incident light beams 230A and 232A propagate parallel to the optical axis 252 of the lens 243 and are equidistant from the optical axis 252. In alternative embodiments, the incident light beams 230A and 232A may propagate in a non-parallel manner with respect to the optical axis 252 and have different spacings therefrom. In a particular alternative embodiment, one of the incident light beams 230A or 232A coincides with the optical axis 252 of the lens 243 and the other is spaced apart from the optical axis 252.

The incident light beams 230A and 232A are directed by the lens 243 to converge toward the focal region 256. In such embodiments where the incident light beams are non-parallel to the optical axis, the focal region may have a different location than the location shown in FIG. 5. The incident light beams 230A and 232A are reflected by the object 268 and form the reflected light beams 230B and 232B. The reflected light beams 230B and 232B return to and propagate through the lens 243 and parallel to the optical axis 252. The reflected light beams 230B and 232B exit the lens 243 parallel to each other and spaced apart by a path spacing PS2. When the optical assembly 202 is in focus, the path spacings PS1 and PS2 are equal.

Accordingly, when the optical assembly 202 is in focus, the projection relationship of the reflected light beams 230B and 232B exiting the lens 243 includes two parallel light beams. The optical train 240 is configured to maintain the parallel projection relationship. For example, when the optical assembly 202 is in focus, the reflected light beams 230B and 232B are parallel to each other when exiting the dual-beam generator 241, when exiting the beam combiner 244, and when reflected by the fold mirror 245. Although the projection relationship is maintained, the path spacing PS2 may be re-scaled by a beam combiner.

As shown in FIG. 6, the reflected light beams 230B and 232B of FIG. 5 are incident upon the detector surface 264 and form the beam spots 270 and 272. When the optical assembly 202 is in focus, the beam spots 270 and 272 have a separation distance SD2. The separation distance SD2 can be based upon (or a function of) dimensions of the beam combiner 244 and an angle of incidence with respect to the parallel surfaces of the beam combiner 244 and the impinging reflected light beams 230B and 232B. The separation distance SD2 is also based upon the projection relationship of the reflected light beams 230B and 232B exiting the lens 243. As shown in FIG. 6, the detector surface 264 has a center point or region 266. If all of the optical components 241-245 (FIG. 3) of the optical train 240 are in respective desired positions, the beam spots 270 and 272 may be equally spaced apart from the center region 266 along an X-axis and vertically centered within the detector surface 264. Also shown, the beam spots 270 and 272 may have a select morphology that is correlated with the optical assembly 202 being in focus. For example, the beam spots 270 and 272 may have an airy radius that correlates to the optical assembly 202 being in focus.

Figure 7:
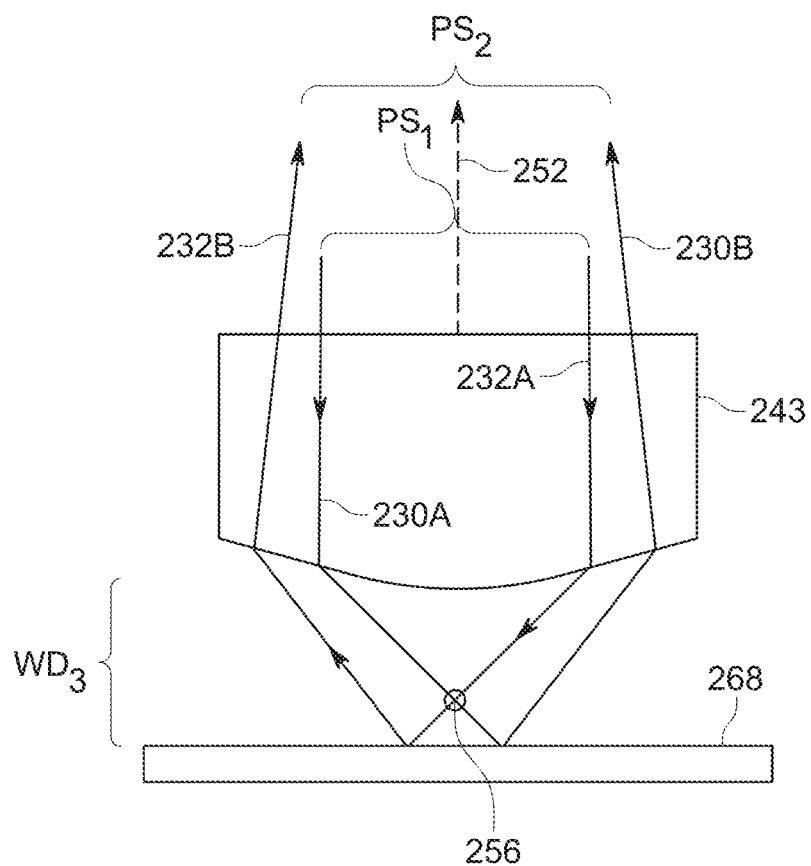
FIG. 7 illustrates incident and reflected light beams when the optical assembly shown in FIG. 3 is below focus.
Figure 8:
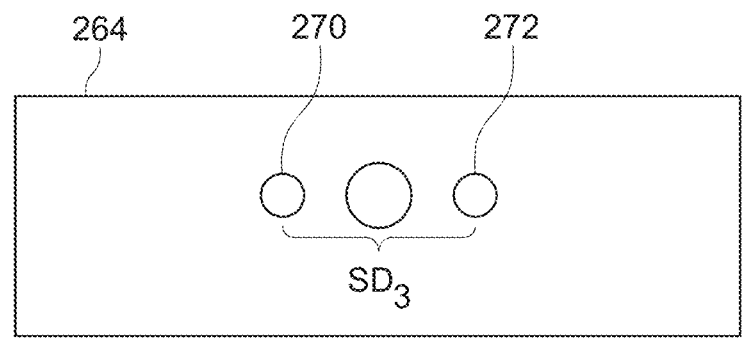
FIG. 8 illustrates beam spots on a detector surface that are provided by the reflected light beams shown in FIG. 7.

FIGS. 7-8 show a projection relationship between the reflected light beams 230B and 232B when the optical assembly 202 (FIG. 3) is below focus. As described above, the incident light beams 230A and 232A propagate through the lens 243 parallel to each other and spaced apart by the path spacing PS1. The incident light beams 230A and 232A intersect each other at the focal region 256 and are then reflected by the object 268 to form the reflected light beams 230B and 232B. However, as shown in FIG. 7, when the reflected light beams 230B and 232B exit the lens 243, the reflected light beams 230B and 232B are slightly converging toward the optical axis 252 and each other. Also shown, the path spacing PS2 is greater than the path spacing PS1.

Accordingly, when the object 268 is located below the focal region 256, the projection relationship of the reflected light beams 230B and 232B includes two light beams that converge toward each other. Similar to above, the optical train 240 is configured to maintain the converging projection relationship. For example, the reflected light beams 230B and 232B are converging toward each other when exiting the dual-beam generator 241, when exiting the beam combiner 244, and when reflected by the fold mirror 245.

As shown in FIG. 8, when the object 268 is located below the focal region 256, the beam spots 270 and 272 have a separation distance SD3 that is less than the separation distance SD2 (FIG. 6). The separation distance SD3 is less because the reflected light beams 130B and 132B converge toward each other throughout the optical track between the lens 243 and the focus detector 250. Also shown in FIG. 8, the beam spots 270 and 272 may have a select morphology that is correlated with the beam spots 270 and 272. The morphology of the beam spots 270 and 272 when the object 268 is located below the focal region 256 is different than the morphology of the beam spots 270 and 272 when the object 268 is in focus. The beam spots 270 and 272 may have a different airy radius that correlates to the object being below the focal region 256.

Figure 9:
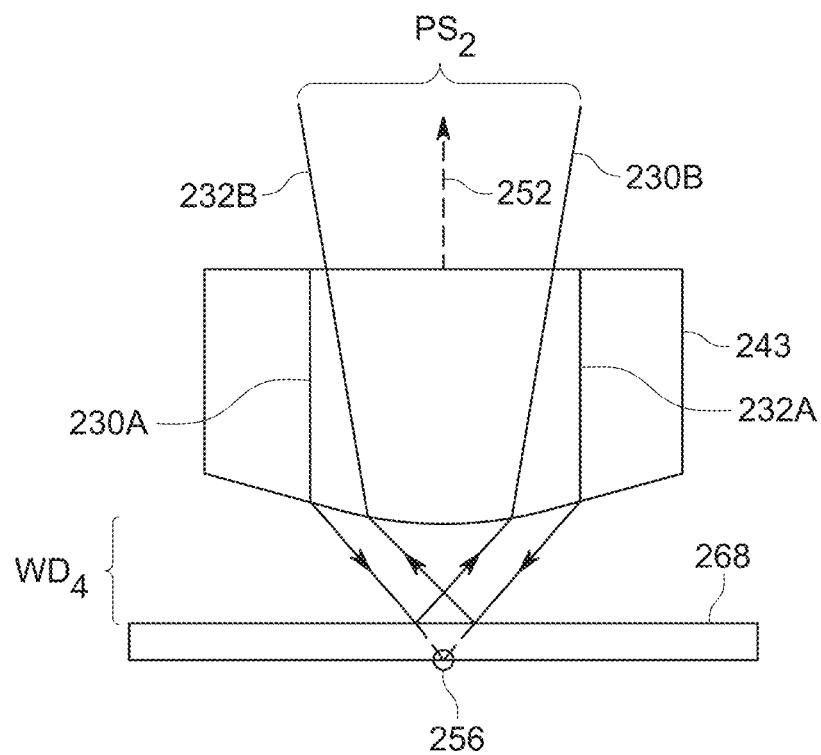
FIG. 9 illustrates incident and reflected light beams when the optical assembly shown in FIG. 3 is above focus.
Figure 10:
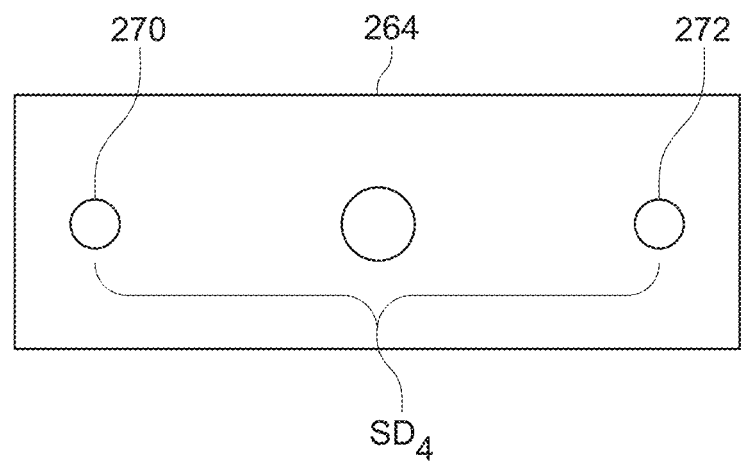
FIG. 10 illustrates beam spots on a detector surface that are provided by the reflected light beams shown in FIG. 9.

FIGS. 9-10 show a projection relationship between the reflected light beams 230B and 232B when the optical assembly 202 (FIG. 3) is above focus. As described above, the incident light beams 230A and 232A propagate through the lens 243 parallel to each other and spaced apart by the path spacing PS1. Before the incident light beams 230A and 232A reach the focal region 256, the incident light beams 230A and 232A are reflected by the object 268 to form the reflected light beams 230B and 232B. However, as shown in FIG. 9, when the reflected light beams 230B and 232B exit the lens 243, the reflected light beams 230B and 232B diverge away from the optical axis 252 and away from each other. Also shown, the path spacing PS2 is less than the path spacing PS1.

Accordingly, when the object 268 is located above the focal region 256, the projection relationship of the reflected light beams 230B and 232B includes two light beams that diverge away from each other. The optical train 240 is configured to maintain the diverging projection relationship. For example, the reflected light beams 230B and 232B are diverging away from each other when exiting the dual-beam generator 241, when exiting the beam combiner 244, and when reflected by the fold mirror 245.

As shown in FIG. 10, when the object 268 is located above the focal region 256, the beam spots 270 and 272 have a separation distance SD4 that is greater than the separation distance SD2. The separation distance SD4 is greater because the reflected light beams 130B and 132B diverge from each other throughout the optical track between the lens 243 and the focus detector 250. Also shown in FIG. 10, the beam spots 270 and 272 may have a select morphology that is correlated with the beam spots 270 and 272. The morphology of the beam spots 270 and 272 when the object 268 is located above the focal region 256 is different than the morphology of the beam spots 270 and 272 when the object 268 is in focus or below the focal region 256. Likewise, the beam spots 270 and 272 may have a different airy radius that correlates to the object being below the focal region 256.

As described above, if the object 268 is below the focal region 256, the separation distance SD3 is less than the separation distance SD2 in which the object 268 is within the focal region 256. If the object 268 is above the focal region 256, the separation distance SD4 is greater than the separation distance SD2. As such, the optical assembly 202 not only determines that the object 268 is not located within the focal region 256, but may also determine a direction to move the object 268 with respect to the lens 243. Furthermore, a value of the separation distance SD3 may be used to determine how far to move the object 268 with respect to the lens 243.

As illustrated by the examples of FIGS. 6-10, in addition to determining the object is at the focal region, a measurement of separation distance on a detector can be used to determine the working distance between the lens and an object that is being detected through the lens. Furthermore, the separation distance on the detector may be used to determine a profile of an object surface.

As the foregoing examples illustrate, relative separation (e.g., a separation distance) may be a function of the projection relationship (i.e., what rate the reflected light beams 230B and 232B are diverging or converging) and a length of the optical track measured from the lens 243 to the focus detector 250. As the optical track between the lens 243 and the focus detector 250 increases in length, the separation distance may decrease or increase if the object is not in focus. As such, the length of the optical track may be configured to facilitate distinguishing the separation distances SD3 and SD4. For example, the optical track may be configured so that converging reflected light beams do not cross each other and/or configured so that diverging light beams do not exceed a predetermined relative separation between each other. To this end, the optical track between optical components of the optical train 240 may be lengthened or shortened as desired.

As the foregoing examples also illustrate, the working distance between the lens and object being imaged (e.g., WD2 in FIG. 5, WD3 in FIG. 7, and WD4 in FIG. 9) may be determined based on the measurement of separation distance on a detector. Furthermore, this may be used to determine a profile of an object surface. For example, the optical system may record a relative separation for a series of data points and associate each data point with a position along the surface. When the working distance decreases (i.e., when the height of the object surface increases) the relative separation may increase as shown in FIG. 10. When the working distance increases (i.e., when the height of the object surface decreases) the relative separation may decrease as shown in FIG. 8. Accordingly, a surface profile or topography of the object may be determined based on the relative separation of the reflected beams.

Figure 11:
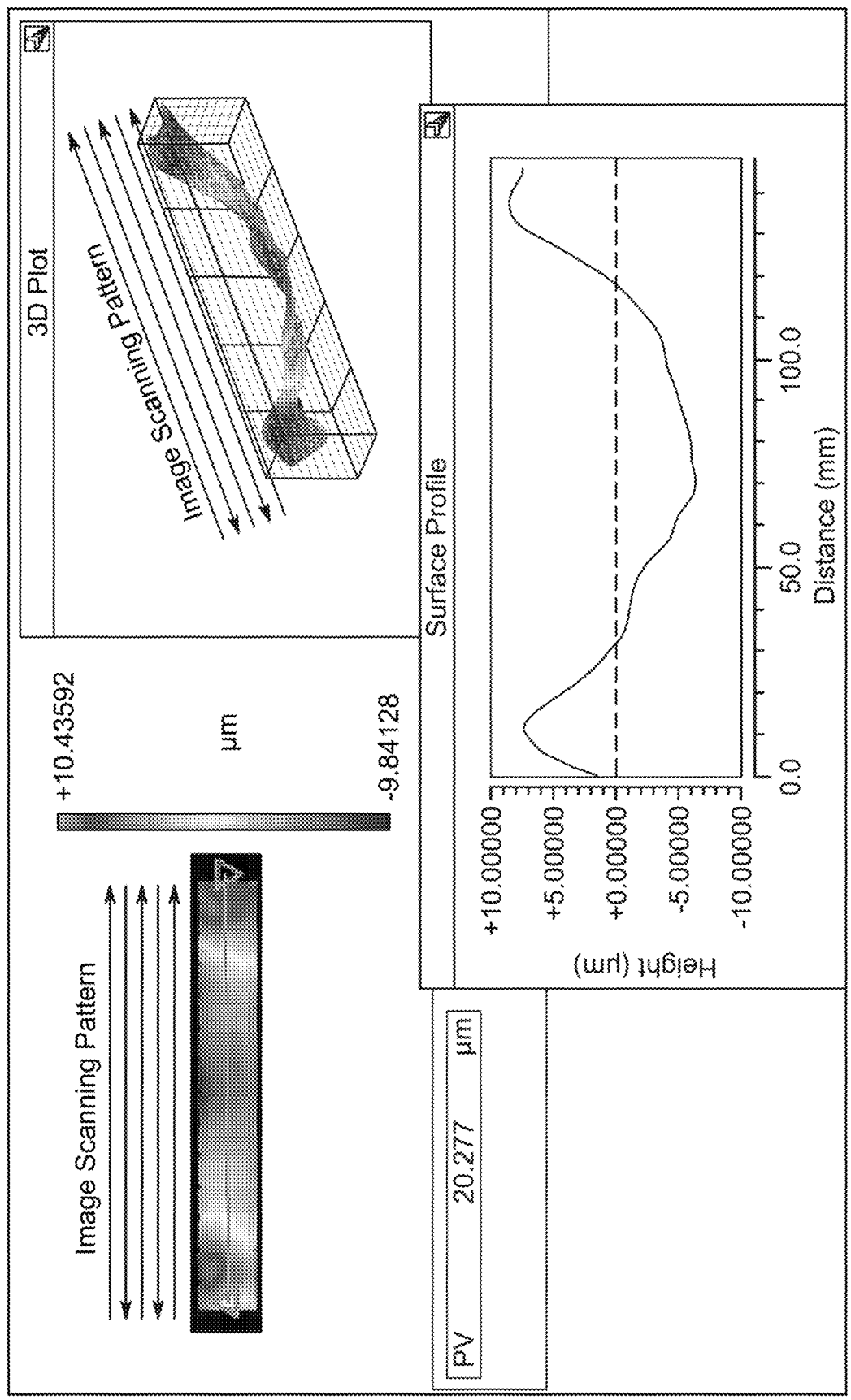
FIG. 11 shows a series of plots illustrating a surface profile of a flow cell sample scanned using a line scanning system, in accordance with some implementations of the disclosure.

As discussed above, a sample may have many variations in its topography along an imaging direction (e.g., scanning direction) that cannot be accounted by performing a single, global tilt of the sample prior to imaging. For example, FIG. 11 shows a series of plots illustrating a surface profile of a flow cell sample scanned using a line scanning system. As depicted, the surface profile of the flow cell may vary significantly (e.g., from about −10 μm to 10 μm) over the direction of scanning.

Figure 12:
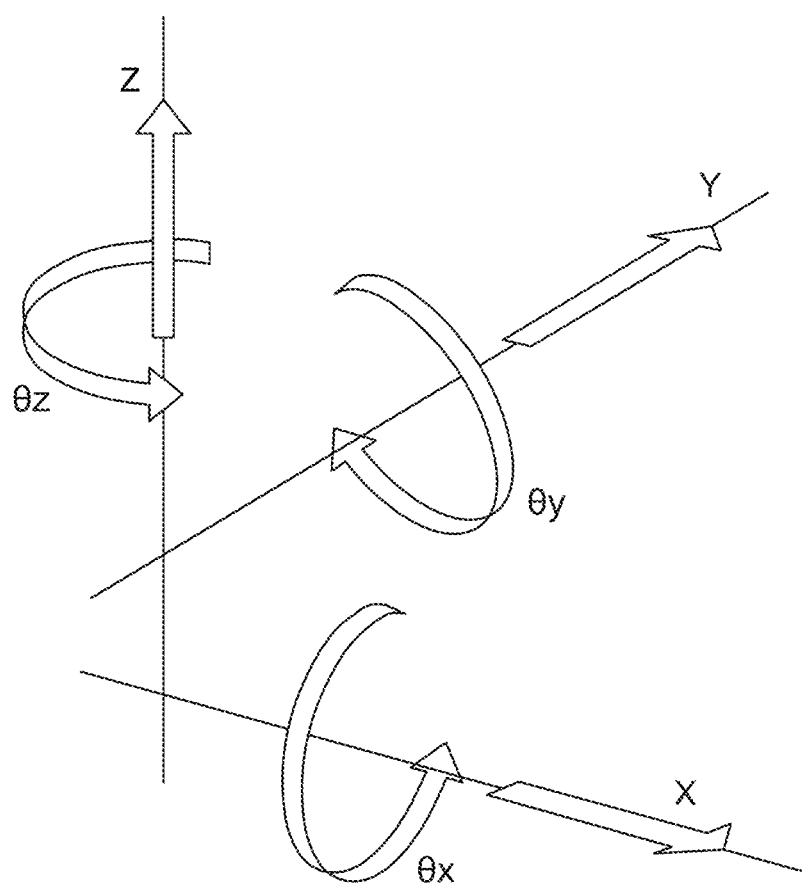
FIG. 12 shows a coordinate system that may be used when designing an assembly that dynamically moves a sample in a lateral and/or angular direction, in accordance with some implementations of the disclosure.

As also discussed above, to account for local changes in the topography of the sample, an optical imaging system may include a controller that, during imaging, is configured to dynamically move a sample holder in a lateral direction (along an X-axis and/or a Y-axis that extends into the page), in a vertical/elevational direction along a Z-axis, and/or in an angular direction about the X-axis (tip), Y-axis (tilt), and/or Z-axis (twist). To this end, it is instructive to consider a coordinate system that may be used when designing an assembly that dynamically moves a sample in a lateral and/or angular direction. FIG. 12 depicts one such example coordinate system. In this example, the z axis is aligned with the optical axis of the objective and may generally point upward to the sky. The y axis is the axis along which the sample may actively travel during imaging (e.g., during sequencing using a line scanner). For example, the sample may be a flow cell have flow cell lanes that are co-aligned with the Y axis. Any movements of the sample holder (and by extension, the sample) in an angular direction may be represented as twisting the sample holder about the z axis (e.g., a change in θz), tilting the sample holder about the y axis (e.g., a change in (y), or tipping the sample holder about the x axis (e.g., a change in θx).

Figure 13:
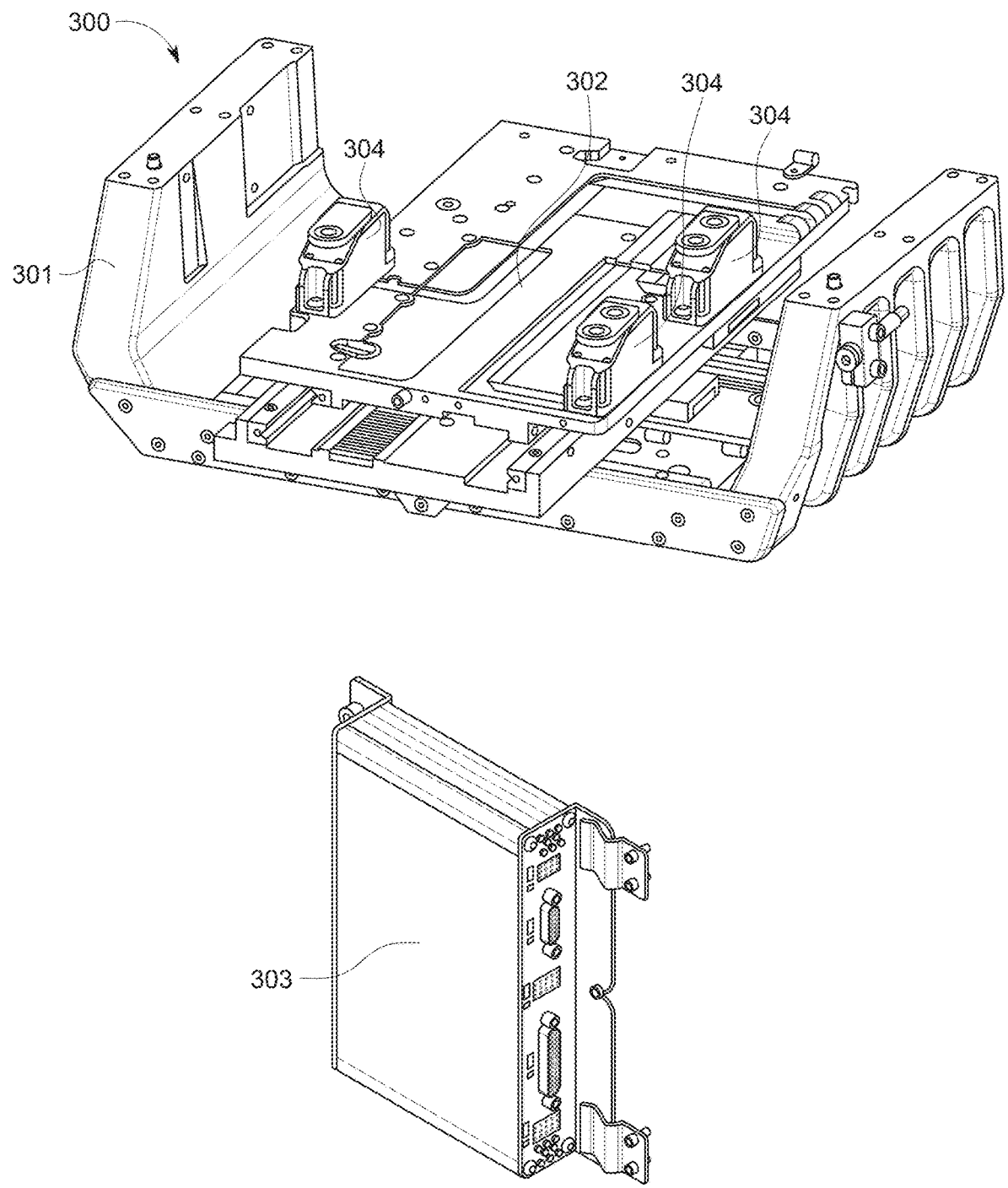
FIG. 13 shows a sample stage assembly configured to mount a movable platform containing a sample container, in accordance with some implementations of the disclosure.
Figure 14:
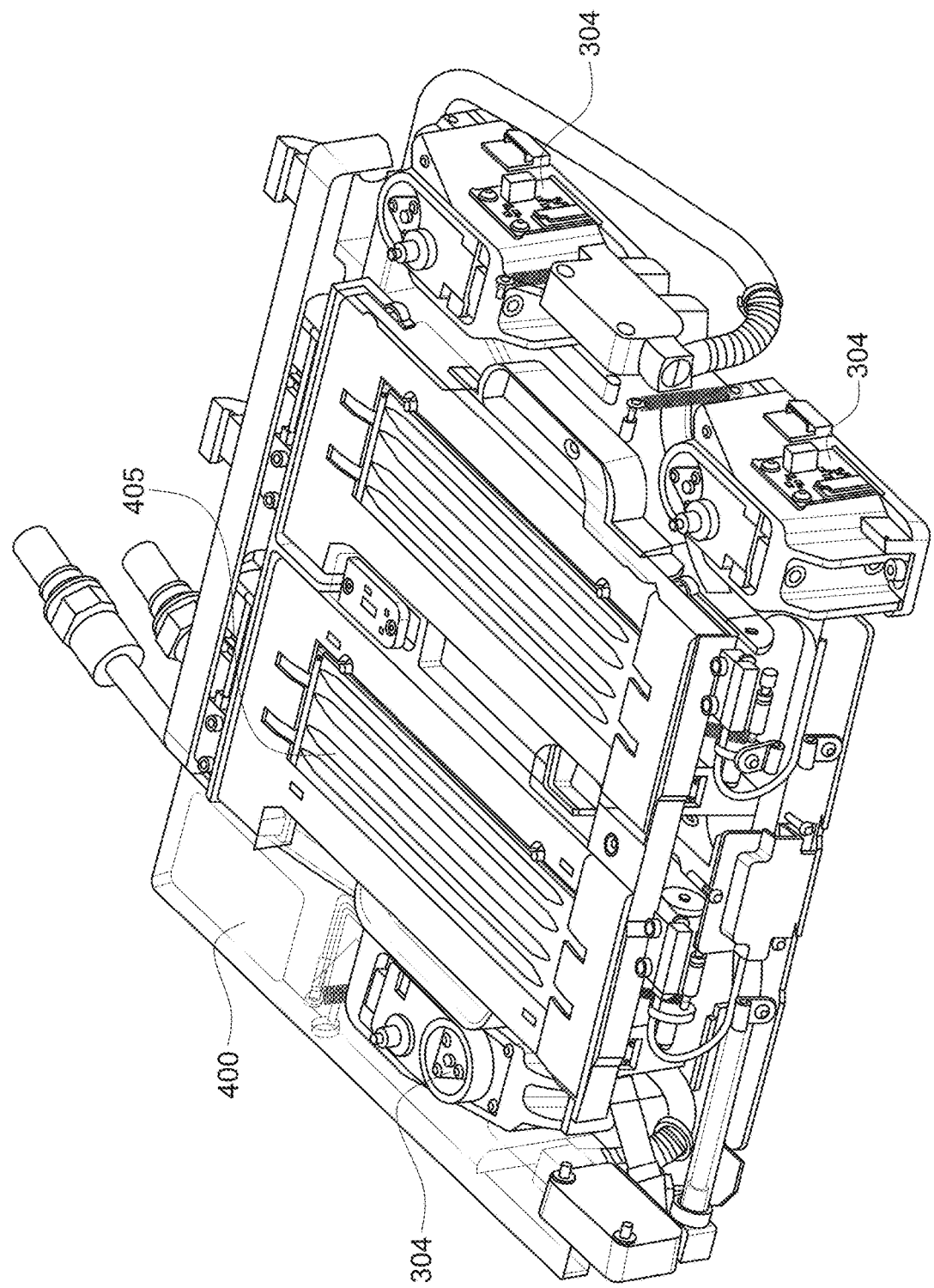
FIG. 14 depicts a movable platform mounted on actuators of a tip tilt assembly, in accordance with implementations of the disclosure.
Figure 15:
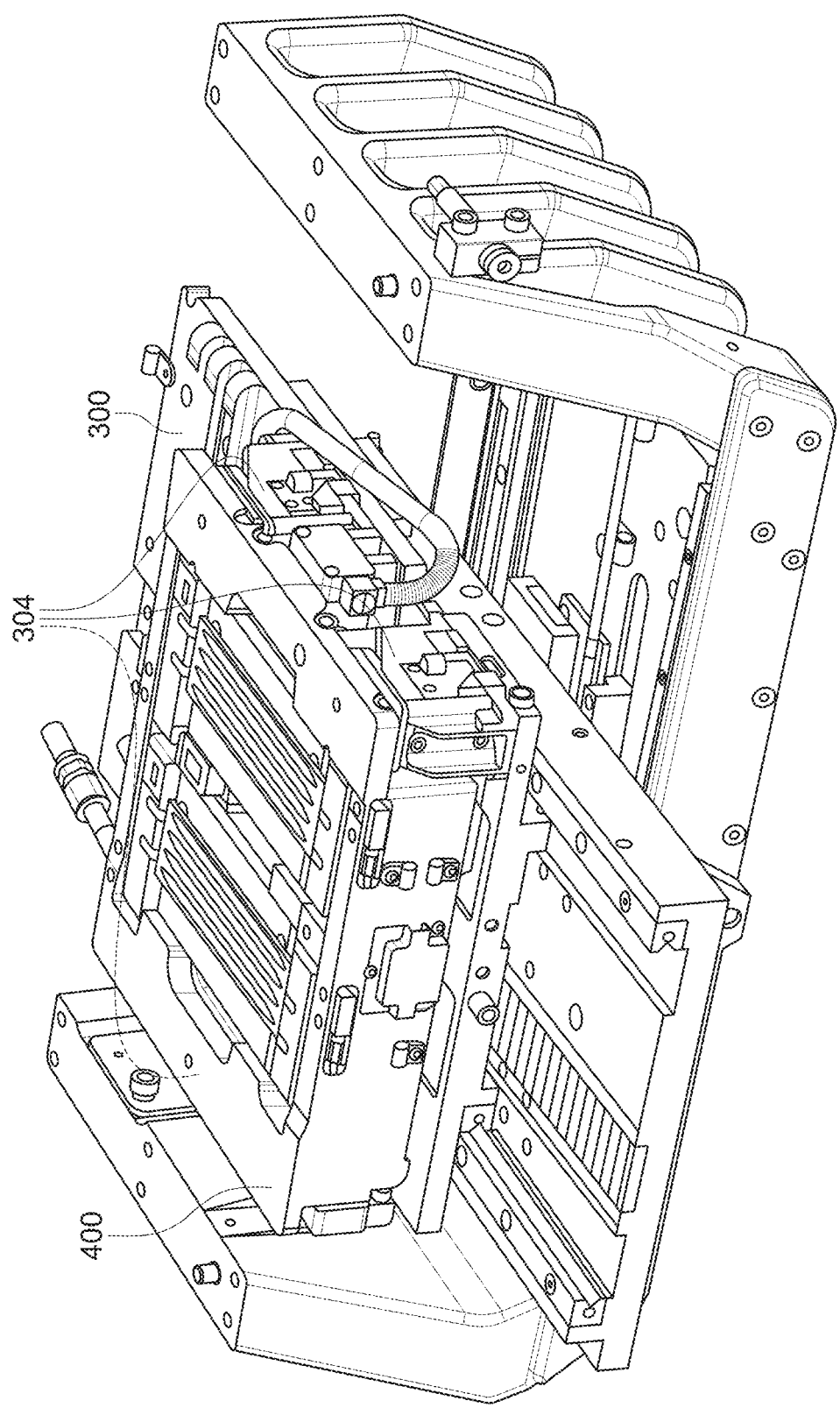
FIG. 15 depicts a movable platform on a sample stage assembly, in accordance with some implementations of the disclosure.

FIGS. 13-15 depict an example assembly that may enable dynamic adjustment of the lateral and angular position of a sample, in accordance with some implementations of the disclosure. FIG. 13 shows a sample stage assembly 300 configured to mount a movable platform containing an imaged sample (FIG. 14). As illustrated, the sample stage assembly 300 includes an XY cradle 301, an XY stage 302, a controller 303, and a tip tilt assembly (TTA) including multiple actuators 304. FIG. 14 depicts an example movable platform 400 mounted on the actuators 304 of the TTA. FIG. 15 depicts the movable platform 400 mounted on the sample stage assembly 300. The movable platform 400 includes a sample container 405, which in this example is a flow cell.

In this example, the XY stage 302 is configured to move a sample holder laterally along the X axis and the Y axis. The TTA is configured to control angular alignment of the sample holder to position the sample surface within a focal range of the optics of the imaging system. The TTA may affect all three axes of rotation as depicted with respect to FIG. 11. In some implementations, the TTA may actively control rotation about all three axes during imaging. In other implementations, the TTA may actively control rotation about only some axes during imaging. For instance, only rotation about the X and Y axes may be actively controlled during the course of imaging, and rotation about the Z axis may be adjusted manually on an as-needed basis.

Controller 303 may be configured to apply parameters for one or more drive signals that are applied to one or more actuators to linearly move XY stage 302 or angularly move moveable platform 400 for each imaging operation. Generally, for larger linear or rotational translations, a greater control output (e.g., one or more parameters such as larger drive current, larger voltage, and greater duty cycle) will be specified. Likewise, for smaller translations, a smaller control output (e.g., smaller drive current, lower voltage, and smaller duty cycle) will be specified. The control output can be adjusted, for example, by adjusting the current or voltage applied to the one or more actuators. Additionally, in some examples, the time at which the drive signal is applied to the one or more actuators can be adjusted based on the translation amount that is required for the change in focusing. For example, where the required translation is greater, the drive signal can be applied earlier. However, in other examples, the drive signal is applied as early as possible after the imaging is complete at the current sample location regardless of the difference in focus settings. The parameters of the drive signal, and the time at which the drive signal is applied, can be determined based on the actuator type (e.g., piezoelectric versus voice coil) and drive requirements. As such, drive signals can be supplied to one or more actuators at different output levels to linearly move, tilt, tip, or otherwise position the sample during imaging.

In this example, the TTA accomplishes OX and OY alignment through active manipulation of three linear actuators 304 whereby the sample holder lies on a movable platform 400 that is kinematically mounted to the three linear actuators 304. The actuators 304 may be spaced sufficiently apart such that relatively large displacements of these actuators can effect small changes in platform inclination. In some implementations, 3 point kinematic mount may utilize "3V coupling", also referred to as a "Maxwell Coupling." In other implementations, a 3-2-1 coupling may be utilized. Although angular alignment control via the use of a 3 point kinematic mount is illustrated in this example, it should be appreciated that other types or number of actuators, or other configurations of actuators, may be utilized to enable angular control to position a sample in focus.

Figure 16:
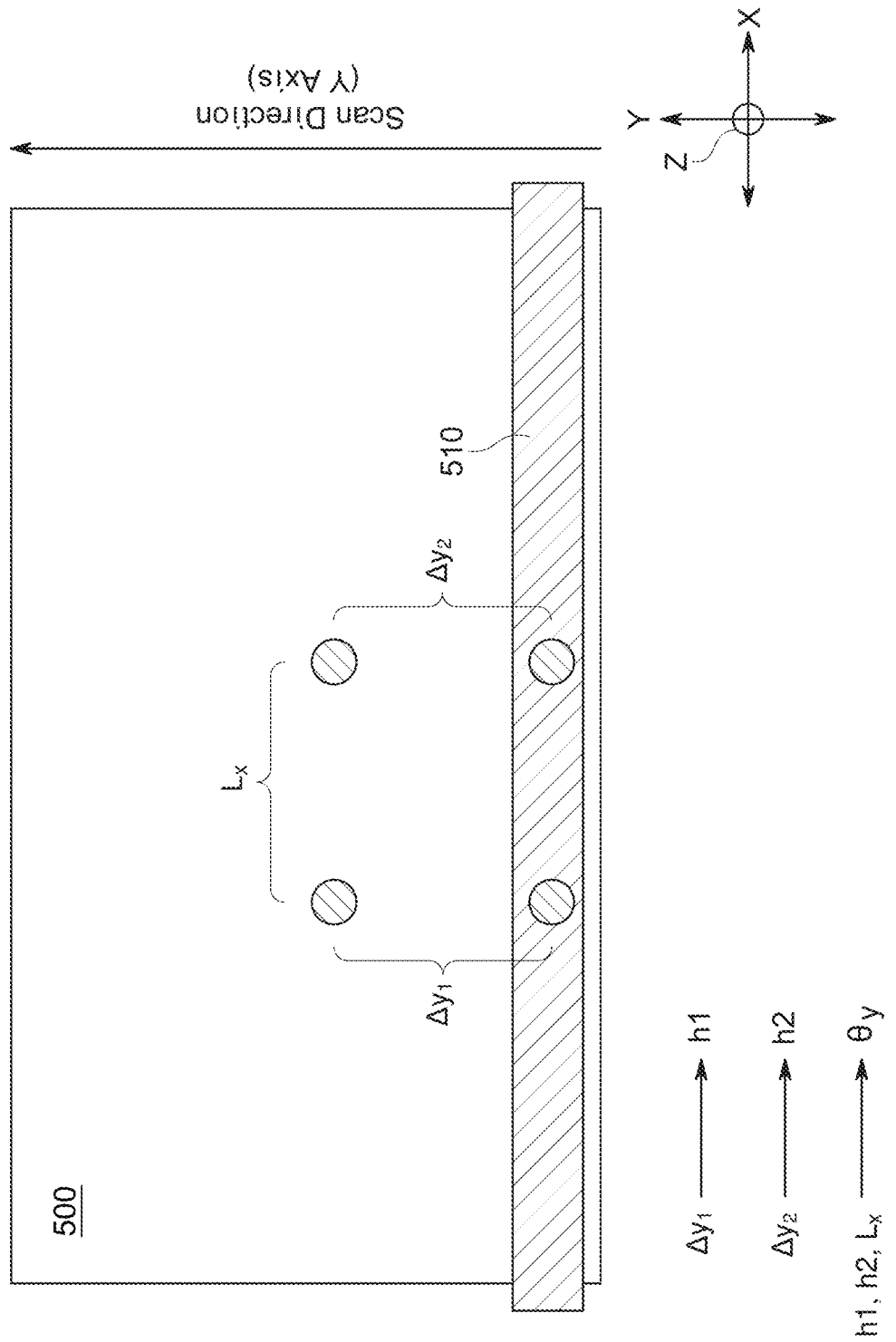
FIG. 16 depicts a process of utilizing two pairs of projected spot beams to determine tilt of a sample, in accordance with some implementations of the disclosure.

To enable dynamic tilting of a sample holder to keep a sample within focus during image scanning, there are different strategies that could potentially be adopted. In some embodiments, a feedback de-tilt mechanism may be adopted whereby tilt is measured in real-time during image scanning, and tilt measurements are directly fed into one or more tilt motor drivers corresponding to one or more tilt actuators (e.g., one or more tilt actuators 304). As described above, spot beam separation of a projected pair of spots of a focus tracking module may be mapped to a sample height position. The projected pair of spots may be generated using a light source having a wavelength between about 620 nm and 700 nm. By projecting two different pairs of spots along two different scanning positions (e.g., two different X positions), the sample height at two different positions may be measured, and mapped to a change in sample tilt between the two positions. For example, as depicted by FIG. 16, which shows scanning of a sample 500 using a line scan 510, the spot beam separation $\Delta y_1$ may be mapped to a first sample height h1, and the spot beam separation $\Delta y_2$ may be mapped to a second sample height h2. Based on the separation $L_x$ between the two pairs of spot beams, and the respective heights h1 and h2, the tilt angle of the sample between the two scanning points may be estimated (e.g., by calculating the slope between the two points). The determined tilt angle may be used by a system controller to cause one or more actuators to tilt a sample holder. In some implementations of this embodiment, to ensure that tilt is measured in advance of imaging of a sample section, the system may employ lookahead focus tracking beams that project at least one pair of spots in advance of the line scan reaching the sample section.

Although feedback-based tilting as described above could provide real-time tilt adjustment of a sample, any real-time feedback loop may be limited by the i) maximum speed at which the sample stage may be tilted, and ii) the latency in communicating the real-time measurements to the tilt controller. If local tilt varies more quickly than the combined latency of the maximum tilt speed and latency in communicating the real-time measurements to the tilt controller, any real-time feedback mechanism may experience latency that renders such a method inadequate.

Figure 17:
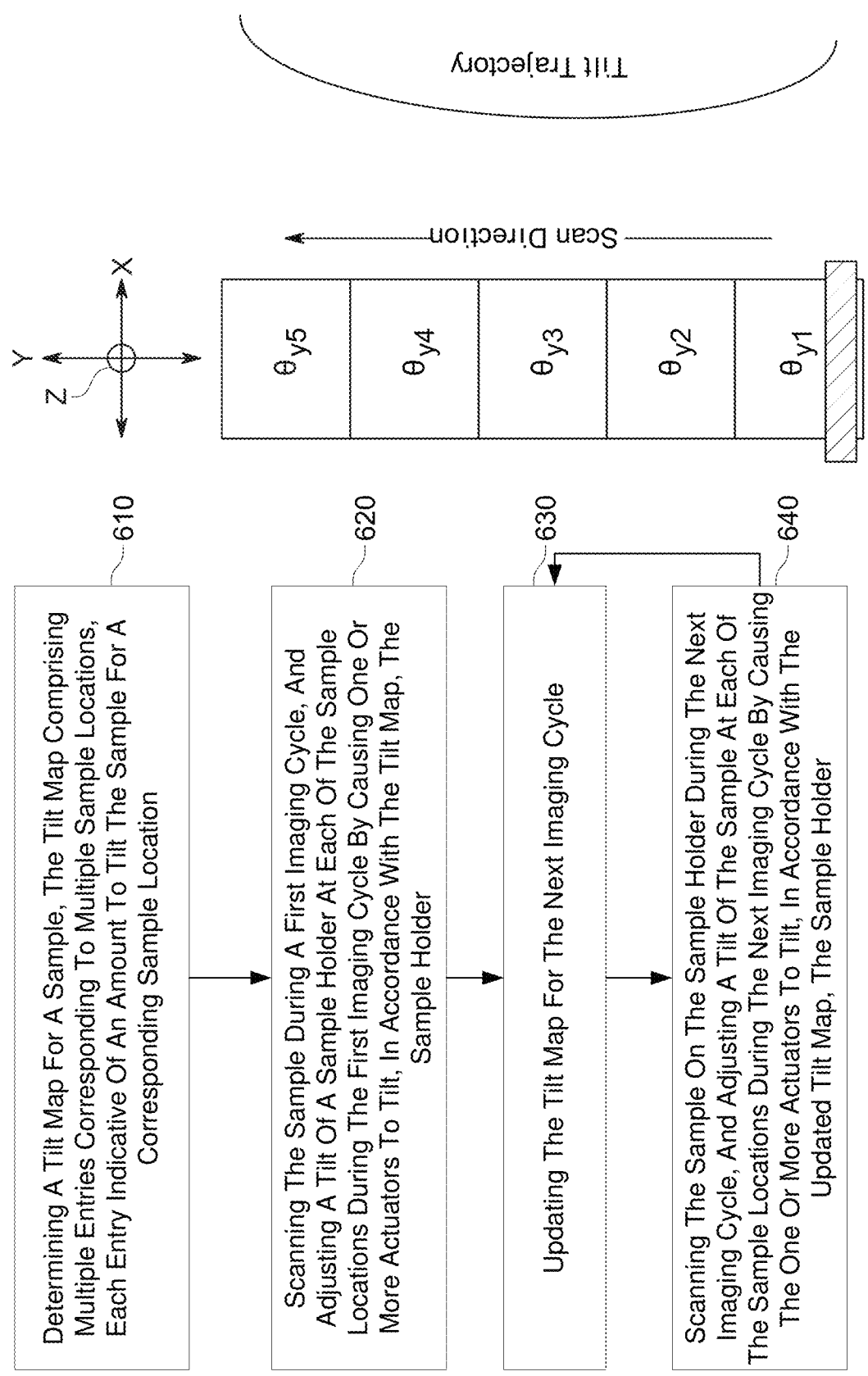
FIG. 17A is an operational flow diagram illustrating an example method of dynamically tilting a sample based on predetermined tilt trajectory, in accordance with some implementations of the disclosure.
FIG. 17B illustrates tilt angles at different samples locations for a tilt map, in accordance with some implementations of the disclosure.
FIG. 17C conceptually illustrates a smooth fit of the tilt trajectory in the z direction based on different tilt angles, in accordance with some implementations of the disclosure.

As such, in some embodiments, to adjust for this latency problem, it may be preferable to adopt a technique that generates a "tilt trajectory" in advance of tilting a sample during image scanning. This example is illustrated by FIGS. 17A-17C. In particular, FIG. 17A is an operational flow diagram illustrating an example method of dynamically tilting a sample based on predetermined tilt trajectory. The method may be implemented by an optical imaging system (e.g., optical imaging system 100) including a suitable mechanism for dynamically tilting a stage carrying a sample (e.g., sample stage assembly 300).

Operation 610 includes determining a tilt map for a sample, the tilt map comprising multiple entries corresponding to multiple sample locations, each entry indicative of an amount to tilt the sample for a corresponding sample location. The tilt map may be in the form of a table, a one-dimensional array, a two-dimensional (2D) array, or otherwise suitable data structure. For example, as depicted by FIG. 17B, the tilt map may specify five tilt angles θy1 for five different sample locations. In practice, the tilt map may be generated for more than five locations, and it may be constructed by estimating a smooth fit between multiple sample tilt measurements. FIG. 17C conceptually illustrates a smooth fit of the tilt trajectory in the z direction based on the different tilt angles. The initial tilt map can be generated in advance of scanning the sample. In some implementations, the tilt map may be generated by performing a "pre-scan" along several positions of the scanning direction (e.g., several Y positions along the Y-direction) to determine sample height and tilt at the various positions. In the case of a sample that is scanned in multiple swaths (e.g., a flow cell), sample tilt may be determined at multiple Y positions for each swath.

Operation 620 includes scanning the sample during a first imaging cycle, and adjusting a tilt of a sample holder at each of the sample locations during the first imaging cycle by causing one or more actuators to tilt, in accordance with the tilt map, the sample holder. For example, the sample holder can be tilted by rotating it about the Y-axis. An image of the sample may be collected by moving the sample holder at a constant speed using a motorized stage (e.g., XY stage 302) in a direction perpendicular to a long dimension of an image sensor array (e.g., a TDI sensor). In embodiments where a sample is imaged in swaths (e.g., a flow cell), after each swath is imaged, a motorized stage may move the sample in the X direction a distance corresponding to the swath width. In such embodiments a tilt map may be generated and used for each sample swath (e.g., operations 610-640 may be applied to each sample swath).

Operation 630 includes updating the tilt map for the next imaging cycle. Over time, the topography of the sample may change due to thermal expansion (e.g., due to excitation or other light sources that raise the temperature of the sample) and/or due to other changes in the sample. As such, to account for potential changes in the sample topography, the tilt map may be updated for every imaging cycle. In alternative embodiments, the tilt map may be updated after a predetermined number of imaging cycles. To update the tilt map in advance of a next imaging cycle, tilt map measurements for a next imaging cycle may be made during a current imaging cycle. The optical imaging system may utilize the same mechanism utilized to generate the original tilt map in order to generate the updated tilt map.

Operation 640 includes scanning the sample on the sample holder during the next imaging cycle, and adjusting a tilt of the sample at each of the sample locations during the next imaging cycle by causing the one or more actuators to tilt, in accordance with the updated tilt map, the sample holder. Operations 630-640 may iterate until all imaging cycles (e.g., sequencing cycles) are completed. In the case of a sequencer, each imaging cycle described above may correspond to a sequencing cycle.

Although described in the context of a sample holder that is tilted by rotating it about the Y-axis, it should be appreciated that the method of FIG. 17A can be similarly implemented to rotate a sample about some other axis. For example, a sample holder could be tipped by rotating it about the X-axis. In addition the method of FIG. 17A could be implemented to rotate the sample holder about multiple axes. For example, a sample holder could be detilted and detipped. As such, depending on the topography of the sample and the requirements of the optical imaging system, it should be appreciated that the foregoing "tilting" method could be implemented about any axis or multiple axes.

To illustrate one particular implementation of a system that generates a "tilt trajectory" in advance of tilting a sample during image scanning, it is instructive to consider an example system that utilizes a controller of an assembly 300 to make dynamic corrections during the duration of each scan of a flow cell. For example, consider an optical imaging system that images a flow cell and has the following parameters: a scan rate of 1 Hz, a dynamic detilt servo update rate of about 10 Hz, a tile OY capture rate of about 100 Hz, 99 tiles per scan swath, 2 surfaces per flow cell (top and bottom), 2 flow cells per instrument, 8 lanes per flow cell surface, and 4 scans per flow cell lane. In this embodiment, the system may make 128 scans per sequencing cycle.

In the foregoing example, it is assumed that at least 10 measurements per scan swath are needed to characterize the required tilt correction (about 1 correction for every 10 tiles). Accordingly, a set of correction tables with 10 entries per table and 1 table per scan may be created for an entire sequencing cycle, requiring a total of 128 10-entry tables per imaging cycle. Each correction entry may be based on centroid calculations made at each of the 10 measurement points along each scan (e.g., using dual projection beams as described above). These tables may be stored at a controller of the TTA. To minimize energy inputs into the instrument structure and to maximize the quality of detilt correction in this example, a smooth detilt trajectory may be determined. The detilt trajectory may be created using a smooth curve fit, rather than performing a piece-wise linear correction between subsequent entries in the table. If, for example, the curve fit interpolates 9 points between each entry (plus 5 points at the beginning of the scan, and 5 points at the end of the scan), then the total number of corrections per scan will be 100, requiring a tip/tilt update rate of 100 Hz for a scan rate of 1 Hz. To generate the smooth detilt trajectory, a mathematical operation such as a cubic Hermitian fit may be applied to all data collected, which has the benefit of specifying both position and slope at all target trajectory points.

In this example, the first set of correction tables for the first sequencing cycle may be created by scanning the flow cells prior to the start of sequencing. Subsequent sequencing cycles may use correction tables that are updated based on the centroid calculations made during each of the previous cycle's scans. One advantage of this example approach is that it may avoid the requirement of a low-latency link between the centroid calculation and the controller of the TTA. The controller may have sufficient time to update the 128 tables for the next sequencing cycle, during the inter-cycle timeframe, or, it may update each table for the next sequencing cycle in the background as it completes each scan in the current sequencing cycle.

Figure 18:
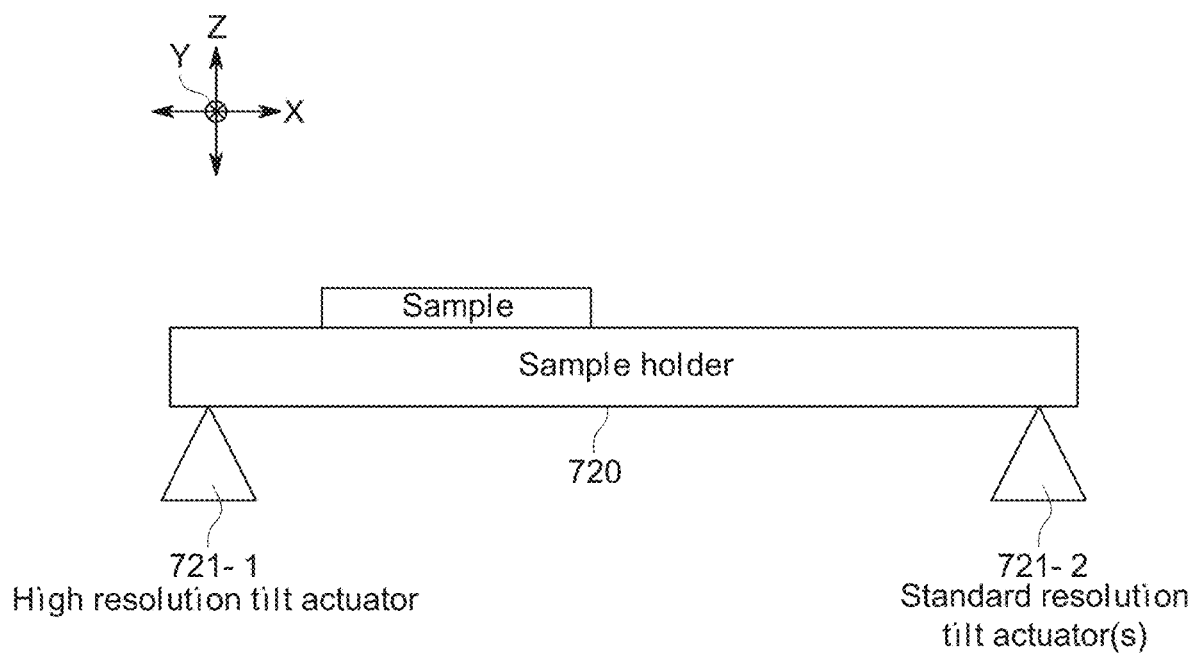
FIG. 18 is a block diagram illustrating an example mechanism for tilting a sample holder, in accordance with some implementations of the disclosure.

FIG. 18 is a block diagram illustrating an example mechanism for tilting a sample holder 720. In this example, only high resolution tilt actuator 721-1 is configured to tilt the sample holder 720 during a sample imaging cycle (e.g., by moving the holder up and down). The standard resolution tilt actuator(s) 721-2 may adjust global tilt of the sample holder 720 in between imaging cycles. For example, in the case where the actuators correspond to actuators 304 of assembly 300, the actuators 304 shown on the right side of FIG. 13 may be fixed during image scanning, and actuator 304 shown on the left side of FIG. 13 may dynamically tilt the sample up and down during image scanning.

Figures 19A, 19B, 19C:
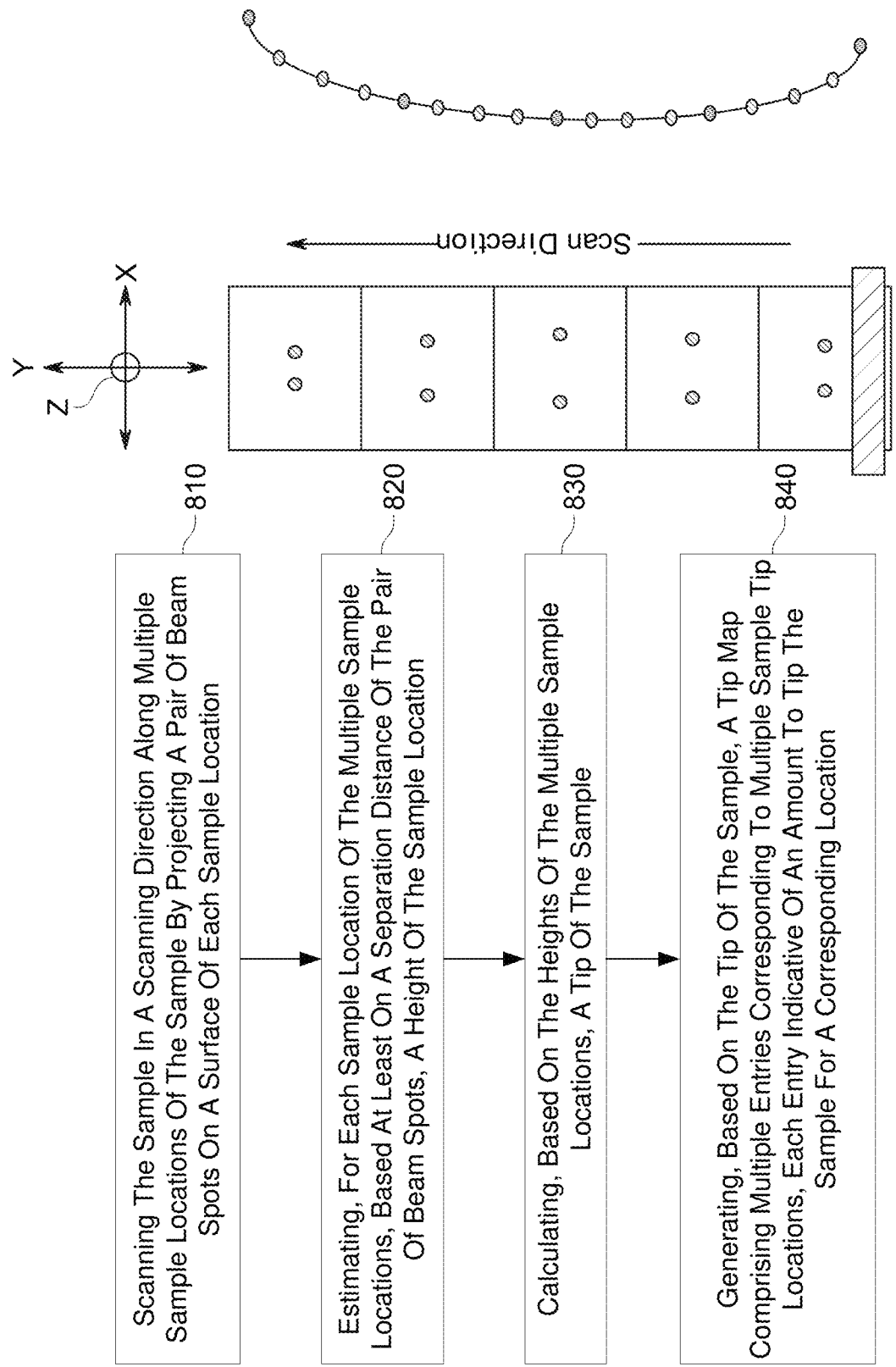
FIG. 19A is an operational flow diagram illustrating an example method of determining a tip map along a scanning direction, in accordance with some implementations of the disclosure.
FIG. 19B depicts a focus tracking module projecting a pair of spot beams on a surface of the sample over different sample locations in the scanning direction during the process of FIG. 19A.
FIG. 19C illustrates a smooth detip trajectory generated by interpolating between five entries corresponding to spot beam measurements, in accordance with some implementations of the disclosure.

FIGS. 19A-19C illustrate one example implementation for generating a map for adjusting a sample in accordance with some implementations of the disclosure. In particular, FIG. 19A is an operational flow diagram illustrating an example method of determining a tip map along a scanning direction. Although method is described in the context of generating a tip map, it should be appreciated that this method could be adapted to generate an initial tilt map prior to beginning imaging of a sample (e.g., operation 610), and during each imaging cycle to generate a tilt map for a subsequent imaging cycle (e.g., operation 630). In this example, the map can be determined using an optical assembly that projects dual focusing beams on a surface of the sample (e.g., optical assembly 202).

Operation 810 includes scanning the sample in a scanning direction along multiple sample locations of the sample by projecting a pair of beam spots on a surface of each sample location. Operation 820 includes estimating, for each sample location of the multiple sample locations, based at least on a separation distance of the pair of beam spots, a height of the sample location. For example, as depicted by FIG. 19B, a focus tracking module or other suitable module may project a pair of spot beams on a surface of the sample over different sample locations in the scanning direction, and an image may be captured using an image sensor of the optical imaging system. The sensor using to capture the image of the projected pairs of spot beams may be the same as the image sensor used to capture an image of the sample, or it may be a different image sensor. As discussed above, the separation distance of the imaged spot beams may be mapped to the distance between the objective and surface of the sample. As such, the spot beam separation may be mapped to sample height for a given sample location.

Operation 830 includes calculating, based on the heights of the multiple sample locations, a tip of the sample. For example, based on the estimated height of two adjacent sample locations, and a separation distance of the two sample locations, a tip slope and angle may be determined between adjacent locations.

Operation 840 includes generating, based on the tip of the sample, a tip map comprising multiple entries corresponding to multiple sample tip locations, each entry indicative of an amount to tip the sample for a corresponding location. In some implementations, the tip map entries correspond to each of the sample locations on which a pair of beam spots were projected. For example, each entry may indicate a tip angle, a tip slope, or a tip height for each of the sample locations on which a pair of beam spots were projected. In some implementations, to minimize energy inputs into the instrument structure and to maximize the quality of detip correction, the tip map may be created to provide a smooth detip trajectory. In such implementations, a smooth curve fit may be performed between the entries corresponding to the initial spot beam measurements. By way of illustration, FIG. 19C illustrates a smooth detip trajectory generated by interpolating between five initial entries. In this illustration, the dark dots may correspond to the five initial entries generated by the spot beam separation measurements. The gray dots may represent additional entries added by interpolation. During sample imaging, each tip map entry may subsequently be read by a controller of a TTA to cause an actuator to tip a sample holder.

In some implementations, due to a sample's topography it may be important to account for both sample tilt and tip. To this end, and as further illustrated by FIGS. 20A-20B an optical imaging system may utilize a focusing system that generates at least two pairs of beam spots in order to account for tip and tilt.

Figure 20B:
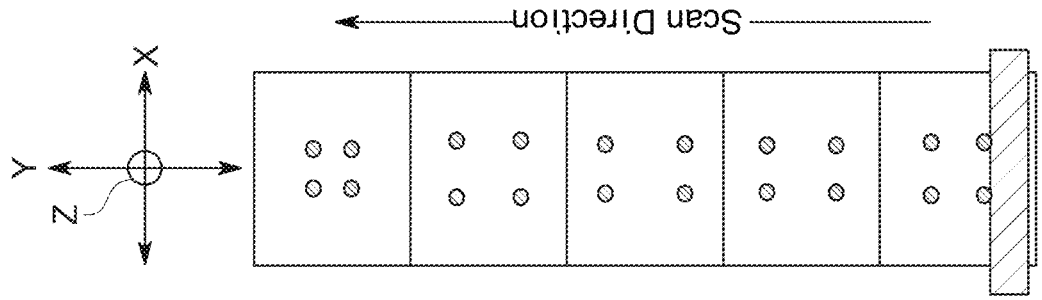
FIG. 20B depicts a focus tracking module projecting two pairs of spot beams on a surface of the sample over different sample locations in the scanning direction during the process of FIG. 20A.
Figure 20A:
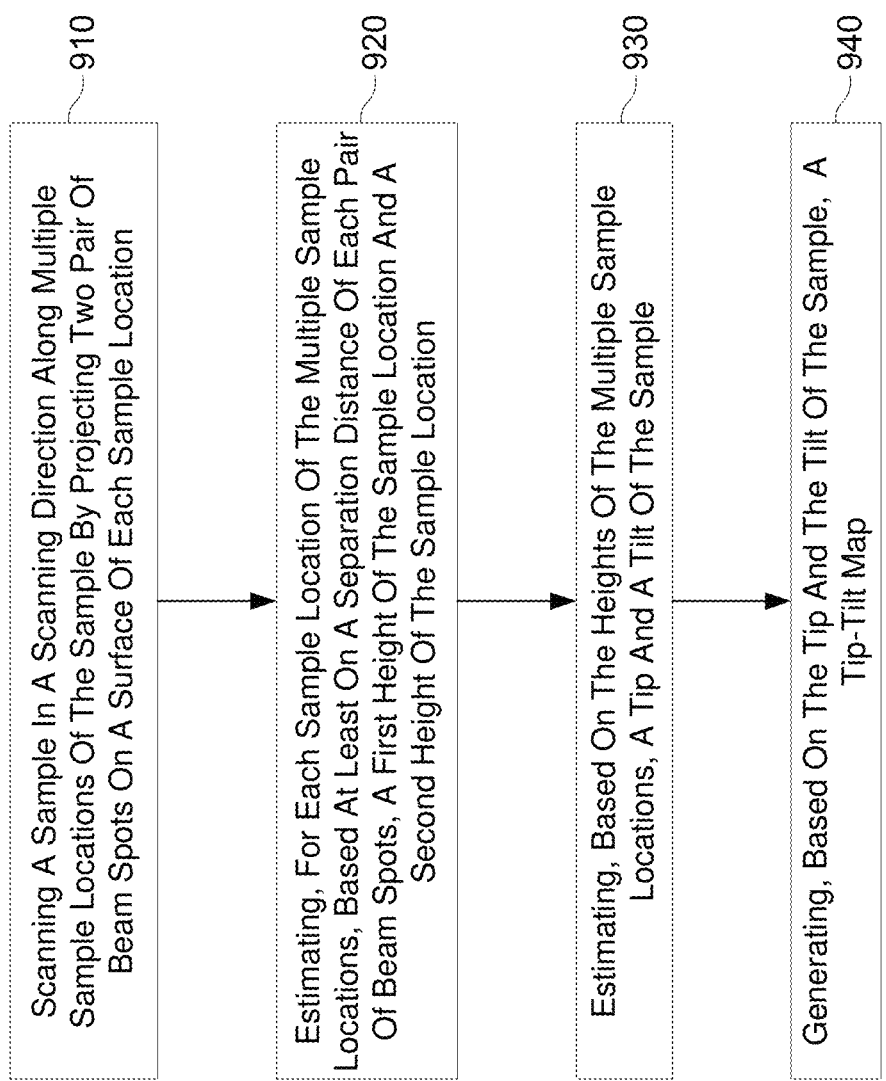
FIG. 20A is an operational flow diagram illustrating an example method of determining a tip-tilt map, in accordance with some implementations of the disclosure.

In particular, FIG. 20A is an operational flow diagram illustrating an example method of determining a tip-tilt map. The method may be implemented, for example, to generate an initial tip-tilt map prior to beginning imaging of a sample (e.g., operation 610), and during each imaging cycle to generate a tip-tilt map for a subsequent imaging cycle (e.g., operation 630). In this example, the tip-tilt map be determined using an optical assembly that projects at least two pairs of focusing beams on a surface of the sample (e.g., optical assembly 202).

Operation 910 includes scanning a sample in a scanning direction along multiple sample locations of the sample by projecting two pair of beam spots on a surface of each sample location. Operation 920 includes estimating, for each sample location of the multiple sample locations, based at least on a separation distance of each pair of beam spots, a first height of the sample location and a second height of the sample location. Operation 930 includes estimating, based on the heights of the multiple sample locations, a tip and a tilt of the sample. Using sample height measurements determined from the separation distance of each of the two projected pairs of spot beams. The tip and the tilt can be calculated based on the slope of the sample along both the scanning direction and a second direction substantially orthogonal to the scanning direction.

Figure 20C:
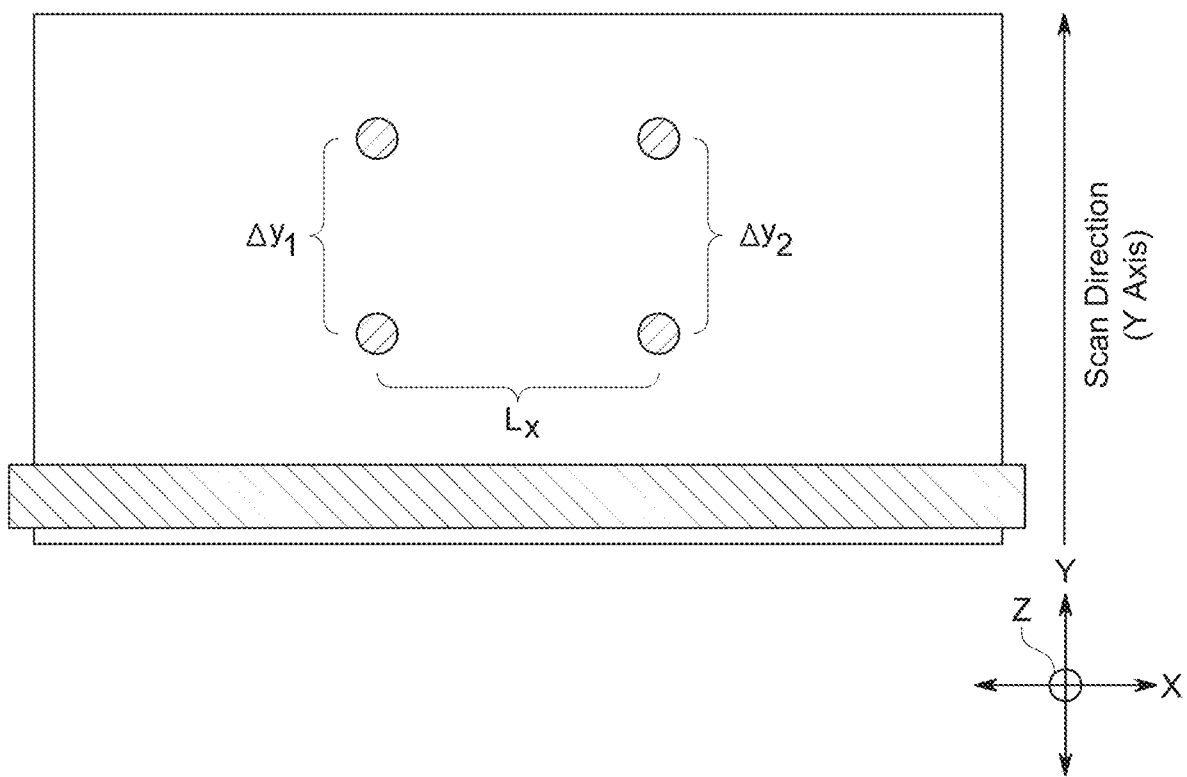
FIG. 20C depicts a process of utilizing two pairs of projected spot beams to determine tilt and tip of a sample, in accordance with some implementations of the disclosure.

As depicted by FIGS. 20B-20C, a focus tracking module or other suitable module may project two pair of spot beams on a surface of the sample over different sample locations in the scanning direction. In contrast to the examples of FIGS. 19A-19C, where each pair of spot beams was separated along the X-axis, in this embodiment each pair of spot beams is rotated 90 degrees and separated along the scanning axis (Y-axis). For example, referring to FIG. 20C, a first pair of spot beams is separated by $\Delta y1$ along the Y-axis, and a second pair of spot beams is separated by $\Delta y2$ along the Y-axis. In this example, the height of the sample at the center of the field of view of the sample location may be estimated from the beam spot separation $\Delta y1$ and beam spot separation $\Delta y2$ as follows. The first beam spot separation may be mapped to a first sample height, the second beam spot separation may be mapped to a second sample height. The average between the first and second sample heights may be determined. Alternatively one of the two sample heights may be selected as the sample height for the location. In addition to determining the sample height, the difference between the separations ($\Delta y1$, $\Delta y2$) of the two beam spot pairs, and the distance ($L_x$) between the two beam spot pairs may be used to determine a tilt of the sample about the Y-axis.

Operation 940 includes generating, based on the tip and the tilt of the sample, a tip-tilt map. The tip-tilt map may include multiple entries corresponding to multiple sample locations. In this case, each entry may indicate an amount to tip and/or tilt the sample each sample location. During sample imaging, each tilt-tip map entry may subsequently be read by a controller of a TTA to cause one or more actuators to tip and/or tilt a sample holder about both the X and Y axes as needed.

Although the foregoing examples for enabling dynamic tilting of a sample have been primarily described in the context of an imaging system that utilizes a map that may be updated after every imaging cycle or some multiple of imaging cycles, it should be appreciated that the foregoing examples could also be used in an embodiment that utilizes a feedback detilt and/or detip mechanism that does not rely on maps that are generated in advance of scanning in area. For example, method of FIG. 19A or 20A may be adapted such that the tip and/or tilt measurements (e.g., as determined for each sample location) are directly provided to a tip/tilt controller that adjusts one or more actuators in response to receiving the measurements. In such implementations, the frequency at which the sample holder is tilted may be the same as, greater than, or less than the frequency of scanning.

In the foregoing examples, depending on system requirements, the relative positioning between the projected beam spots (e.g., two pairs of beam spots) used to capture tip and/or tilt measurements and the projected excitation light (e.g., scan line) used to capture sample images may vary. For example, although FIG. 20C illustrates the two pairs of beam spots being projected ahead of the scan line in the scanning direction, in some implementations one of the two pairs of beam spots may be projected ahead of the scan line, and another of the pair of beam spots may be projected behind the scanline. In other implementations, both pairs of beam spots may be projected behind the scan line. In yet other implementations, one of the pairs of beam spots may be projected on the scan line.

Likewise, in multi-channel, line-scanning imaging systems that utilize multiple excitation light sources to image the sample, the relative orientation between the multiple scan lines and the projected pairs of beam spots may vary. For example, in a two-channel, line-scanning imaging system, both pairs of beam spots can be projected ahead of both scan lines; one pair of beam spots can be projected ahead of both scan lines while the other pair of beam spots is projected behind both scan lines; both pairs of beam spots can be projected behind both scan lines; both pairs of beam spots can be projected ahead of one scan line and behind the other scan line; or one pair of beam spots can be projected ahead of one scan line, and the other pair of beam spots can be projected behind the same scan line.

Figure 21:
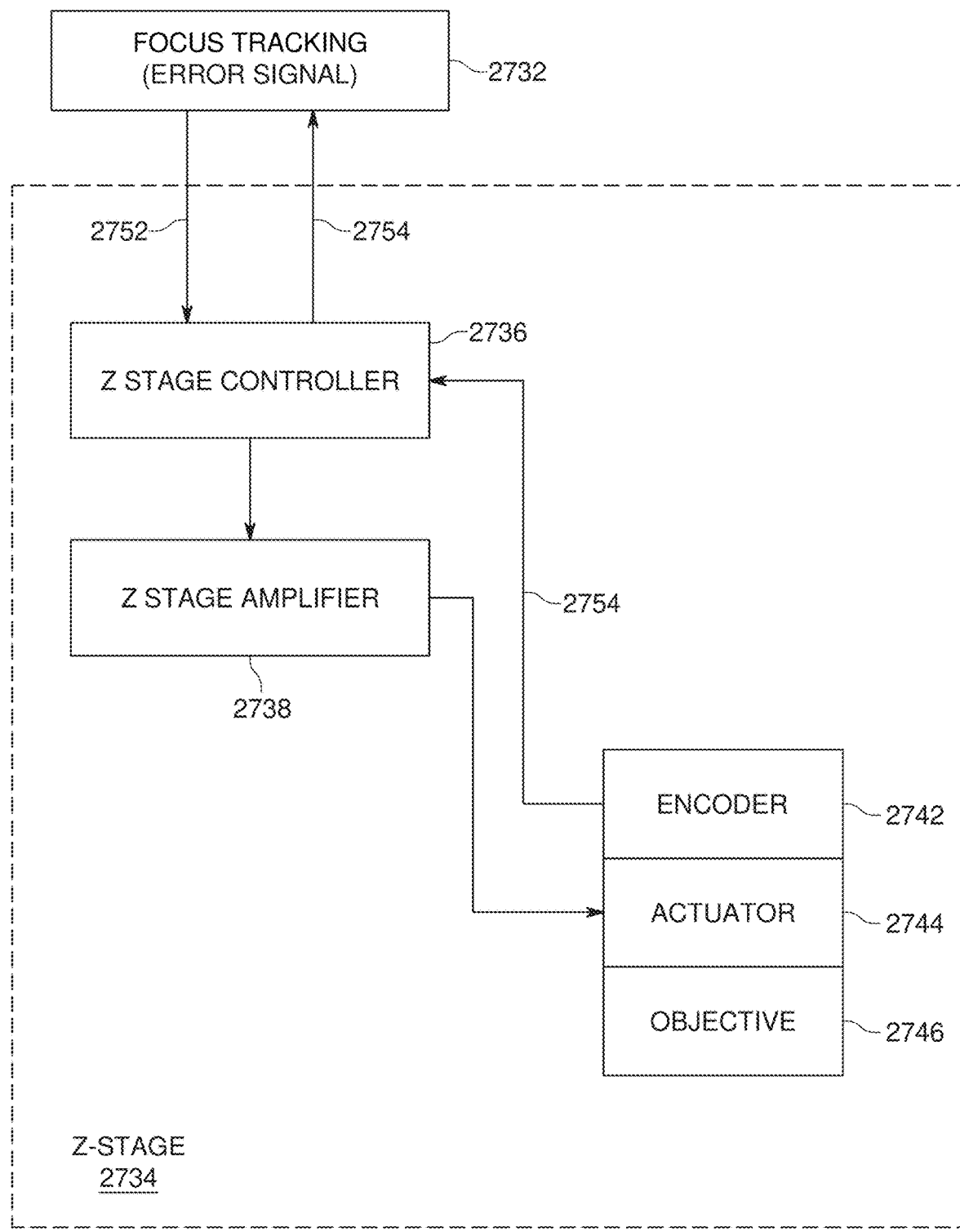
FIG. 21 is a block diagram illustrating some components of an example focus control system for focus tracking, in accordance with some implementations of the disclosure.

Although some of the foregoing examples have been described in the context of using spot-beam separation measurements to enable dynamic tilting and/or tipping of a sample holder to keep a sample within focus during image scanning, it should be appreciated that these measurements can also be utilized to move a Z-stage to provide movement of an objective lens relative to a sample container to keep the sample in focus. For example, one or more actuators can be configured to move the objective and/or sample container in the z-direction while maintaining the sample within a focal region of a focal plane of the imaging system. To illustrate, FIG. 21 is a block diagram illustrating some components of an example focus control system for focus tracking in accordance with some implementations of the disclosure. This example focus control system includes focus tracking circuitry 2732 that is configured to determine focus settings that are used to generate a drive signal that drives a focus tracking feedback loop in a Z-stage 2734. In the example of FIG. 21, commands 2752, based on the focus settings difference, are fed to the Z-stage 2734. In this example, the Z-stage 2734 is configured to move the objective lens 2746. In other implementations, it may move a stage holding the sample holder. Actuator 2744 moves the optical stage, and in particular the objective lens 2746, in response to the drive signal provided by the Z-stage amplifier 2738. The actuator 2744 can include a piezoelectric actuator, a voice coil actuator, a motor, or other like actuators. An encoder 2742 can provide information about the actuator position and its movement. This encoder information 2754 can be fed back through the z-stage controller 2736 to focus tracking circuitry 2732 and can be used in determining the error signal.

Figure 22:
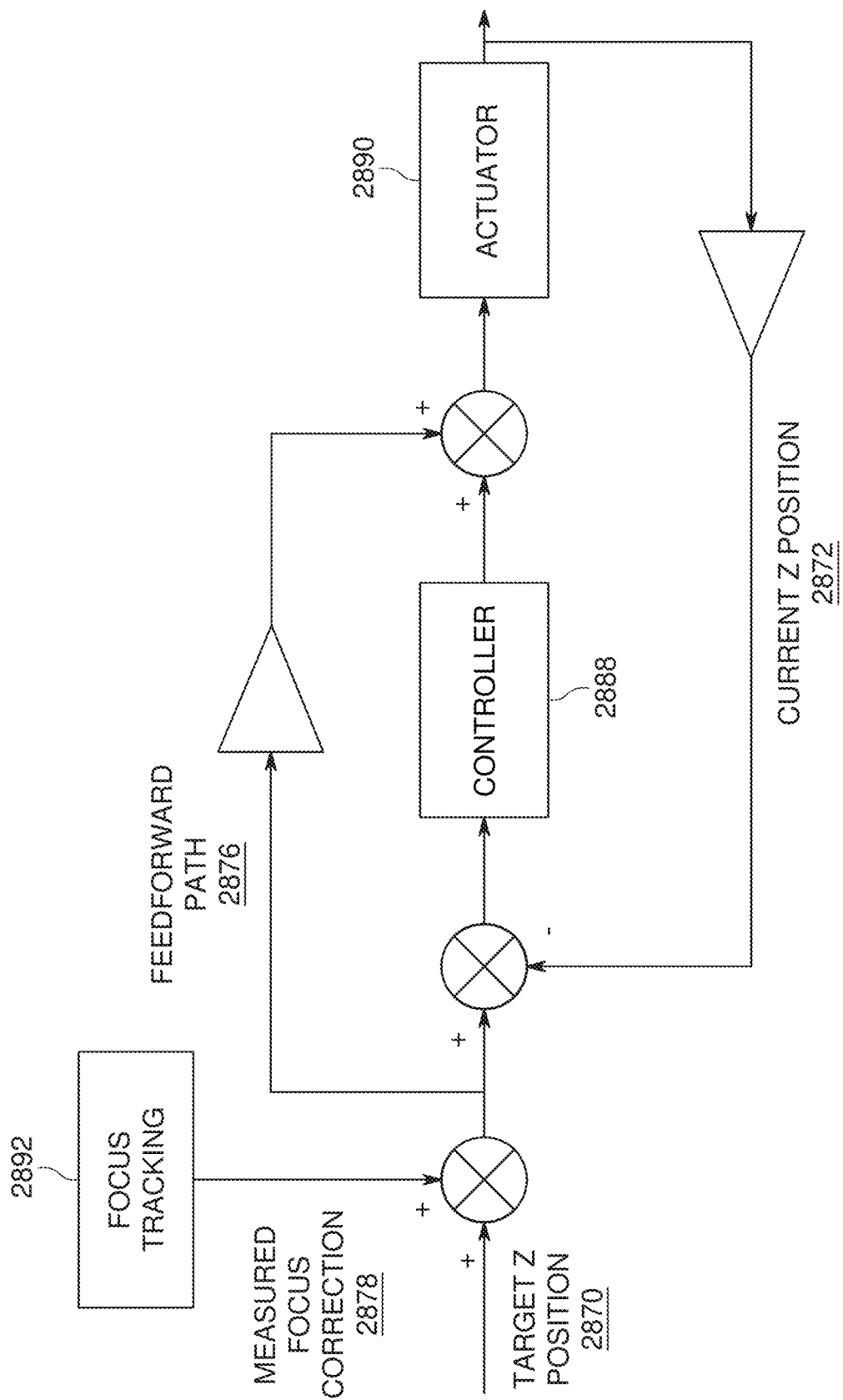
FIG. 22 is diagram illustrating an example architecture for a Z-stage controller, in accordance with some implementations of the disclosure.

FIG. 22 is diagram illustrating an example architecture for a Z-stage controller in accordance with some implementations of the disclosure. This example incorporates feedback and feedforward control. In operation, a target focus setting (e.g., target z position 2870 as determined using spot separation measurements) is used to command the position of the Z-stage. The target z position 2870 is provided to controller 2888, which determines the drive signal needed to command actuator 2890 to position the Z-stage. Controller 2888 may also include drive circuitry to generate the drive signal. The drive signal determination can be made using the magnitude of the difference between the target focus setting (e.g., target z position 2870 as determined by most recent spot separation measurements) and the current focus setting (current z position 2872 as determined by past spot separation measurements) which can be provided, for example, by actuator 2890. In this example, the drive signal used to drive the actuator is adjusted by the signal from the feedforward control path 2876, and measured focus correction signal 2878 is generated by focus tracking circuitry 2892. The correction information can be determined, for example, using lookahead predictive focus tracking or predictive focus tracking based on focus history data, or using other predictive focus tracking techniques. For example, focus settings can be stored electronically in a history file in memory so that they can be recalled for later use during scanning operations. The history file or the information therein can be tagged to be identified as containing the focus information for a particular sample container. The correction information can be added to the commanded stage position to adjust the drive signal according to the slope of the change in the focus setting for scanning operations.

More generally, the technology described herein can be implemented by creating, based on a sample tilt and/or tip measurement, a relative tilt and/or tip between the sample and an image sensor that images the sample by adjusting any component of the optical imaging system along the imaging light path from the sample to the sample image sensor. As such, based on a sample tilt and/or tip measurement, the system can instead be configured to tilt, tip, or otherwise adjust an image sensor that images the sample, a camera carrying the sample image sensor, and/or a sample holder. Other optical components along the sample imaging/light path from the sample to the sample image sensor can be tilted, tipped, and/or otherwise adjusted to create the relative tilt and/or tip between the sample and the image sensor that images the sample. Such optical components can include, for example, the objective or one or more mirrors that receive light corresponding to an image of the sample.

Adjustments to imaging system components other than a sample holder (e.g., adjustments to one or more mirrors and/or an image sensor) to account for sample tilt and/or tip can be made based on real-time tilt and/or tip measurements that are communicated to one or more controllers in real-time, or based on a sample tilt and/or tip trajectory calculated in advance of detilting during image scanning, as described above with reference to FIGS. 17A-20C. For example, the embodiments of FIGS. 17A, 19A, 20A can be implemented by creating a map including entries corresponding to multiple sample locations, where each entry is indicative of an amount to adjust image sensor or some optical component of the imaging system to detilt and/or detip the sample. As such, detilting and/or detipping of a sample can be implemented by adjusting, based one or more sample tilt and/or tip measurements, one or more components of the imaging system along the imaging path from the sample to the sample image sensor. The adjustment of the one or more optical components can be controlled using one or more system controllers.

In implementations where the sample container is a flow cell, tilt and/or tip adjustments can occur after every swath, multiple times per swath, after every tile, or some other subsection of the sample container. Such adjustments can account for sample topography in one axis (e.g., sample tilt or tip), or in multiple axes (e.g., both sample tilt and tip). Such embodiments can be implemented with or without a sample holder that is tiltable.

As described above, the optical sequencing systems described herein can map spot beam separation of one or more focus tracking modules to sample height position(s). This mapping can be performed when operating the sequencing system in a focus model generation mode, a sequencing mode, or both. During focus tracking model generation, the system can determine and store information about focus settings of a given sample container to control focusing of the system during real-time imaging. For example, using the one or more focus tracking modules, a sample container can be scanned at each of a plurality of sample locations on the sample container, and focus settings measured and determined for each of the plurality of sample locations.

Figure 23:
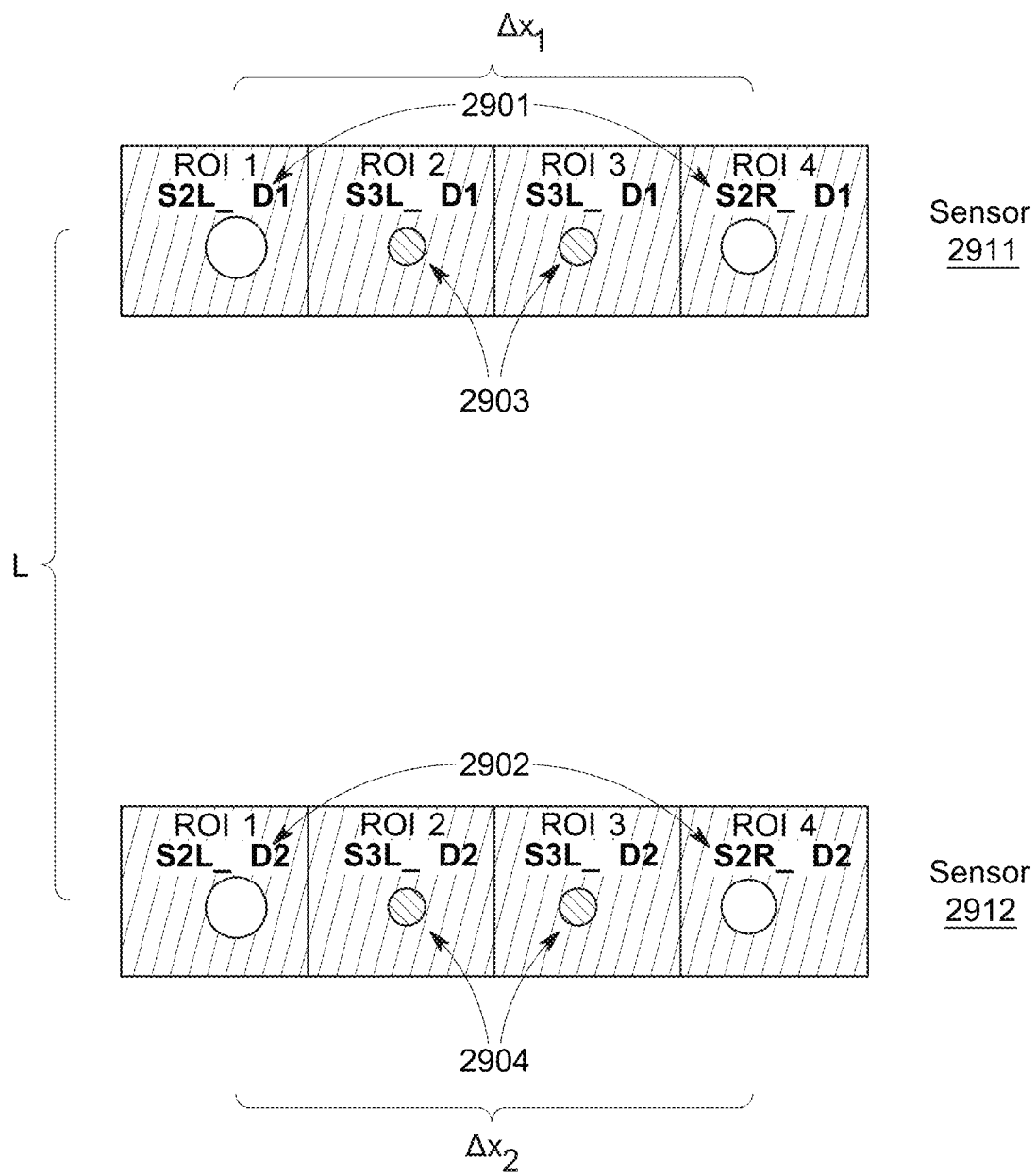
FIG. 23 depicts an example of the design and operation of a focus tracking system that utilizes two pairs of focus tracking spots per sample surface, in accordance with some implementations of the disclosure.
Figure 24A:
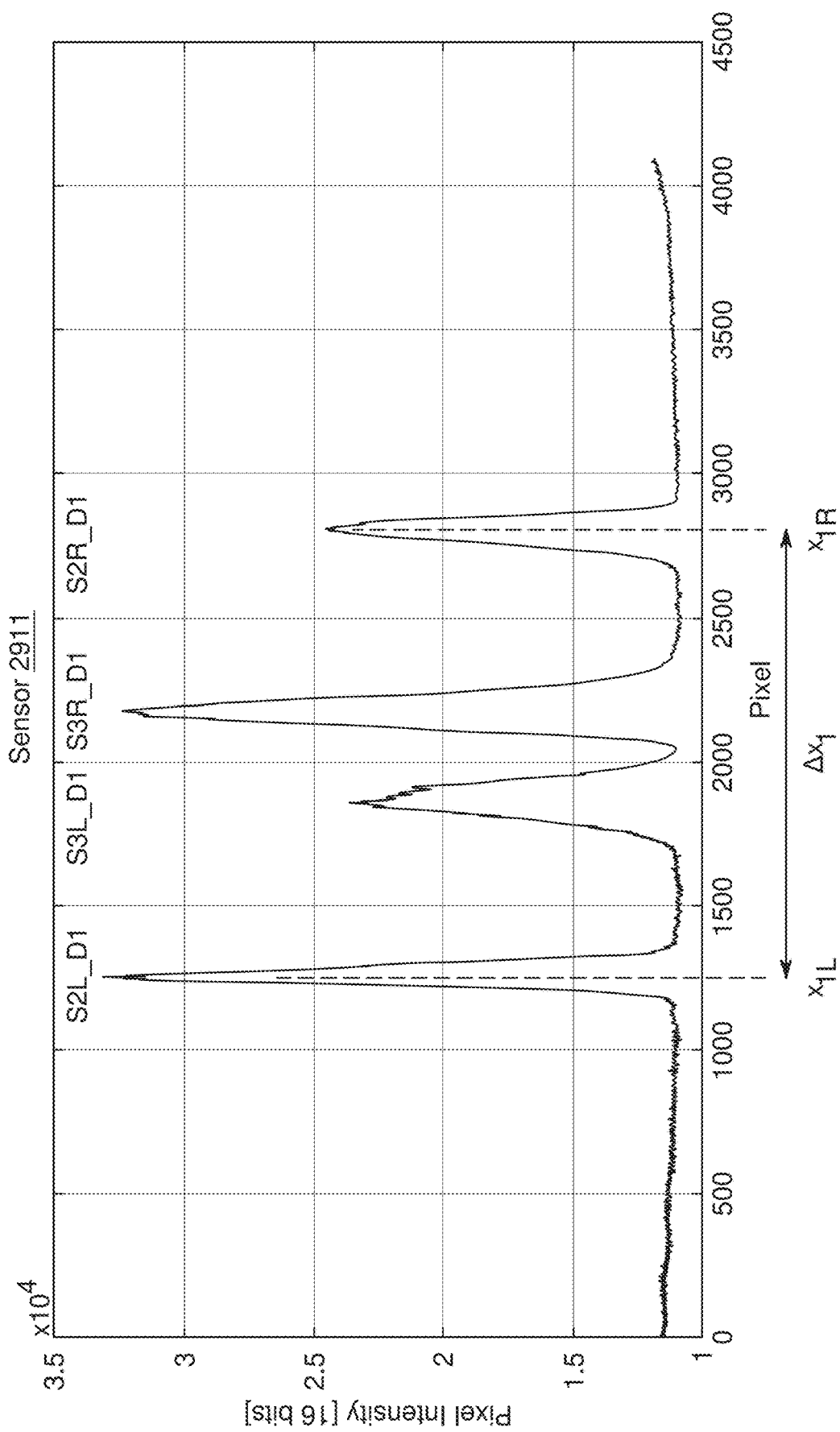
FIG. 24A depicts pixel intensity as a function of pixel number for one of the sensors of FIG. 23, after incidence of light corresponding to spot pairs.
Figure 24B:
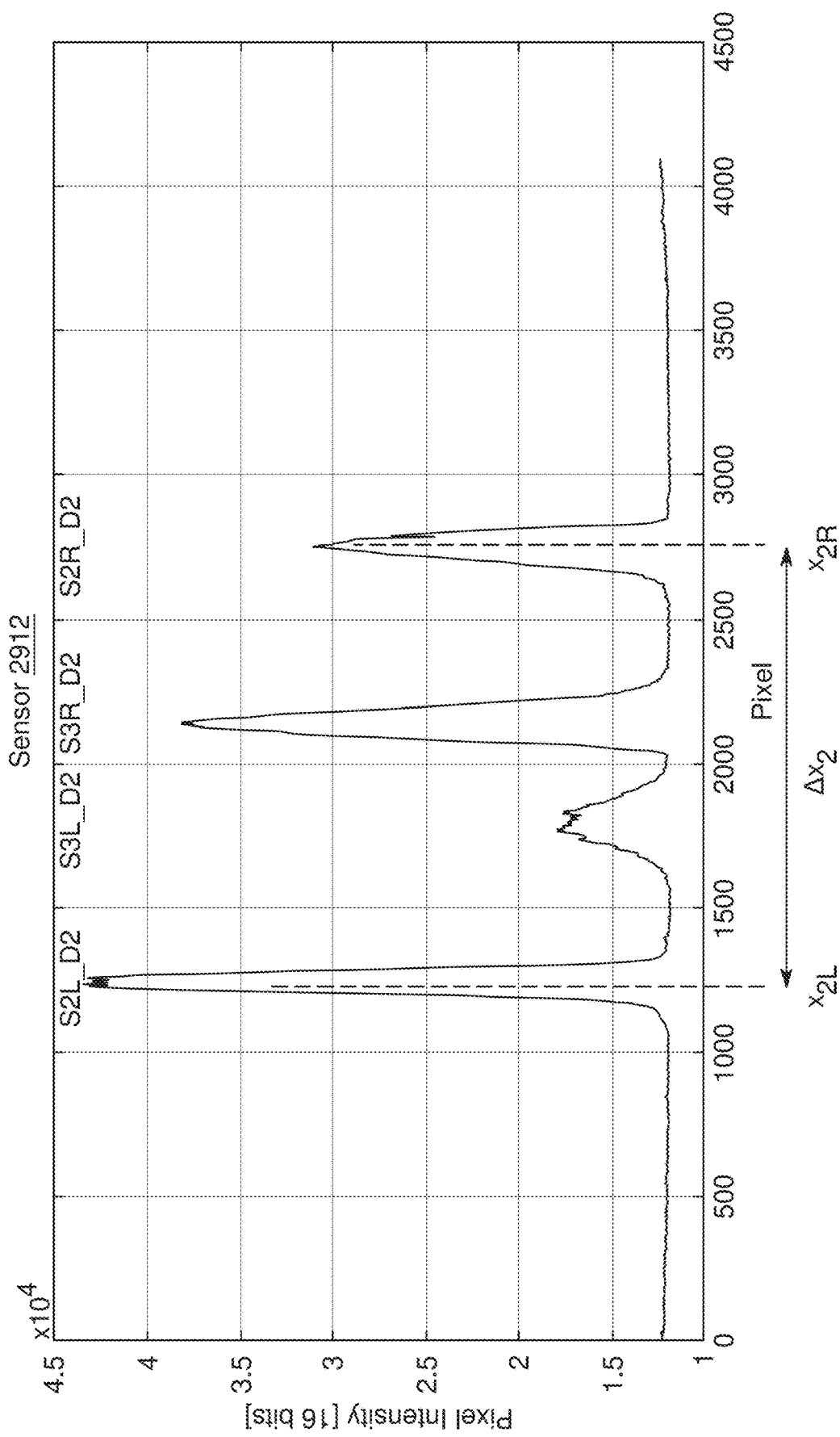
FIG. 24B depicts pixel intensity as a function of pixel number for the other sensor of FIG. 23, after incidence of light corresponding to spot pairs.

FIGS. 23 and 24A-24B illustrate a particular example of the design and operation of a focus tracking system that utilizes two pairs of focus tracking spots per sample surface, in accordance with some implementations of the disclosure. The focus tracking system utilizes a light beam architecture that projects two pairs of spots onto each of first and second surfaces (e.g., top and bottom surfaces) of a sample container (e.g., flow cell lane). In alternative designs, two pairs of spots may be projected on a single sample surface or more than two sample surfaces.

As depicted by FIG. 23, the two reflected light beams corresponding to each pair of spots are incident upon a surface of a respective sensor 2911, 2912 to form beam spots (e.g., spot pairs 2901, 2902 corresponding to light reflected from the top surface of a sample and spot pairs 2903, 2904 corresponding to light reflected from the bottom surface of sample). For simplicity, the discussion will focus on spot pairs 2901 and 2902 projected on one surface. Spot pairs 2901, 2902 have a respective spot separation $\Delta x_1$, $\Delta x_2$ detected using a respective sensor 2911, 2912. In this example, L is the "lever arm", and ROI refers to a region of interest that can be determined dynamically and set around the peak maximum. For example, the ROI can be set around the peak maximum with a width of two times the full width at half maximum (FWHM). The two sensors can function as parallel linear sensor arrays for spot detection. In some implementations, a respective focus tracking module may be associated with a respective light source that projects two spots and a sensor that detects the two spots. For example, a four-beam system as described herein can be associated with two separate focus tracking modules.

FIG. 24A illustrates pixel intensity as a function of pixel number for the sensor 2911, after incidence of light corresponding to spot pairs 2901 and 2903. As depicted, the spot separation $\Delta x_1$ on the sensor 2911 of the left and right spots corresponding to spot pair 2901 can be calculated by determining the pixel corresponding to the peak intensity of each detected spot, and determining the difference. FIG. 24B illustrates pixel intensity as a function of pixel number for the sensor 2912, after incidence of light corresponding to spot pairs 2902 and 2904. As depicted, the spot separation $\Delta x_2$ on the sensor 2912 of the left and right spots corresponding to spot pair 2902 can be calculated by determining the pixel corresponding to the peak intensity of each detected spot, and determining the difference.

In some implementations, the following parameters can be defined for a four-beam focus tracking system as described above. The average of the spot separation of the two pairs of spots in the sensor plane $\Delta x$ can be defined by Equation (1):

$$\Delta x = \frac{\Delta x_1 + \Delta x_2}{2} \quad (1)$$

Where $\Delta x = \Delta x_0$ at best focus. The change in the relative z-stage to sample container (e.g., flow cell) position $\Delta z$ can be defined by Equation (2):

$$\Delta z = \frac{\Delta x - \Delta x_0}{DSG} \quad (2)$$

Where DSG (pix/µm) is the differential spot gain from best focus. The difference in spot separation between the two pairs of spots in the sensor plane dx can be defined by Equation (3):

$$dx = \Delta x_1 - \Delta x_2 \quad (3)$$

Where $dx=dx_0$ at zero image tilt. The differential tilt gain (DTG) in pix/µrad can be defined by Equation (4):

$$DTG = \frac{DSG \times L}{10^6} \quad (4)$$

Where L is the spot separation at the sample, in µm. The change in tilt angle about the y axis can be defined by Equation (5):

$$\Delta \theta_y = \frac{dx - dx_0}{DTG} \quad (5)$$

Figure 25:
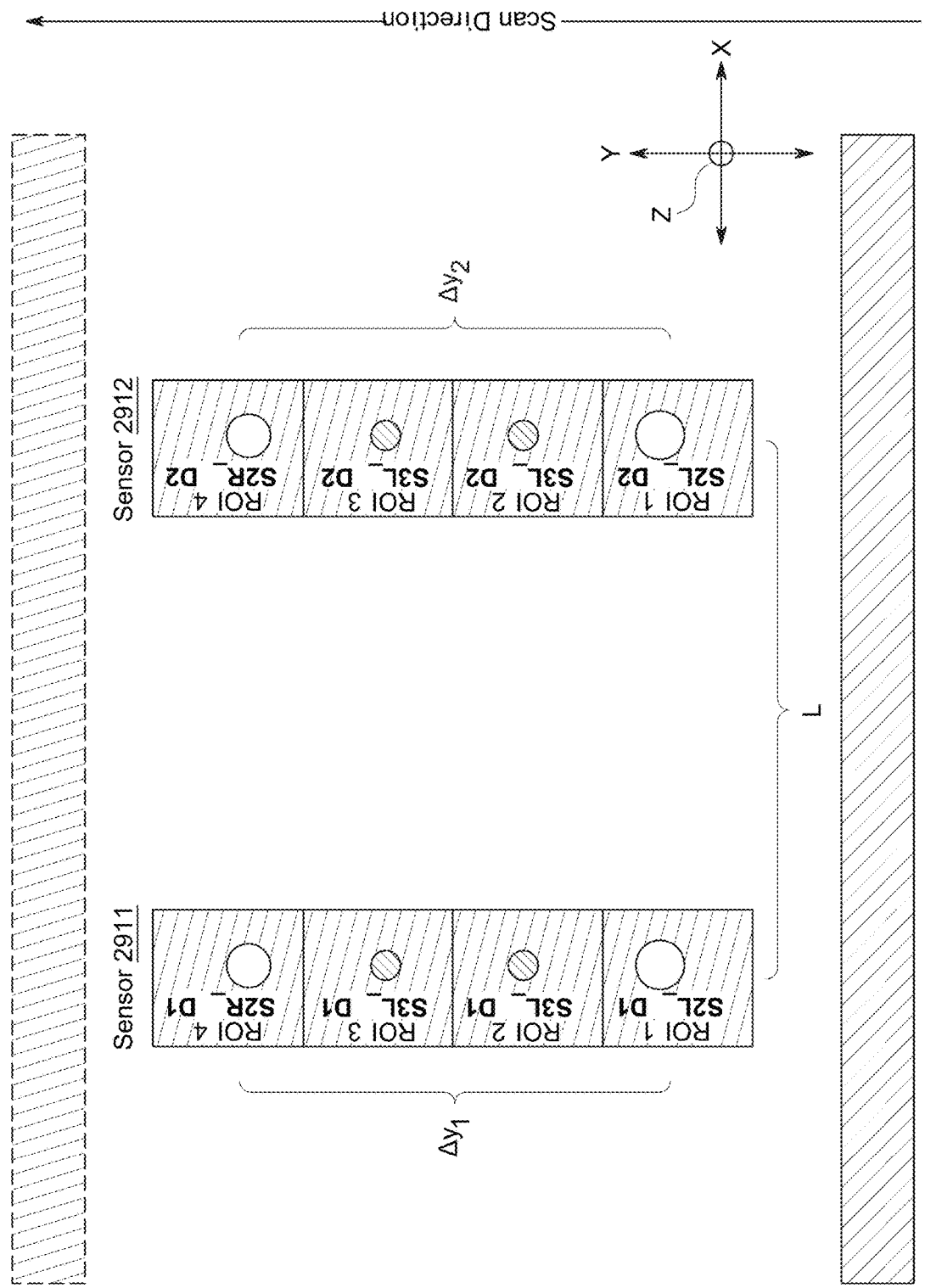
FIG. 25 depicts both the object plane and sensor plane during scanning of a flow cell surface in one example implementation utilizing the focus tracking system described with reference to FIG. 23.

FIG. 25 depicts both the object plane and sensor plane during scanning of a flow cell surface in one example implementation utilizing the focus tracking system described with reference to FIG. 23. In this case, $\Delta y_1$ and $\Delta y_2$ refer to spot separation at the surface of the sample, and L refers to the distance between each pair of spots at the flow cell surface. The focus tracking module spots are shown relative to two scanning laser lines. For the purpose of illustration, the sensors 2911, and 2912 with incident light beams are overlaid over the drawing. In one particular embodiment, $\Delta y_1$ and $\Delta y_2$ are about 60 µm at best focus, and L is about 900 µm.

As discussed above, a sample can have many variations in its topography in one or more axes that cannot be accounted by performing a single, global tilt of the sample prior to imaging. For instance, although a flow cell can appear to be perfectly flat when observed without instrumentation, example of FIG. 11 illustrates that it can be warped because of manufacturing tolerances, temperature variations, and/or other causes. As such, portions of it can be too close or too far from the objective, causing it to be out of focus during imaging. As also discussed above, the sloped regions of the sample can be locally corrected in one or more axes by adjusting the relative tilt and/or tip between the sample and an image sensor that images the sample. This can be done by adjusting any component of the optical imaging system along the imaging light path from the sample to the sample image sensor. For example, a sample container could be detilted and/or detipped by rotating it about the y axis and/or x axis (e.g., making Oy and/or Ox adjustments illustrated in FIG. 12) such that it is approximately level and parallel to the focal plane defined by the objective of the imaging system.

Figure 26:
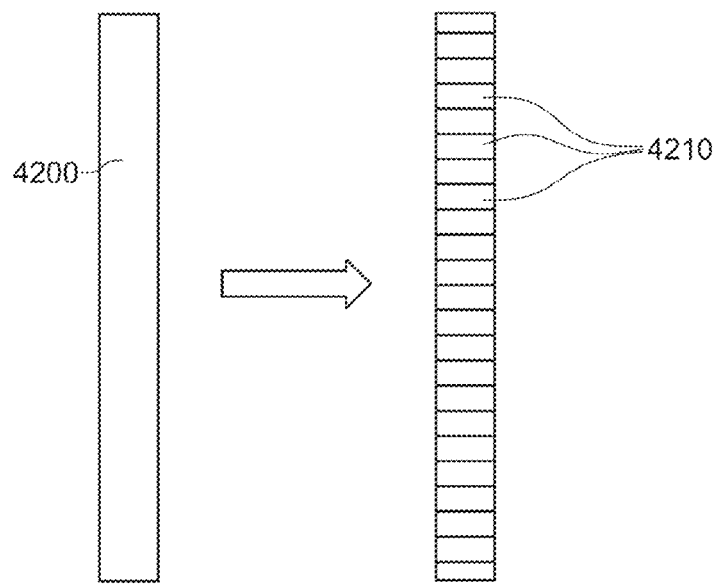
FIG. 26 shows a swath of a sample that is divided into tiles.

One potential strategy for adjusting for tilt and/or tip is to configure the imaging system to make the maximum number of detilt and/or detip corrections along the curvature of the sample, subject to the physical constraints of the imaging system. These constraints can include, for example, a maximum frequency that tip/tilt actuators can operate, an imaging frequency and/or other physical constraints). To illustrate, FIG. 26 shows a swath 4200 of a sample that is divided into tiles 4210. For a step and shoot imaging system, each tile 4210 can correspond to a respective region of the swath 4200 where each image is captured. For a TDI scanning system, each tile 4210 can be defined by constraints other than the number of imaging regions of the imaging system. As such, detipping and/or detilting could be applied after every tile 4210. One problem with this approach is that detipping and/or detilting may be applied when it is not needed. If detipping and/or detilting is applied for every tile 4210, adjustments for tip and tilt may occur in instances where the sample would remain in focus without the adjustment. This can prematurely reduce the mechanical lifetime of actuators or other components used to detilt the sample. As such, the approach of making adjustments after every tile can provide diminishing returns in keeping a sample in focus while causing excessive wear of the components of the optimal imaging system.

In another approach, detipping and/or detilting could be applied at a set frequency greater than 1 tile (i.e., after every n tiles, where n is an integer greater than 1). While this approach can reduce the number of mechanical actuations, performing adjustments after a predetermined number of tiles may skip tilt or tip adjustments during tiles where the sample is significantly out of focus (e.g., in the case where debris are present). In addition, this approach can still make tilt and/or tip adjustments even when the sample would otherwise remain in focus without adjustments.

To address the foregoing problems with these approaches to making tilt and/or tip adjustments, implementations described herein implement intelligent tilt and/or tip adjustments that occur only when needed to achieve a certain level of sample focus. In accordance with such implementations, tipping zones and/or tilting zones are calculated for a sample swath, where the size of each zone can be calculated based on a desired residual error ("residual"), further described below, that optimizes the number of tip and/or tilt adjustments. In accordance with such implementations, tipping and/or tilting adjustments can be configured to occur once per zone, where each zone can vary in size.

By virtue of calculating tipping zones and/or tilting zones for a sample swath, various benefits can be achieved. Mechanical lifetime constraints of tipping and/or tilting actuators can be reduced by requiring fewer motions to achieve the same or better performance than systems that do not utilize intelligent zoning. In addition, the intelligent zoning techniques described herein could potentially be implemented in any imaging system that has a method of obtaining a swath surface profile and adjusting for sample curvature. Further still, the intelligent zoning method could be used to change the location, length, and/or number of zones during a sequencing or imaging run to adapt to transient debris and other changes. These and other technical benefits are further described below.

Figure 27:
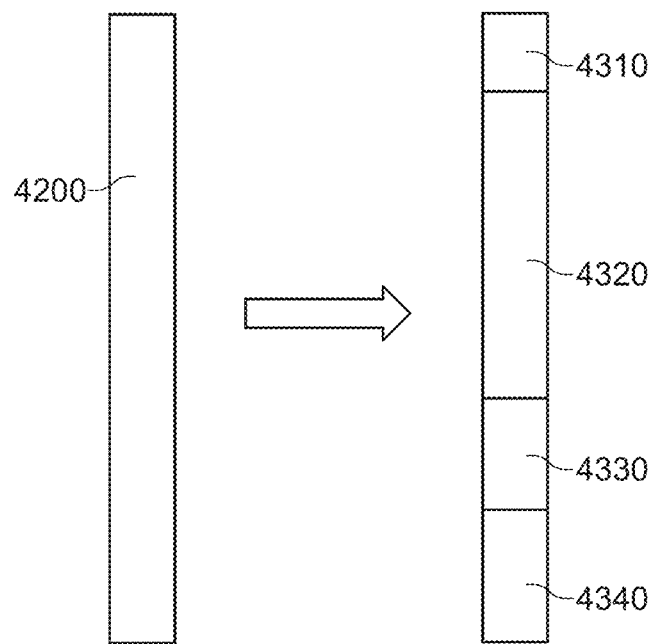
FIG. 27 shows swath of a sample divided into four adjustment zones, in accordance with some implementations of the disclosure.

FIG. 27 shows swath 4200 of a sample divided into four adjustment zones 4310-4340, in accordance with some implementations of the disclosure. In contrast to the example of FIG. 26, where tip and/or tilt adjustments may occur after each tile 4210 or a preset number of tiles 4210, tip and/or tilt adjustments in this example occur after each individual zone, which can vary in size from other zones. As such, the number of adjustments in this example could be reduced up to a factor of 25/4 when compared to a system that does not utilize intelligent zoning. Depending on the curvature of the sample along the swath, zones can vary in size. In the case of a step and shoot system, each zone can contain an integer number (1 or more) of tiles. In the case of a TDI scanning system, each zone can contain a non-integer number of tiles. As illustrated in the example of FIG. 27, larger zone 4320 may be in a section of the swath 4200 that is substantially planar over a greater area than zones 4330 and 4340.

Figure 28:
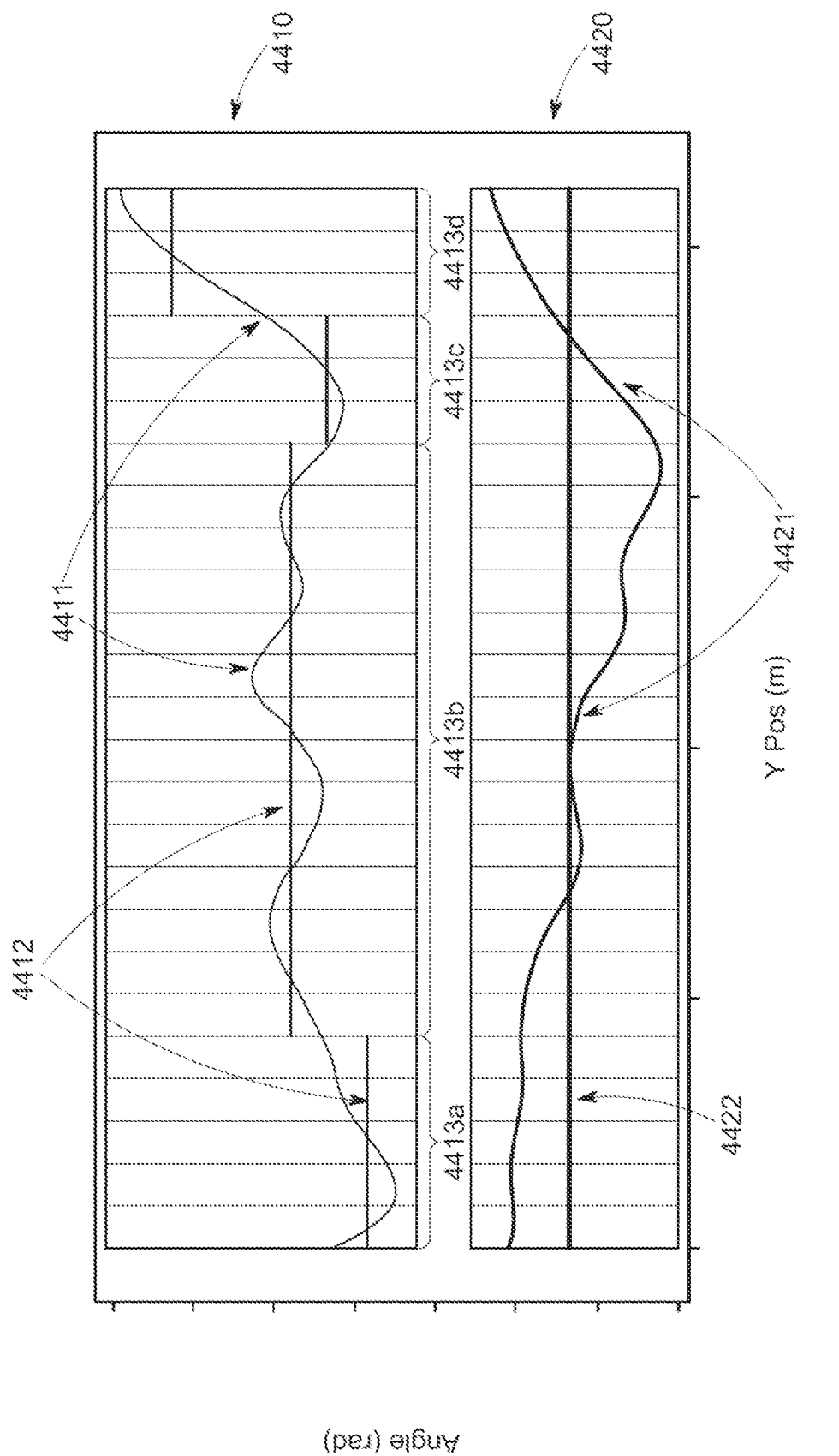
FIG. 28 shows plots including a sample result of detip and detilt zones calculated along one swath of a sample, in accordance with one particular embodiment of the technology described herein.

FIG. 28 shows plots 4410 and 4420 including a sample result of detip and detilt zones calculated along one swath of a sample, in accordance with one particular embodiment of the technology described herein. Plot 4410 corresponds to detip zoning along the swath. The curved line 4411 represents the swath's angular tip profile, and the four, horizontal lines 4412 represent the commanded detip values for each of the four detip zones 4413*a*-4413*d*. Plot 4420 corresponds to detilt zoning along the swath. The curved line 4421 represents the swath's angular tilt profile, and the single, horizontal line 4422 represents the commanded detilt value for a single detilt zone. Each rectangular box in plot 4410 and plot 4420 corresponds to a tile. As the foregoing example illustrates, the number of detip zones and detilt zones may differ, and they may be calculated independently. More generally, it should be appreciated that the intelligent zoning method described herein is not limited to the selection or quantity of axes used. For example, in some implementations the method could be implemented only to make tip adjustments about the x axis. In another implementation, the method could be implemented only to make tilt adjustments about the y axis. More generally, the intelligent zoning method described herein can be implemented to make angular and/or translational (e.g., Z-stage) adjustments for any axis.

Figure 29:
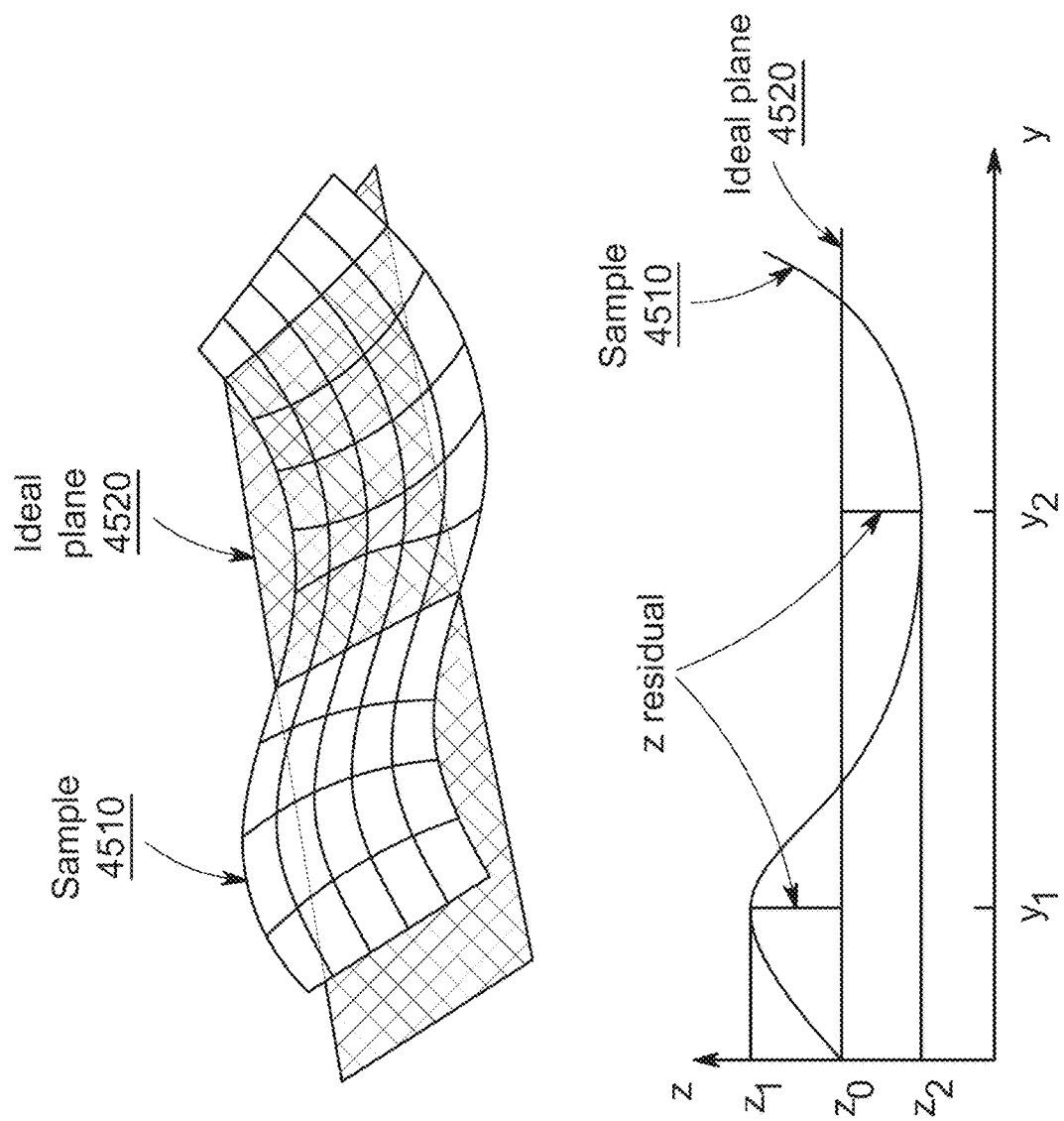
FIG. 29 depicts a technique for calculating a residual at different sample locations, in accordance with some implementations of the disclosure.

FIG. 29 depicts a technique for calculating a residual at different sample locations, in accordance with some implementations of the disclosure. During imaging, a Z-stage can attempt to keep a sample within the objective's depth of field by adjusting the sample height. For example, a sample stage and/or objective can be rotated or translated to adjust the sample height. A step and shoot system that does not make zone-based adjustments could make z height corrections after every tile. A TDI system that does not make zone-based adjustments could correct z height continuously during scanning. As illustrated by the lower plot of FIG. 29, a z residual could be calculated for sample 4510 at a given sample point by measuring the vertical (z-axis) distance by which the sample point is above or below an "ideal plane" 4520 (i.e., the focal plane) that the sample point would lie in after a Z-stage height correction. In the illustrated example, at sample point $y_1$ the z residual is the distance from $z_0$ to $z_1$. At sample point $y_2$ the z residual is the distance from $z_0$ to $z_2$.

In accordance with some implementations of the disclosure, zones can be determined based on a threshold residual that represents a maximum residual that a sample should not exceed for any point within a given zone. In some implementations, the threshold residual can be a value selected from between 10 nm and 500 nm. More particularly, the threshold residual can be a value selected from between 50 nm and 400 nm. Even more particularly, the threshold residual can be a value selected from between 100 nm and 300 nm. In a particular embodiment, the threshold residual can be set to about 200 nm. In some implementations, the threshold residual can be on the order of microns. The threshold residual can be user configurable, and it can depend on factors such as the depth of field of the imaging system, the curvature of the sample, and the amount of depth of field that is "consumed" by the tolerances of different components of the imaging system. For example, the imaging sensors of the system may not be perfectly planar or the imaging system actuators that make tilt adjustments may only be able to make adjustments up to some level of precision.

Figure 30:
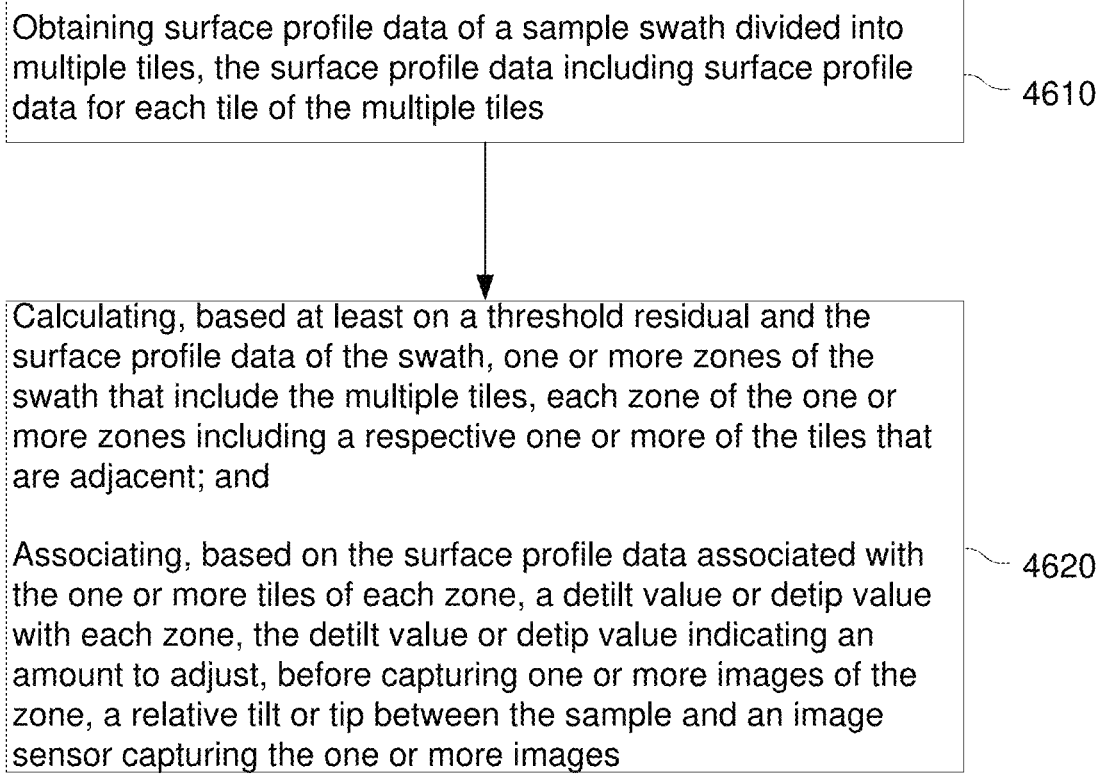
FIG. 30 is a flow diagram illustrating an example method of dividing a swath of a sample into one or more detilt or detip zones, in accordance with some implementations of the disclosure.

FIG. 30 is a flow diagram illustrating an example method 4600 of dividing a swath of a sample into one or more zones for detilting or detipping a sample, in accordance with some implementations of the disclosure. While method 4600 will primarily be discussed on the context of creating zones to account for swath rotation in one dimension, it should be appreciated that method 4600 could be performed to create zones that account for swath rotation in multiple dimensions. For example, detilt and detip zones could be independently determined.

Operation 4610 includes obtaining surface profile data of a sample swath divided into multiple tiles, the surface profile data including surface profile data associated with each tile of the multiple tiles. The surface profile data of the sample swath can be captured during a calibration cycle when the sample is not sequenced. Any suitable method and/or system can be used to capture the surface profile data of the sample swath provided that it is capable of obtaining swath surface profile data along multiple tiles of the swath that can subsequently be used to calculate residuals that are used to divide the swath into zones. In some implementations, the surface profile data includes tilt data, tip data, and/or Z-height data associated with each tile of the swath.

In some implementations, a focus tracking module that projects one or more pairs of spot beams at different swath locations can be used to generate the surface profile. Separation distance measurements of images of the one or more pairs of projected spot beams can be used to derive sample height measurements along different tiles of the swath. The focus tracking module can be implemented as described above with reference to any one of FIGS. 17A-17C, 19A-20C, and 23-24B. For example, a tilt map can be generated by performing a "pre-scan" (or imaging prior to sequencing) along several positions of the scanning/imaging direction (e.g., several Y positions along the Y-direction) to determine sample height at the various positions. The tilt map can be determined in one dimension or multiple dimensions as described above with reference to FIGS. 20A-20C.

Figure 31:
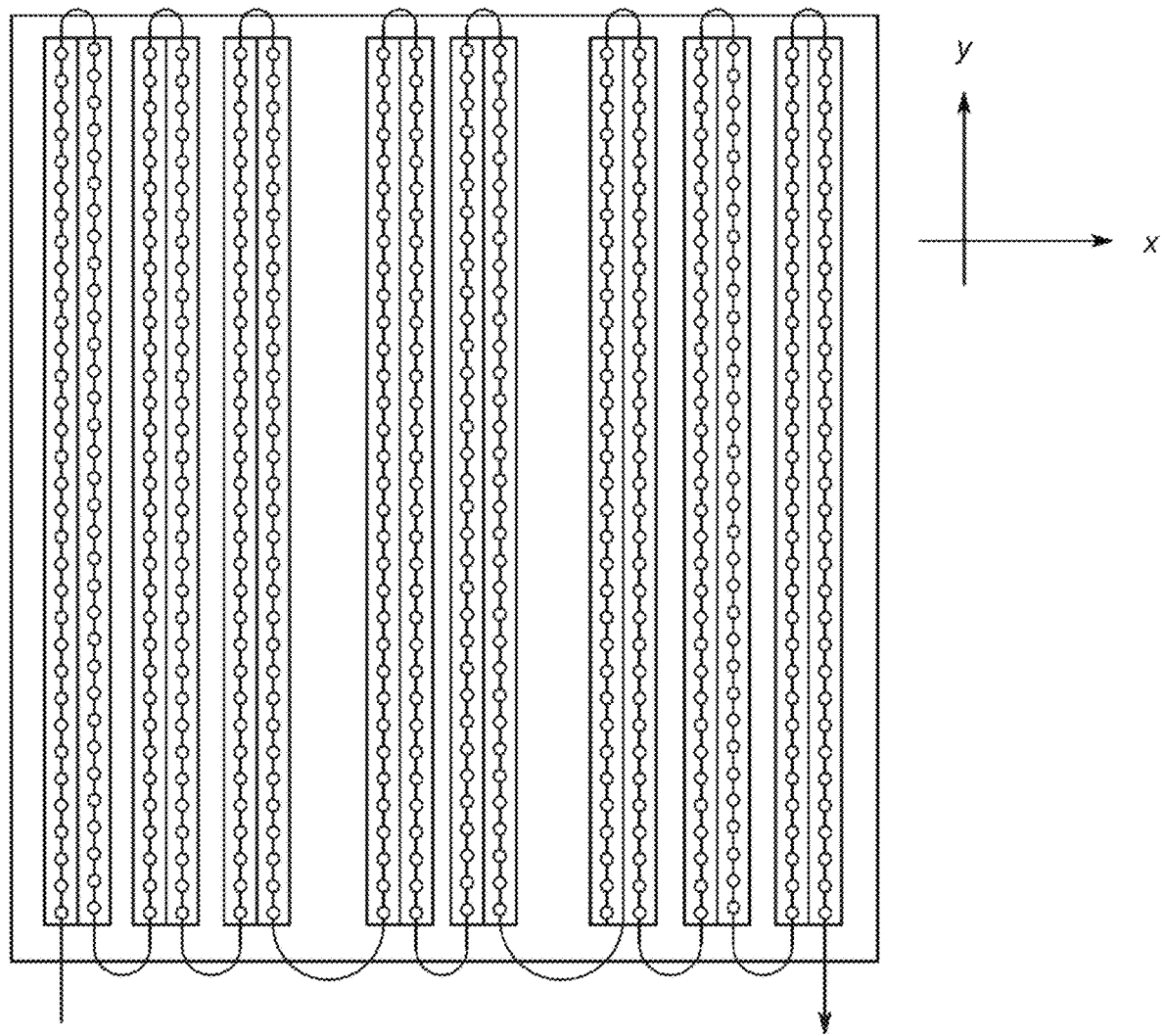
FIG. 31 depicts a pre-scan of the swaths of a flow cell, in accordance with some implementations of the disclosure.

In one particular implementation, a focus tracking module can be configured to scan each swath of a flow cell before sequencing starts. In this implementation, the pre-scan can capture the following data at approximately 16 μm intervals along the length of each swath: Y position, Z height of the surface of the flow cell, and a tilt value. This data can subsequently be used to generate the tip and tilt positions. For example, FIG. 31 depicts a pre-scan of the swaths of a flow cell in accordance with this this particular implementation. The line shown in FIG. 31 illustrates the focus tracking module scanning pattern, and the dots show the data points that are captured during scanning. It should be appreciated that other data sampling methods can be used depending on the scanning system. For example, in some implementations, the data can also include X position data.

Operation 4620 includes calculating, based at least on a threshold residual and the surface profile data, one or more zones of the swath that include the multiple tiles. Each zone of the one or more zones includes one or more adjacent tiles. Each zone can be defined by coordinate values specifying its length along a direction that the swath is scanned. For example, each zone can be defined by a starting y position and ending y position along a swath. In addition, as further described below, each zone can be associated with a detilt value. The created zone data can be saved for later use by an imaging system that adjusts for sample tilt or tip during imaging.

In determining how many adjacent tiles to include in a given zone, a residual number can be calculated for the zone based on surface profile data associated with the one or more adjacent tiles added to the zone. This calculated residual can be compared to the threshold residual to determine when to begin a new zone. During zone creation, the residual of the zone being created can be recalculated each time an adjacent tile is added to the zone. For example, after a first tile is added to the zone, the residual of the zone is the same as the residual of the first tile calculated from the surface profile data corresponding to the first tile. As additional adjacent tiles are added beyond the first tile, the residual of the zone can be recalculated as some composite based on the surface profile data of the first tile and the tilt data of the other tiles in the zone. In some implementations, the residual can be calculated as the maximum residual (i.e., 100th percentile datapoint) of the tiles included in the zone. In some implementations, the residual can be calculated by taking the nth percentile of all the residual datapoints or by some other formula.

It should be noted that in instances where a swath is substantially flat throughout its entire length, it is possible that only one zone may be created for the swath. On the other hand, in instances where the swath has frequent and significant variations throughout its length, the number of zones may be close to or even the same as the number of tiles. Particular techniques for creating zones are further described below.

Operation 4620 also includes associating, based on the surface profile data associated with the one or more adjacent tiles of each zone, a detilt value or detip value with each zone. The detilt value or detip value indicates an amount to adjust, before capturing one or more images of the zone, a relative tilt or tip between the sample and an image sensor capturing the one or more images. For example, as shown by the example of FIG. 28, the detilt value or the detip value can be a detip angle or detilt angle associated with the zone. As further described below, it should be noted that calculation of the zones of the swath can be performed concurrently with the association of detilt values or detip values with the zones. That is, as tiles are added to a given zone, the detilt value or detip value of the zone and the residual of the zone can be updated. In some implementations, the residual of the zone is calculated based, at least in part, on the detilt value or the detip value of the zone.

In some implementations, a different set of zones can be calculated for each axis of the imaging system for which corrections are made. For instance, as illustrated by the example of FIG. 28, a different number of detilt zones and detip zones can be created. In such implementations, operation 4620 can be independently performed for each axis.

Figure 32:
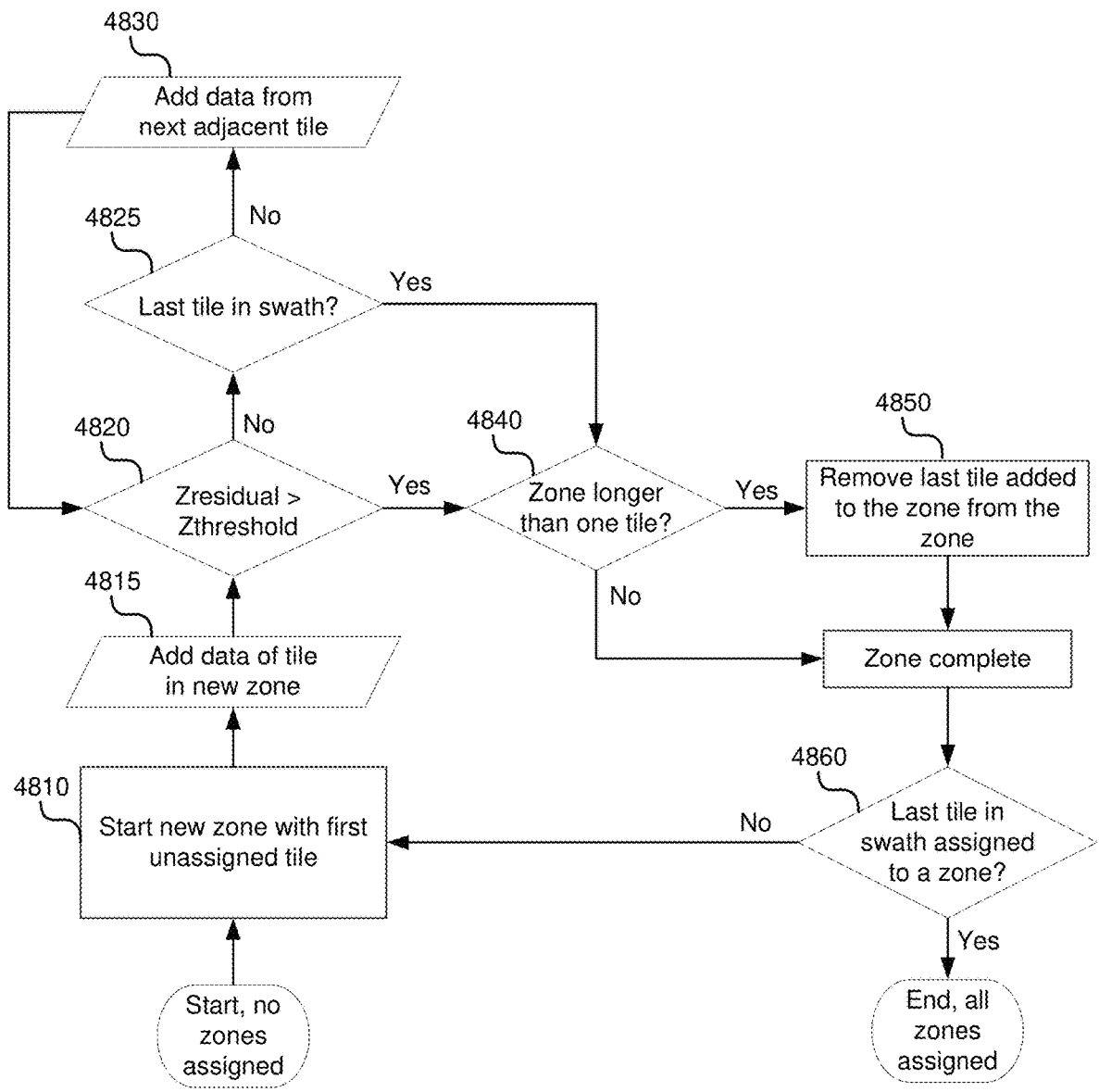
FIG. 32 is a flow diagram illustrating a particular example method of creating zones given swath profile data of a sample as an input, in accordance with some implementations of the disclosure FIG. 33 includes plots showing examples of tip and tilt smart adjustments for different swaths in one particular embodiment where zones were created using a threshold of 200 nm, in accordance with some implementations of the disclosure.

FIG. 32 is a flow diagram illustrating a particular example method of creating zones given swath profile data of a sample as an input, in accordance with some implementations of the disclosure. It should be appreciated that the method of FIG. 32 can be performed for each axis of the system for which zones are created. As such, the same workflow can be used to determine zones for tip and tilt. Prior to performing the method of FIG. 32, the swath can be divided into multiple tiles, and swath profile data including data associated with each of the tiles of the swath can be collected as described in the present disclosure.

Operation 4810 includes starting a new zone with a first unassigned tile. At the start of the method of FIG. 32, when no zones are assigned, the first tile unassigned to a zone can be the first tile in the swath that is imaged when the swath is imaged. At operation 4815, the data of the first unassigned tile is added in the new zone. If the first zone is being created, then the data can include the data from the first tile in the swath.

At decision 4820, it is determined if the residual calculated for the new zone ($Z_{residual}$), based on the tile data of the current tiles in the new zone, exceeds a threshold residual ($Z_{threshold}$). If the calculated zone residual does not exceed the threshold, at decision 4825 it is determined if there are any additional tiles in the swath that have not been assigned to a zone. If there are additional tiles, at operation 4830, data from the next adjacent tile in the swath can be added in the new zone, and the residual of the new zone can be recalculated. Operations 4820, 4825, and 4830 can iterate until the calculated zone residual exceeds the threshold residual (decision 4820), or if there are no additional tiles (decision 4825).

At decision 4840, it is determined if the zone is longer than one tile. If the zone is longer than one tile, at operation 4850 the last tile added to the zone is removed. As such, if the zone was calculated over n tiles, where n>1, the finished zone length can be n−1 tiles. At decision 4860, it is determined if the last tile in the swath has been assigned to a zone. If it has not, operations 4810-4860 can iterate until all tiles have been assigned to a zone.

In some implementations, the method of FIG. 30 or FIG. 32 can be iterated over time during a sequencing or imaging run such that the number of zones associated with a swath can be recalculated over time. For example, the number of zones associated with a swath can be recalculated after a predetermined number of scans of a swath. The number of zones can also be recalculated in response to new surface profile measurements (e.g., by the focus tracking module) that indicate that the curvature of the sample has materially changed. For example, the curvature of the sample may change in response to thermal variations at the sample surface. As such, the number and size of zones can be recalculated dynamically to improve performance of the intelligent zoning techniques described herein. In some implementations, the threshold residual used to determine the number and size of zones can be dynamically updated during imaging/sequencing. For example, the threshold can be adjusted upward or downward as the sample profile changes in response to thermal variations, or as other system components experience variations.

In a particular implementation, the detip angle (i.e., angle $\theta_x$ about the x axis) for a given zone can be calculated using surface profile data obtained by a focus tracking module as follows. For a given zone, the best fit line through the y (sample position along y-axis) and z (sample height) data points determined using a focus tracking module can be found based on Equation (6):

$$z_{detip}(y) = m * y + b \qquad (6)$$

The best fit line can be determined using a least squares fit, but other suitable fit methods can be used. The detip angle can be calculated from the slope of the best fit lie based on Equation (7):

$$\theta_{tip} = \tan^{-1}(m) \qquad (7)$$

Given the detip angle for a zone, in some particular implementations the z residual of a detip zone can be calculated as follows. The detipped z values can be calculated for the detip zone by i) projecting the detipped z values onto the objective plane; and ii) applying a z stage height correction within the zone by subtracting the distance the z stage travels to adjust for each tile based on Equation (8):

$$z'_{tip}(y) = (z(y) - (m*y + b))\cos(\theta_{tip}) - z_{tile\,adj}(y) \quad (8)$$

Where z (y) represents the z data point at a given y value and $z_{tile\,adj}(y)$ represents the amount the sample holder (e.g., flow cell) is adjusted in z relative to the z scan position. For a step and shoot system, this is the z corresponding to a tile. For a TDI scanning system, it is the z adjusted for that particular point.

Given the calculated detipped z values, the z residual for the detip zone ($z_{res,\,tip}$) can be calculated by evaluating the residual over all of the y values within the zone based on Equation (9):

$$z_{res,tip} = \max\left(\text{abs}\left([z'_{tip}(y)]\big|_{y_{zone,min}}^{y_{zone,max}}\right)\right) \quad (9)$$

In a particular implementation, the detilt angle (i.e., angle $\theta_y$ about the y axis) for a given zone can be calculated using surface profile data obtained by a focus tracking module as follows. For a given zone, the tilt angle $\theta_{tilt}'$ can be computed as the average of the tilt angles of the tiles in the focus tracking module data.

Given the detilt angle for a zone, in some particular implementations the z residual of a detilt zone can be calculated as follows. For a swath having a width w, the largest residual error can be determined to occur at the outer edges of each swath as defined by Equation (10):

$$z'_{tilt}(y) = \frac{1}{2}w\sin(\theta_{tilt}(y) - \theta'_{tilt}) \quad (10)$$

Where $\theta_{tilt}(y)$ represents the tilt data point at a given y value. Given the calculated detilted z values, the z residual for the detilt zone ($z_{res,\,tilt}$) can be calculated by evaluating the residual over all of the y values within the zone based on Equation (11):

$$z_{res,tilt} = \max(\text{abs}([z'_{tilt}(y)]|_{y_{zone,min}}^{y_{zone,max}}))$$

Although the foregoing discussion refers to intelligent zoning based on an imaging system that makes sample tilt corrections by applying z-stage corrections, it should be appreciated that the intelligent zoning techniques described herein need not be dependent on whether sample tilt corrections are made using a z-stage correction. As such, residuals can also be calculated in imaging systems where there are no z stage corrections for sample tilt.

Figure 33:
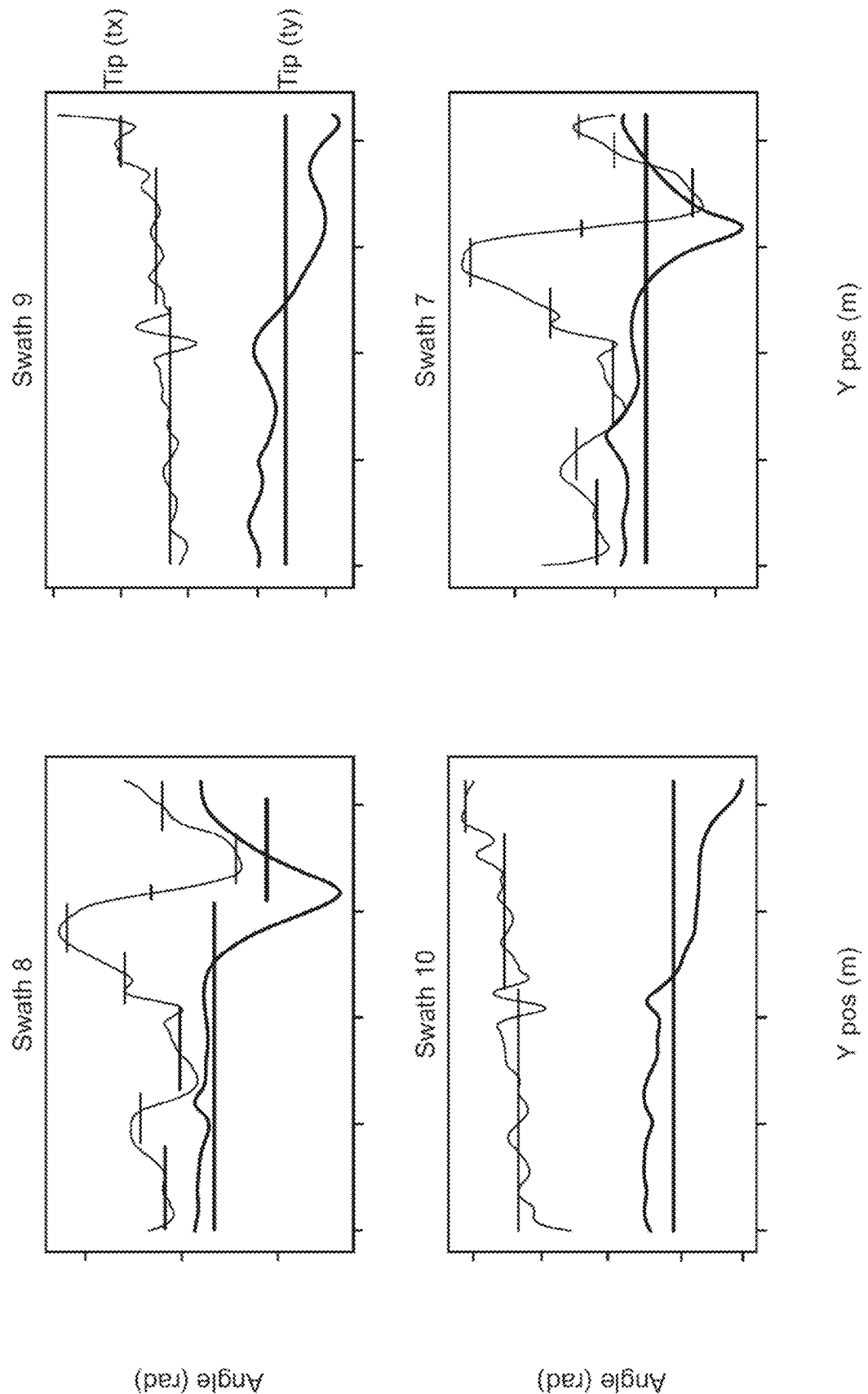

FIG. 33 includes plots showing examples of tip and tilt smart adjustments for different swaths in one particular embodiment where zones were created using a threshold of 200 nm, in accordance with some implementations of the disclosure.

It was observed by the inventors that some focus tracking module scans show "bumps" due to temporary debris. For example, incompressible contaminants (e.g. glass) between a flow cell and chuck can lead to "bumps" in the flow cell morphology under a vacuum. These bumps can cause very high residuals when employing a traditional tilt and/or tip adjustment algorithm that does not utilize intelligent zoning. It was observed by the inventors that implementing the intelligent zoning based adjustment techniques described herein substantially outperformed traditional adjustments algorithms when imaging samples have swaths containing high residual errors caused by transient debris.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to +0.05%.

To the extent applicable, the terms "first," "second," "third," etc. herein are merely employed to show the respective objects described by these terms as separate entities and are not meant to connote a sense of chronological order, unless stated explicitly otherwise herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The terms "substantially" and "about" used throughout this disclosure, including the claims, are used to describe and account for small fluctuations, such as due to variations in processing. For example, they can refer to less than or equal to +5%, such as less than or equal to +2%, such as less than or equal to +1%, such as less than or equal to +0.5%, such as less than or equal to +0.2%, such as less than or equal to +0.1%, such as less than or equal to +0.05%.

To the extent applicable, the terms "first," "second," "third," etc. herein are merely employed to show the respective objects described by these terms as separate entities and are not meant to connote a sense of chronological order, unless stated explicitly otherwise herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

What is claimed is:

1. A non-transitory computer-readable medium having executable instructions stored thereon that, when executed by a processor, causes an imaging system to perform operations comprising:
    obtaining surface profile data of a swath of a sample, the swath divided into multiple tiles, and the surface profile data including surface profile data for each tile of the multiple tiles;
    calculating, based at least on a threshold residual and the surface profile data of the swath, one or more zones of the swath that include the multiple tiles, each zone of the one or more zones including a respective one or more of the tiles that are adjacent; and
    associating, based on the surface profile data associated with the one or more tiles of each zone, a detilt value or a detip value with each zone, the detilt value or the detip value indicating an amount to adjust, before capturing one or more images of the zone, a relative tilt or tip between the sample and an image sensor of the imaging system capturing the one or more images.

2. The non-transitory computer-readable medium of claim 1, wherein calculating the one or more zones comprises:
    calculating, based at least on the threshold residual and the surface profile data of the swath, a first zone having a first number of the tiles; and
    calculating, based at least on the threshold residual and the surface profile data of the swath, a second zone having a second number of the tiles.

3. The non-transitory computer-readable medium of claim 2, wherein the first number of tiles or the second number of tiles is one.

4. The non-transitory computer-readable medium of claim 2, wherein the second number of the tiles is different from the first number of the tiles.

5. The non-transitory computer-readable medium of claim 2, wherein calculating the first zone comprises:
    assigning a first tile of the multiple tiles to the first zone;
    calculating a residual of the first zone based on the surface profile data associated with the first tile; and
    determining if the calculated residual exceeds the threshold residual.

6. The non-transitory computer-readable medium of claim 5, wherein calculating the first zone further comprises: in response to determining that the calculated residual does not exceed the threshold residual:
    assigning a second tile of the multiple tiles, adjacent to the first tile, to the first zone;
    recalculating the residual of the first zone based on the surface profile data associated with the first tile and the surface profile data associated the second tile; and
    determining if the recalculated residual exceeds the threshold residual.

7. The non-transitory computer-readable medium of claim 6, wherein:
    calculating the first zone further comprises: after determining that a final residual calculated for the first zone exceeds the threshold residual, removing, from the first zone, a tile that was last assigned to the first zone; and
    calculating the second zone comprises assigning, to the second zone, the tile removed from the first zone.

8. The non-transitory computer-readable medium of claim 1, wherein:
the surface profile data of the swath includes tilt data for each tile of the multiple tiles;
the one or more zones of the swath include one or more tilt zones including a respective one or more of the tiles that are adjacent; and
the operations include: associating, based on the tilt data associated with the one or more tiles of each tilt zone, the detilt value with each tilt zone, the detilt value indicating an amount to adjust, before capturing one or more images of the tilt zone, a relative tilt between the sample and an image sensor of the imaging system capturing the one or more images.

9. The non-transitory computer-readable medium of claim 1, wherein:
the surface profile data of the swath includes tip data for each tile of the multiple tiles;
the one or more zones of the swath include one or more tip zones including a respective one or more of the tiles that are adjacent; and
the operations include: associating, based on the tip data associated with the one or more tiles of each tip zone, the detip value with each tip zone, the detip value indicating an amount to adjust, before capturing one or more images of the tip zone, a relative tip between the sample and an image sensor of the imaging system capturing the one or more images.

10. The non-transitory computer-readable medium of claim 1, wherein:
the surface profile data of the swath includes tilt data and tip data for each tile of the multiple tiles;
the one or more zones of the swath include one or more tilt zones including a respective one or more of the tiles that are adjacent;
the one or more zones of the swath further include one or more tip zones including a respective one or more of the tiles that are adjacent; and
the operations include:
associating, based on the tilt data associated with the one or more tiles of each tilt zone, the detilt value with each tilt zone, the detilt value indicating an amount to adjust, before capturing one or more images of the tilt zone, a relative tilt between the sample and an image sensor of the imaging system capturing the one or more images; and
associating, based on the tip data associated with the one or more tiles of each tip zone, the detip value with each tip zone, the detip value indicating an amount to adjust, before capturing one or more images of the tip zone, a relative tip between the sample and the image sensor of the imaging system capturing the one or more images.

11. The non-transitory computer-readable medium of claim 10, wherein a number of the tilt zones is different from a number of the tip zones.

12. The non-transitory computer-readable medium of claim 1, wherein the operations further comprise: after calculating the one or more zones and associating the detilt value or the detip value with each zone, imaging the swath one or more times, wherein during imaging the relative tilt or tip between the sample and the image sensor is adjusted based on the detilt value or the detip value associated with each zone.

13. The non-transitory computer-readable medium of claim 12, wherein the relative tilt or tip between the sample and the image sensor is adjusted by translating a Z-stage.

14. The non-transitory computer-readable medium of claim 12, wherein the relative tilt or tip between the sample and the image sensor is adjusted by rotating a sample holder of the sample, rotating the imaging system relative to the sample, or some combination thereof.

15. The non-transitory computer-readable medium of claim 12, wherein the operations further comprise:
after imaging the swath one or more times, obtaining updated surface profile data of the swath, the updated surface profile data including updated surface profile data for each tile of the multiple tiles; and
calculating, based at least on the threshold residual and the updated surface profile data of the swath, one or more updated zones of the swath that include the multiple tiles, each updated zone of the one or more updated zones including a respective one or more of the tiles that are adjacent; and
associating, based on the updated surface profile data associated with the one or more tiles of each updated zone, an updated detilt value or an updated detip value with each updated zone, the updated detilt value or the updated detip value indicating an amount to adjust, before capturing one or more images of the updated zone, a relative tilt or relative tip between the sample and the image sensor.

16. A method, comprising:
obtaining, at an imaging system, surface profile data of a swath of a sample, the swath divided into multiple tiles, and the surface profile data including surface profile data for each tile of the multiple tiles;
calculating, at the imaging system, based at least on a threshold residual and the surface profile data, one or more zones of the swath that include the multiple tiles, each zone of the one or more zones including a respective one or more of the tiles that are adjacent; and
associating, at the imaging system, based on the surface profile data associated with the one or more tiles of each zone, a detilt value or a detip value with each zone, the detilt value or the detip value indicating an amount to adjust, before capturing one or more images of the zone, a relative tilt or tip between the sample and an image sensor of the imaging system capturing the one or more images.

17. The method of claim 16, wherein calculating the one or more zones comprises:
calculating, based at least on the threshold residual and the surface profile data of the swath, a first zone having a first number of the tiles; and
calculating, based at least on the threshold residual and the surface profile data of the swath, a second zone having a second number of the tiles.

18. The method of claim 17, wherein the second number of the tiles is different from the first number of the tiles.

19. The method of claim 16, further comprising:
after calculating the one or more zones and associating the detilt value or the detip value with each zone, imaging, at the imaging system, the swath one or more times; and
adjusting at the imaging system, during imaging, based on the detilt value or the detip value associated with each zone, the relative tilt or tip between the sample and the image sensor.

20. The method of claim 19, wherein adjusting the relative tilt or tip between the sample and the image sensor comprises:
- translating a Z-stage of the imaging system; or
- rotating, at the imaging system, a sample holder of the sample; or
- rotating the imaging system relative to the sample; or
- any combination thereof.

* * * * *